US010721997B2

(12) United States Patent
Follet et al.

(10) Patent No.: US 10,721,997 B2
(45) Date of Patent: Jul. 28, 2020

(54) METHOD OF MANUFACTURING ARTICLE OF FOOTWEAR WITH GRADUATED PROJECTIONS

(71) Applicant: NIKE, Inc., Beaverton, OR (US)

(72) Inventors: Lysandre Follet, Portland, OR (US); Gjermund Haugbro, Beaverton, OR (US); James Molyneux, Portland, OR (US); Philip Woodman, Treviso (IT)

(73) Assignee: NIKE, Inc., Beaverton, OR (US)

( * ) Notice: Subject to any disclaimer, the term of this patent is extended or adjusted under 35 U.S.C. 154(b) by 334 days.

(21) Appl. No.: 14/851,980

(22) Filed: Sep. 11, 2015

(65) Prior Publication Data

US 2017/0071291 A1 Mar. 16, 2017

(51) Int. Cl.
*A43C 1/04* (2006.01)
*A43D 8/24* (2006.01)
(Continued)

(52) U.S. Cl.
CPC .............. *A43C 1/04* (2013.01); *A43B 1/04* (2013.01); *A43B 5/025* (2013.01); *A43B 23/027* (2013.01);
(Continued)

(58) Field of Classification Search
None
See application file for complete search history.

(56) References Cited

U.S. PATENT DOCUMENTS

| 601,192 A | 3/1898 | Woodside |
| 1,215,198 A | 2/1917 | Rothstein |

(Continued)

FOREIGN PATENT DOCUMENTS

| DE | 870963 C | 3/1953 |
| DE | 1084173 | 6/1960 |

(Continued)

OTHER PUBLICATIONS

Declaration of Dr. Edward C. Frederick from the US Patent and Trademark Office Inter Partes Review of U.S. Pat. No. 7,347,011 (178 pp).

(Continued)

*Primary Examiner* — Philip C Tucker
*Assistant Examiner* — Andrew L Swanson
(74) *Attorney, Agent, or Firm* — Honigman LLP; Matthew H. Szalach; Jonathan P. O'Brien

(57) ABSTRACT

A method of manufacturing an article of footwear includes providing a textile and applying heat and/or pressure to the textile using a texturing device to form a textured area of the textile. The textured area is spaced apart from a substantially smooth area of the textile. The method further includes forming at least part of an upper from the textile after applying the heat and/or pressure to the textile. The upper includes a cavity configured to receive a foot. The substantially smooth area is configured to define a reference boundary of the upper. The substantially smooth area and the textured area are each configured to be disposed at predetermined regions of the upper. Furthermore, forming the textured area includes forming a plurality of projection structures that project outward from the reference boundary at varying distances.

24 Claims, 22 Drawing Sheets

(51) Int. Cl.
  *A43B 23/02* (2006.01)
  *B29D 35/14* (2010.01)
  *A43B 1/04* (2006.01)
  *A43B 5/02* (2006.01)
  *D04B 1/12* (2006.01)
  *B32B 38/06* (2006.01)

(52) U.S. Cl.
  CPC ........ *A43B 23/028* (2013.01); *A43B 23/0235* (2013.01); *A43D 8/24* (2013.01); *B29D 35/146* (2013.01); *B29D 35/148* (2013.01); *D04B 1/123* (2013.01); *B32B 38/06* (2013.01); *D10B 2403/0122* (2013.01); *D10B 2501/043* (2013.01)

(56) References Cited

U.S. PATENT DOCUMENTS

| | | |
|---|---|---|
| 1,597,934 A | 8/1926 | Stimpson |
| 1,888,172 A | 11/1932 | Joha |
| 1,902,780 A | 3/1933 | Holden et al. |
| 1,910,251 A | 5/1933 | Joha |
| 2,001,293 A | 5/1935 | Wilson |
| 2,047,724 A | 7/1936 | Zuckerman |
| 2,147,197 A | 2/1939 | Glidden |
| 2,314,098 A | 3/1943 | McDonald |
| 2,330,199 A | 9/1943 | Basch |
| 2,343,390 A | 3/1944 | Ushakoff |
| 2,400,692 A | 5/1946 | Herbert |
| 2,440,393 A | 4/1948 | Clark |
| 2,569,764 A | 10/1951 | Jonas |
| 2,586,045 A | 2/1952 | Hoza |
| 2,608,078 A | 8/1952 | Anderson |
| 2,641,004 A | 6/1953 | Whiting et al. |
| 2,675,631 A | 4/1954 | Doughty |
| 2,994,322 A | 8/1961 | Cullen et al. |
| 3,447,885 A * | 6/1969 | Hasselkuss et al. ..... D06Q 1/08 26/18.5 |
| 3,583,081 A | 6/1971 | Hayashi |
| 3,694,940 A | 10/1972 | Stohr |
| 3,704,474 A | 12/1972 | Winkler |
| 3,766,566 A | 10/1973 | Tadakoro |
| 3,778,856 A | 12/1973 | Christie et al. |
| 3,952,427 A | 4/1976 | Von den Benken et al. |
| 3,972,086 A | 8/1976 | Belli et al. |
| 4,027,402 A | 6/1977 | Liu et al. |
| 4,031,586 A | 6/1977 | Von den Benken et al. |
| 4,211,806 A | 7/1980 | Civardi et al. |
| 4,232,458 A | 11/1980 | Bartels |
| 4,255,949 A | 3/1981 | Thorneburg |
| 4,258,480 A | 3/1981 | Famolare, Jr. |
| 4,317,292 A | 3/1982 | Melton |
| 4,373,361 A | 2/1983 | Thorneburg |
| 4,447,967 A | 5/1984 | Zaino |
| 4,465,448 A | 8/1984 | Aldridge |
| 4,607,439 A | 8/1986 | Harada |
| 4,737,396 A | 4/1988 | Kamat |
| 4,750,339 A | 6/1988 | Simpson et al. |
| 4,756,098 A | 7/1988 | Boggia |
| 4,785,558 A | 11/1988 | Shiomura |
| 4,813,158 A | 3/1989 | Brown |
| 5,031,423 A | 7/1991 | Ikenaga |
| 5,095,720 A | 3/1992 | Tibbals, Jr. |
| 5,117,567 A | 6/1992 | Berger |
| 5,152,025 A | 10/1992 | Hirmas |
| 5,192,601 A | 3/1993 | Neisler |
| 5,345,638 A | 9/1994 | Nishida |
| 5,353,524 A | 10/1994 | Brier |
| 5,371,957 A | 12/1994 | Gaudio |
| 5,461,884 A | 10/1995 | McCartney et al. |
| 5,511,323 A | 4/1996 | Dahlgren |
| 5,572,860 A | 11/1996 | Mitsumoto et al. |
| 5,575,090 A | 11/1996 | Condini |
| 5,623,840 A | 4/1997 | Roell |
| 5,729,918 A | 3/1998 | Smets |
| 5,735,145 A | 4/1998 | Pernick |
| 5,746,013 A | 5/1998 | Fay, Sr. |
| 5,765,296 A | 6/1998 | Ludemann et al. |
| 5,884,419 A | 3/1999 | Davidowitz et al. |
| 5,996,189 A | 12/1999 | Wang |
| 6,029,376 A | 2/2000 | Cass |
| 6,032,387 A | 3/2000 | Johnson |
| 6,052,921 A | 4/2000 | Oreck |
| 6,088,936 A | 7/2000 | Bahl |
| 6,151,802 A | 11/2000 | Reynolds |
| 6,170,175 B1 | 1/2001 | Funk |
| 6,299,962 B1 * | 10/2001 | Davis ................. A43B 23/0255 12/142 P |
| 6,308,438 B1 | 10/2001 | Throneburg et al. |
| 6,333,105 B1 | 12/2001 | Tanaka et al. |
| 6,401,364 B1 | 6/2002 | Burt |
| 6,523,282 B1 | 2/2003 | Johnston |
| 6,558,784 B1 | 5/2003 | Norton et al. |
| 6,588,237 B2 | 7/2003 | Cole et al. |
| 6,754,983 B2 | 6/2004 | Hatfield et al. |
| 6,910,288 B2 | 6/2005 | Dua |
| 6,922,917 B2 | 8/2005 | Kerns et al. |
| 6,931,762 B1 | 8/2005 | Dua |
| D517,297 S | 3/2006 | Jones et al. |
| 7,051,460 B2 | 5/2006 | Orei et al. |
| 7,056,402 B2 | 6/2006 | Koerwien et al. |
| 7,155,846 B2 | 1/2007 | Alfaro et al. |
| 7,347,011 B2 | 3/2008 | Dua et al. |
| 7,441,348 B1 | 10/2008 | Dawson |
| 7,543,397 B2 | 6/2009 | Kilgore et al. |
| 7,568,298 B2 | 8/2009 | Kerns |
| 7,682,219 B2 | 3/2010 | Falla |
| 7,814,598 B2 * | 10/2010 | Dua .................... A43B 1/04 12/146 C |
| 8,196,322 B2 | 6/2012 | Atsumi et al. |
| 8,490,299 B2 | 7/2013 | Dua et al. |
| 8,505,216 B2 | 8/2013 | Sokolowski et al. |
| 8,844,171 B2 * | 9/2014 | Eder .................... A43B 1/0009 36/132 |
| 8,887,410 B2 | 11/2014 | Dojan et al. |
| 8,973,410 B1 | 3/2015 | Podhajny |
| 2002/0078599 A1 | 6/2002 | Delgorgue et al. |
| 2002/0148258 A1 | 10/2002 | Cole et al. |
| 2003/0126762 A1 | 7/2003 | Tseng |
| 2003/0191427 A1 | 10/2003 | Jay et al. |
| 2004/0118018 A1 | 6/2004 | Dua |
| 2004/0181972 A1 | 9/2004 | Csorba |
| 2005/0115284 A1 | 6/2005 | Dua |
| 2005/0193592 A1 | 9/2005 | Dua et al. |
| 2005/0273988 A1 | 12/2005 | Christy |
| 2005/0284000 A1 | 12/2005 | Kerns |
| 2006/0059715 A1 | 3/2006 | Aveni |
| 2006/0162187 A1 | 7/2006 | Byrnes et al. |
| 2007/0022627 A1 * | 2/2007 | Sokolowski ............. A43B 1/04 36/3 A |
| 2007/0180730 A1 | 8/2007 | Greene et al. |
| 2007/0256328 A1 * | 11/2007 | Arizumi .................. A43B 7/08 36/45 |
| 2007/0294920 A1 | 12/2007 | Baychar |
| 2008/0017294 A1 | 1/2008 | Bailey et al. |
| 2008/0078102 A1 | 4/2008 | Kilgore et al. |
| 2008/0110048 A1 | 5/2008 | Dua et al. |
| 2008/0189830 A1 | 8/2008 | Egglesfield |
| 2008/0313939 A1 | 12/2008 | Ardill |
| 2009/0068908 A1 | 3/2009 | Hinchcliff |
| 2010/0037483 A1 | 2/2010 | Meschter et al. |
| 2010/0051132 A1 | 3/2010 | Glenn |
| 2010/0077637 A1 | 4/2010 | Hatzilias |
| 2010/0154256 A1 | 6/2010 | Dua |
| 2010/0170651 A1 | 7/2010 | Scherb et al. |
| 2010/0199406 A1 | 8/2010 | Dua et al. |
| 2010/0199520 A1 * | 8/2010 | Dua ........................ A43B 1/04 36/87 |
| 2011/0030244 A1 | 2/2011 | Motawi et al. |
| 2011/0078921 A1 | 4/2011 | Greene et al. |
| 2012/0233882 A1 | 9/2012 | Huffa et al. |
| 2012/0233888 A1 | 9/2012 | Baker et al. |
| 2012/0246973 A1 | 10/2012 | Dua |
| 2012/0255201 A1 | 10/2012 | Little |

(56) References Cited

U.S. PATENT DOCUMENTS

| | | | |
|---|---|---|---|
| 2013/0074374 A1 | 3/2013 | Droege et al. | |
| 2013/0239438 A1 | 9/2013 | Dua et al. | |
| 2013/0269209 A1 | 10/2013 | Lang et al. | |
| 2013/0291400 A1 | 11/2013 | Rammig | |
| 2014/0130270 A1 | 5/2014 | Baudouin et al. | |
| 2014/0196314 A1* | 7/2014 | Beye | D04B 21/20 36/84 |
| 2014/0310983 A1 | 10/2014 | Tamm et al. | |
| 2014/0310984 A1 | 10/2014 | Tamm et al. | |
| 2014/0310985 A1 | 10/2014 | Tran et al. | |
| 2014/0310986 A1 | 10/2014 | Tamm et al. | |
| 2015/0047227 A1 | 2/2015 | Fallon et al. | |
| 2015/0052778 A1* | 2/2015 | Kirk | A43B 1/0009 36/45 |

FOREIGN PATENT DOCUMENTS

| | | |
|---|---|---|
| DE | 19738433 | 4/1998 |
| DE | 19728848 | 1/1999 |
| EP | 0279950 A2 | 8/1988 |
| EP | 0448714 | 10/1991 |
| EP | 0728860 | 8/1996 |
| EP | 0758693 | 2/1997 |
| EP | 0898002 A2 | 2/1999 |
| EP | 1233091 | 8/2002 |
| EP | 1437057 A1 | 7/2004 |
| EP | 1563752 A1 | 8/2005 |
| EP | 1602762 A1 | 12/2005 |
| EP | 1972706 A1 | 9/2008 |
| FR | 2171172 | 9/1973 |
| FR | 2428987 A1 | 1/1980 |
| GB | 538865 | 8/1941 |
| GB | 2018837 A | 10/1979 |
| GB | 1603487 | 11/1981 |
| JP | H06113905 | 4/1994 |
| JP | H08109553 | 4/1996 |
| JP | 08332101 A | 12/1996 |
| JP | H11302943 | 11/1999 |
| JP | 5715145 B2 | 5/2015 |
| NL | 7304678 | 10/1974 |
| WO | 9003744 | 4/1990 |
| WO | 0032861 | 6/2000 |
| WO | 0231247 | 4/2002 |

OTHER PUBLICATIONS

David J. Spencer, Knitting Technology: A Comprehensive Handbook and Practical Guide (Third ed., Woodhead Publishing Ltd. 2001) (413 pp).

Excerpt of Hannelore Eberle et al., Clothing Technology (Third English ed., Beuth-Verlag GmnH 2002) (book cover and back; pp. 2-3, 83).

International Search Report and Written Opinion in connection with PCT/US2009/056795 dated Apr. 20, 2010.

International Search Report and Written Opinion in connection with PCT/US2012/028576 dated Oct. 1, 2012.

International Search Report and Written Opinion in connection with PCT/US2012/028559 dated Oct. 19, 2012.

International Search Report and Written Opinion in connection with PCT/US2012/028534 dated Oct. 17, 2012.

International Preliminary Report on Patentability in connection with PCT/US2012/028534 dated Sep. 17, 2013.

International Preliminary Report on Patentability in connection with PCT/US2012/028576 dated Sep. 17, 2013.

Under Armour Curry One: Basketball Shoe Review, published Apr. 21, 2015 from http//:coed.com/2015/04/21/under-armor-curry-one-review-basketball-shoes/, on Jun. 8, 2015, 5pp.

Adidas Soccer Prime Knit 2.0 fg cleats, from http//:www.adidas.com/us/soccer-prime-knit-2.0-fg-cleats/B34583.html, on Jun. 10, 2015, 8pp.

Men's Under Armour Curry One Basketball Shoes, from http//:www.finishline.com/store/product?A=22648&categoryvId=cat305626&productId=prod769817, on Jun. 8, 2015, 3pp.

Wong, Jordan, "Under Armour Curry One First Impression," Kicksologist Reviews, Feb. 16, 2015, Kicksologists, Published Online http://www.kicksologists.com/2015/02/16/under-armour-curry-one-first-impression/ (5 pages).

Intellectual Property Office, Office Action and Search Report for ROC (Taiwan) Patent Application No. 105128661, dated May 19, 2017.

Korean Intellectual Property Office, Office Action for KR Application No. 10-2018-7010272, dated May 21, 2019.

China National Intellectual Property Administration, Notification of First Office Action and Search for Application No. 201680052797.7, dated Jan. 20, 2020.

European Patent Office, Communication pursuant to Article 94(3) EPC, for EP Application No. 16759948.9, dated Apr. 21, 2020.

* cited by examiner

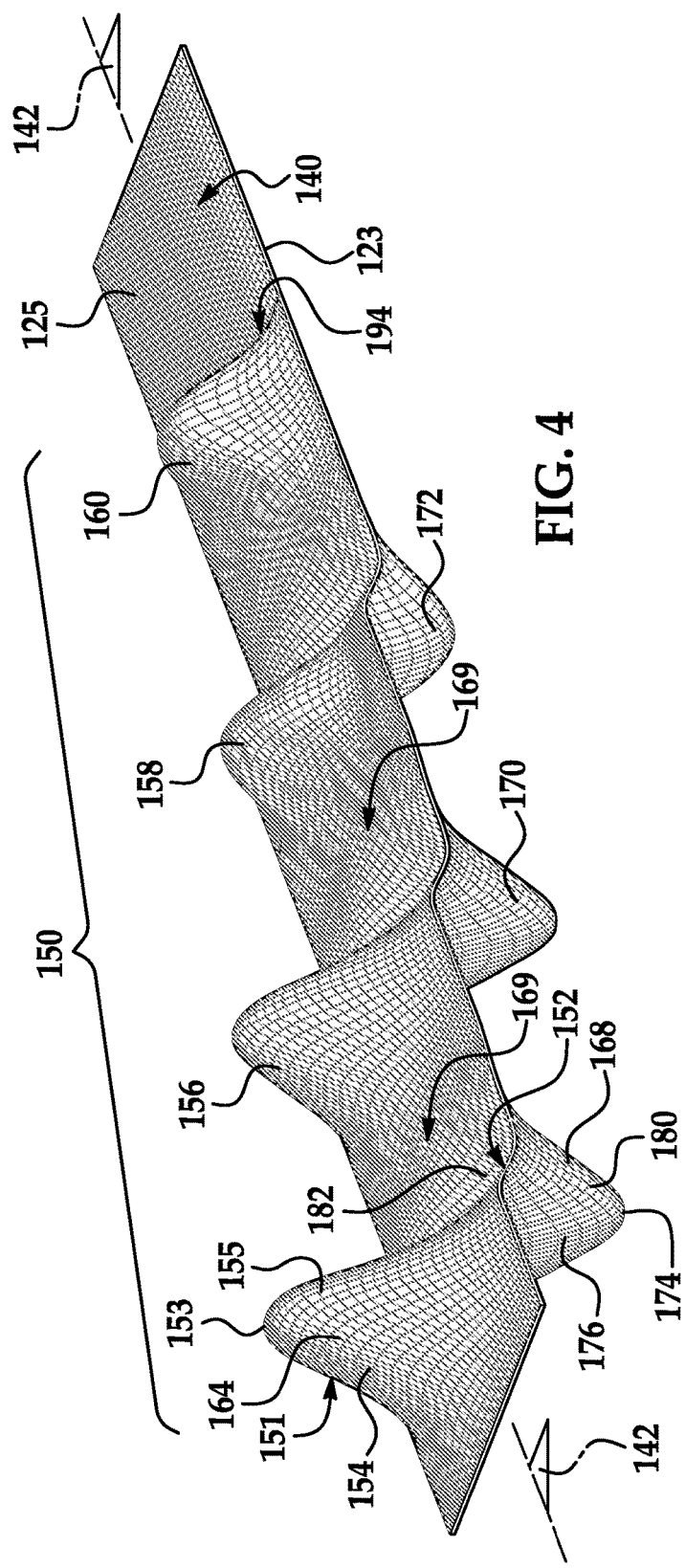
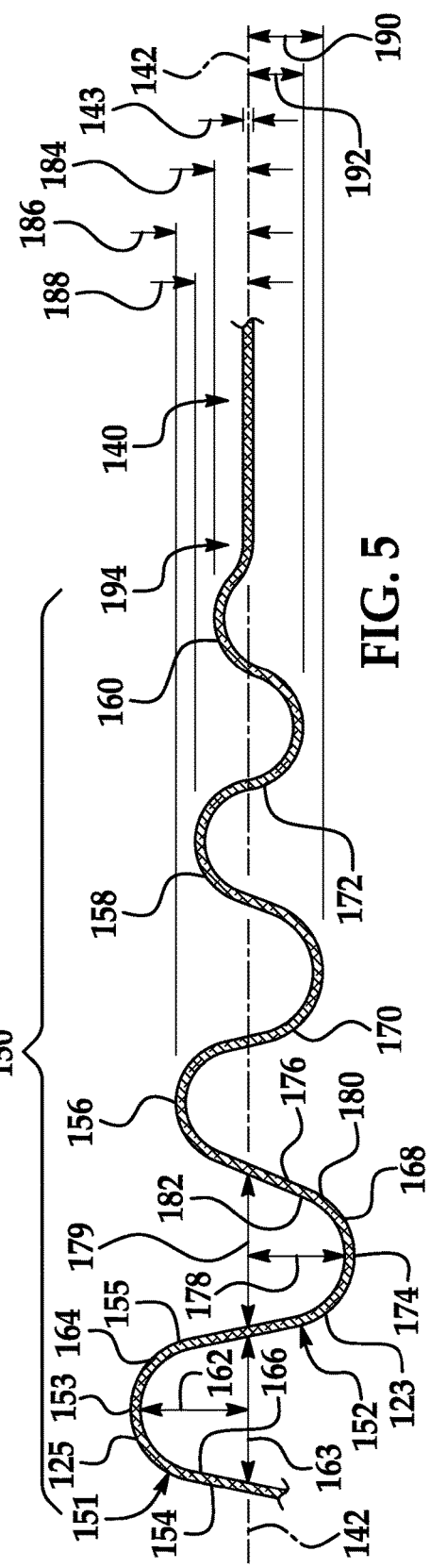

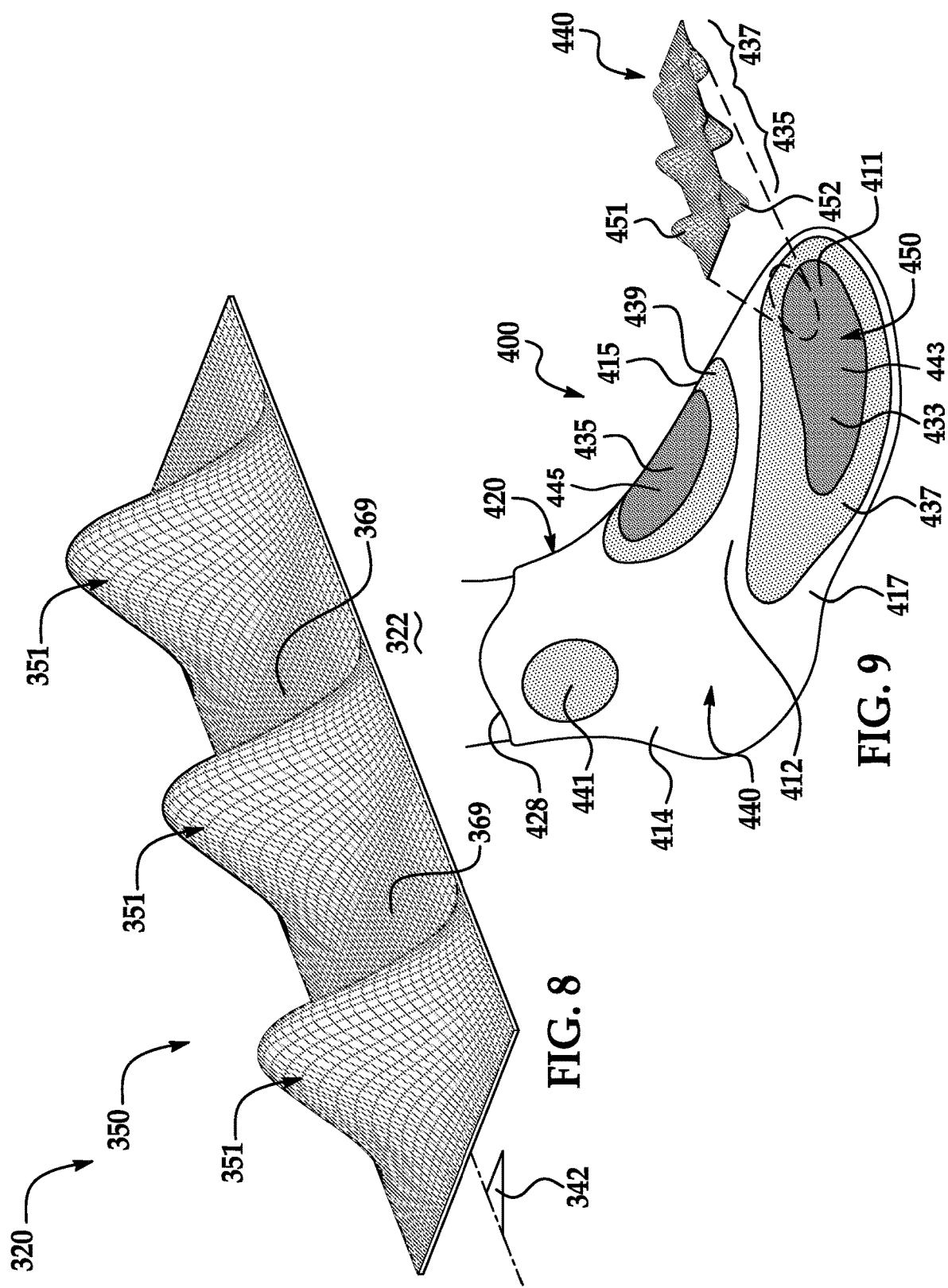

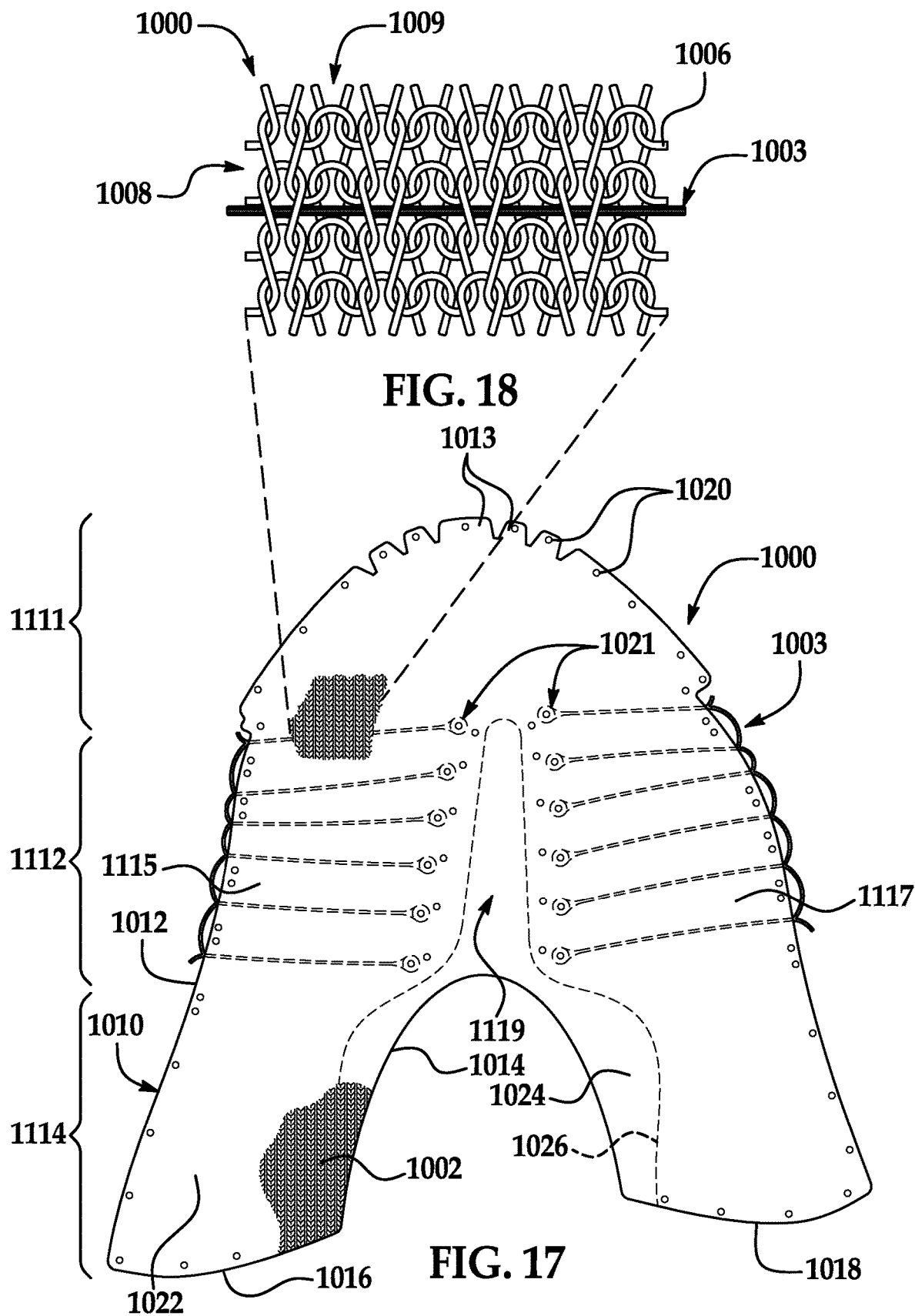

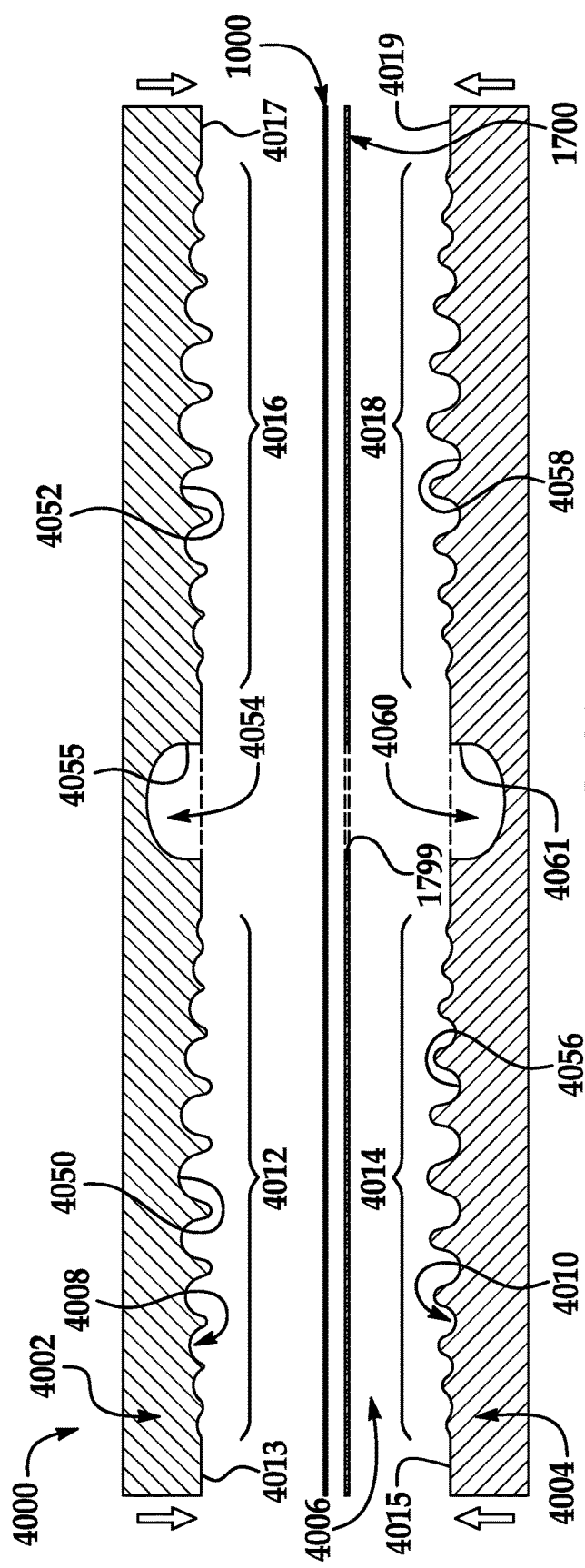
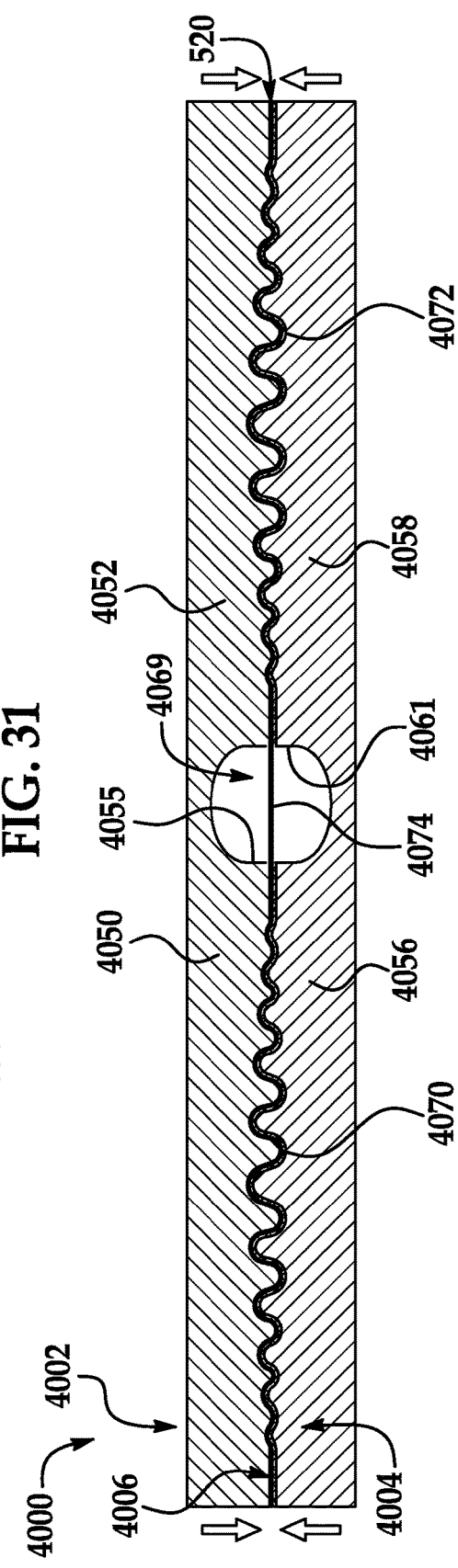
FIG. 31
FIG. 32

METHOD OF MANUFACTURING ARTICLE OF FOOTWEAR WITH GRADUATED PROJECTIONS

BACKGROUND

Conventional articles of footwear generally include two primary elements: an upper and a sole structure. The upper is secured to the sole structure and forms a cavity for comfortably and securely receiving a foot. The sole structure is secured to a lower area of the upper, thereby being positioned between the upper and the ground.

In some embodiments, the sole structure includes a midsole and an outsole. The midsole often includes a polymeric foam material that attenuates ground reaction forces to lessen stresses upon the foot and leg during walking, running, and other ambulatory activities. Additionally, the midsole may include fluid-filled chambers, plates, moderators, or other elements that further attenuate forces, enhance stability, or influence the motions of the foot. The outsole is secured to a lower surface of the midsole and provides a ground-engaging portion of the sole structure formed from a durable and wear-resistant material, such as rubber.

The upper can generally extend over the instep and toe areas of the foot, along the medial and lateral sides of the foot and around the heel area of the foot. In some articles of footwear, the upper may extend upward and around the ankle to provide support or protection for the ankle. Access to the cavity within the upper is generally provided by an ankle opening in a heel region of the footwear.

Additionally, the article of footwear can include a lacing system, cables, straps, buckles, or other securement device. The securement device can adjust the fit of the upper, thereby permitting entry and removal of the foot from the upper. The lacing system also permits the wearer to modify certain dimensions of the upper, particularly girth, to accommodate feet with varying dimensions.

BRIEF DESCRIPTION OF THE DRAWINGS

The present disclosure can be better understood with reference to the following drawings and description. The components in the figures are not necessarily to scale, emphasis instead being placed upon illustrating the principles of the present disclosure. Moreover, in the figures, like reference numerals designate corresponding parts throughout the different views.

FIG. 4 is a detail perspective view of a textured area of the article of footwear as indicated in FIG. 1 according to exemplary embodiments;

FIG. 5 is a section view taken along the line 5-5 of FIG. 1;

FIG. 8 is a detail perspective view of a textured area of the article of footwear according to additional embodiments of the present disclosure;

FIG. 9 is a schematic view of the upper of the article of footwear according to additional embodiments;

FIG. 17 is a plan view of a knitted component of the upper of FIG. 10;

FIG. 18 is a detail view of the knitted component of FIG. 17;

FIGS. 30B and 30C are schematic illustrations of the method according to additional embodiments, wherein FIG. 30B shows the upper being moved from a first texturing device to second texturing device, and wherein FIG. 30C shows the upper within the second texturing device;

FIG. 31 is a schematic illustration of a texturing device for forming a textured area of the upper according to additional embodiments of the present disclosure, wherein the texturing device is shown relative to a first zone of the upper, and wherein the texturing device is shown in an open position;

FIG. 32 is a schematic illustration of the texturing device of FIG. 31, wherein the texturing device is shown in a closed position relative to the first zone of the upper;

DETAILED DESCRIPTION

Figure 1:
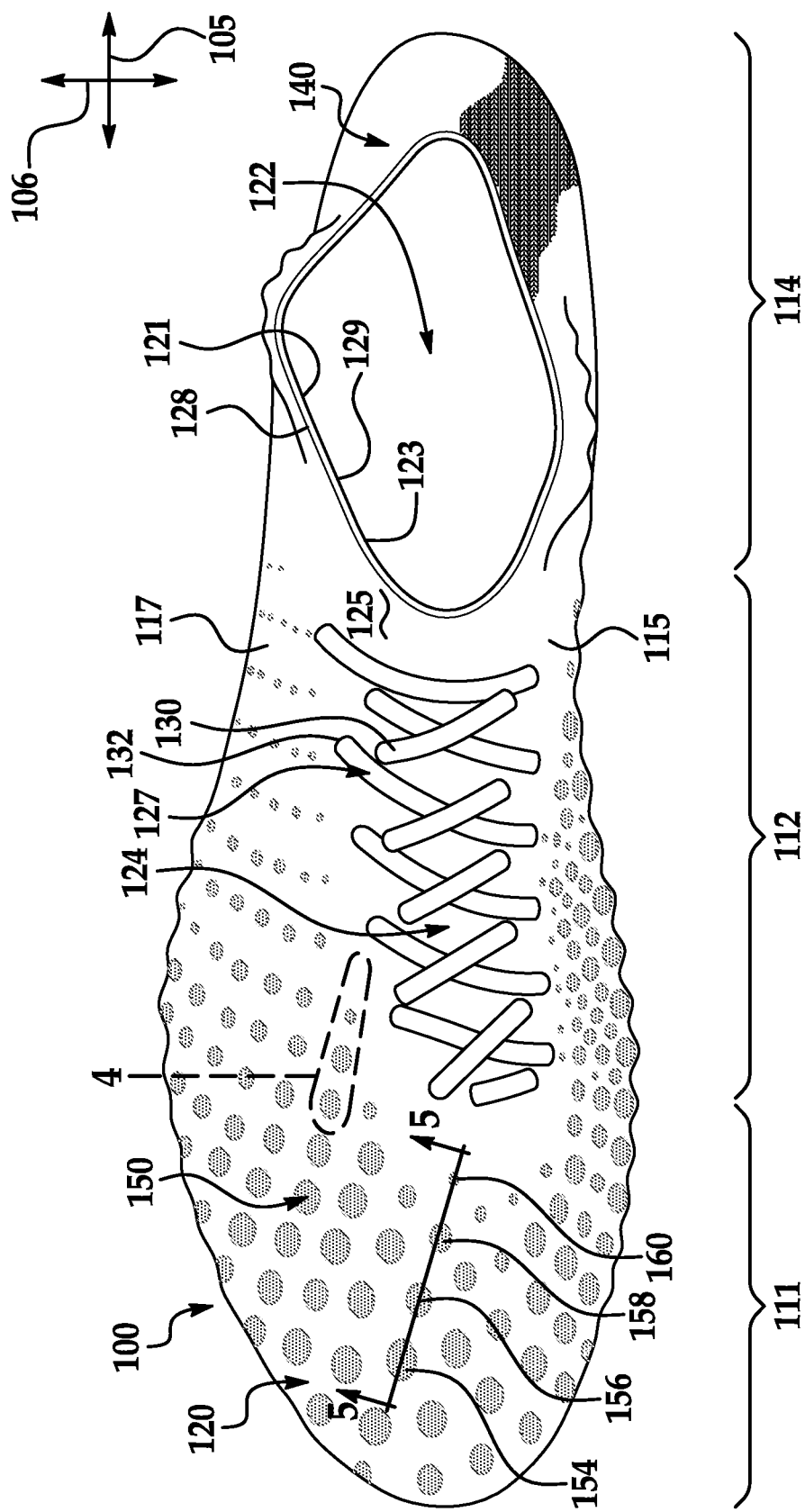
FIG. 1 is a top view of an article of footwear according to exemplary embodiments of the present disclosure.

The following discussion and accompanying figures disclose an article, such as an article of footwear or other apparel, having predetermined areas that are textured. Also disclosed is an article with a first area that is substantially smooth and a second area that is textured. In some embodiments, the textured area can be deformable, for example, under compression. More specifically, the textured area can flex, flatten out, stretch, or otherwise deform upon impact with another object. Furthermore, the textured area can be resilient. Thus after impact, the textured area can recover from the deformed position to the neutral, textured position.

Furthermore, the present disclosure relates to methods of manufacturing articles having these features. The manufacturing methods can be used for forming and shaping textured areas on the article. Also, in some embodiments, the article can be constructed from at least two members, and the manufacturing methods can be employed for attaching the members and for forming the textured areas in at least one member. As will be discussed, these methods can increase manufacturing efficiency and can reduce the amount of waste material.

For example, a method of manufacturing an article of footwear is disclosed. The method includes providing a textile. The method also includes applying heat and/or pressure to the textile using a texturing device to form a textured area of the textile. The textured area is spaced apart from a substantially smooth area of the textile. The method further includes forming at least part of an upper from the textile after applying the heat and/or pressure to the textile. The upper includes a cavity configured to receive a foot. The substantially smooth area is configured to define a reference boundary of the upper. The substantially smooth area and the textured area are each configured to be disposed at predetermined regions of the upper. Furthermore, forming the textured area includes forming a plurality of projection structures that project outward from the reference boundary at varying distances.

Furthermore, a method of manufacturing an article of footwear is disclosed that includes knitting a knitted component of unitary knit construction. The knitted component includes a knit element and a tensile element. The method additionally includes inlaying a first segment of the tensile element in a first area of the knit element, inlaying a second segment of the tensile element in a second area of the knit element, and disposing a third segment of the tensile element outside the knit element. The third segment extends between the first segment and the second segment. Furthermore, the method includes inserting the knit element into a cavity of a texturing device. Moreover, the method includes applying at least one of heat and pressure to the knit element while in the cavity to form a textured area of the knitted component. The textured area includes a plurality of projection structures having a variety of heights. Additionally, the method includes forming at least a portion of an upper from the knitted component, wherein the first area and the first segment are disposed proximate a throat of the upper, and wherein the second area and the second segment are disposed proximate a sole attachment area of the upper. Furthermore, the method includes attaching the sole attachment area to a sole structure.

These and other aspects of the present disclosure will be explored in the various exemplary embodiments illustrated in the Figures. The present disclosure will be discussed in detail with regard to an article of footwear. However, it will be appreciated that the present disclosure can apply to other articles of apparel, sports equipment, or other articles. Furthermore, the manufacturing methods discussed below and illustrated in the figures can differ without departing from the scope of the present disclosure. Other systems, methods, features and advantages of the present disclosure will be, or will become, apparent to one of ordinary skill in the art upon examination of the following figures and detailed description. It is intended that all such additional systems, methods, features and advantages be included within this description and this summary, be within the scope of the present disclosure, and be protected by the following claims.

Footwear Configurations

Figure 2:
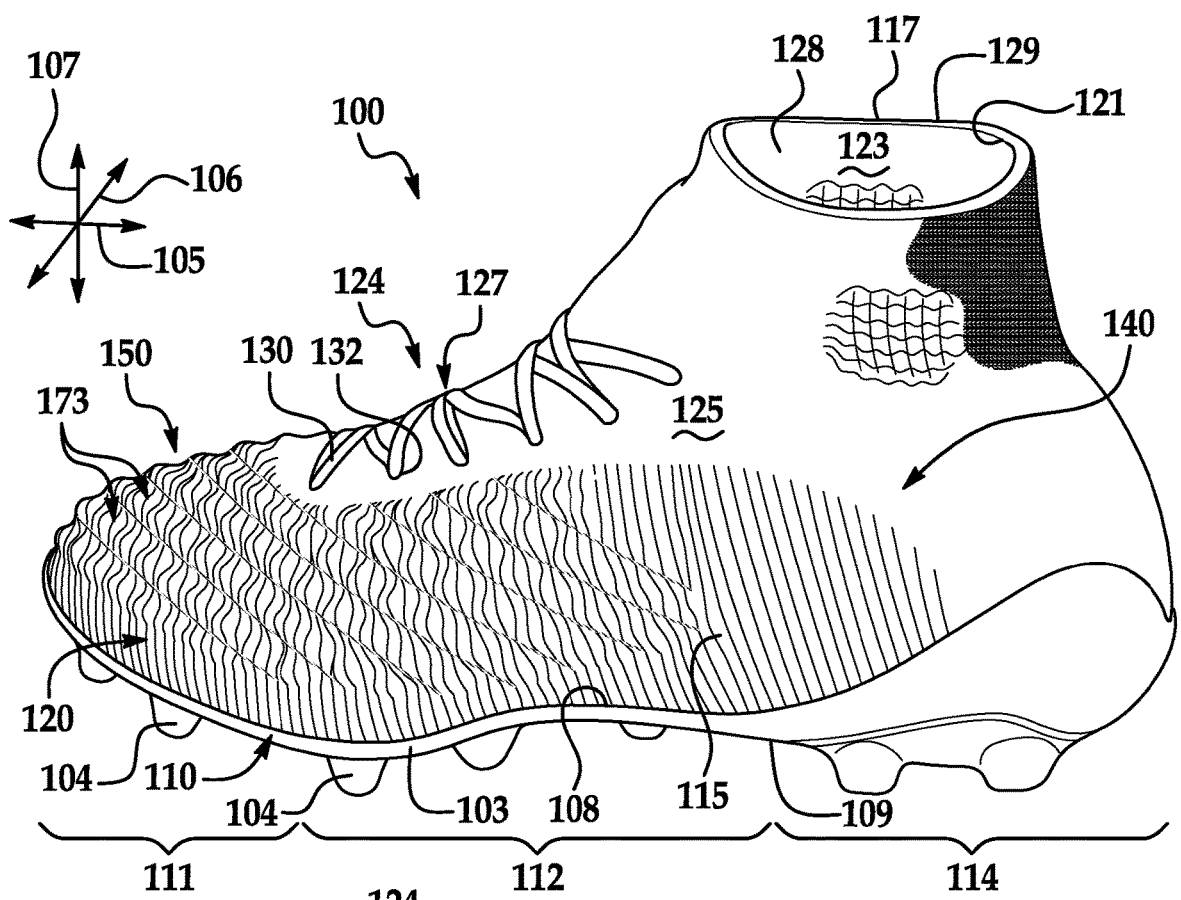
FIG. 2 is a medial perspective view of the article of footwear of FIG. 1.
Figure 3:
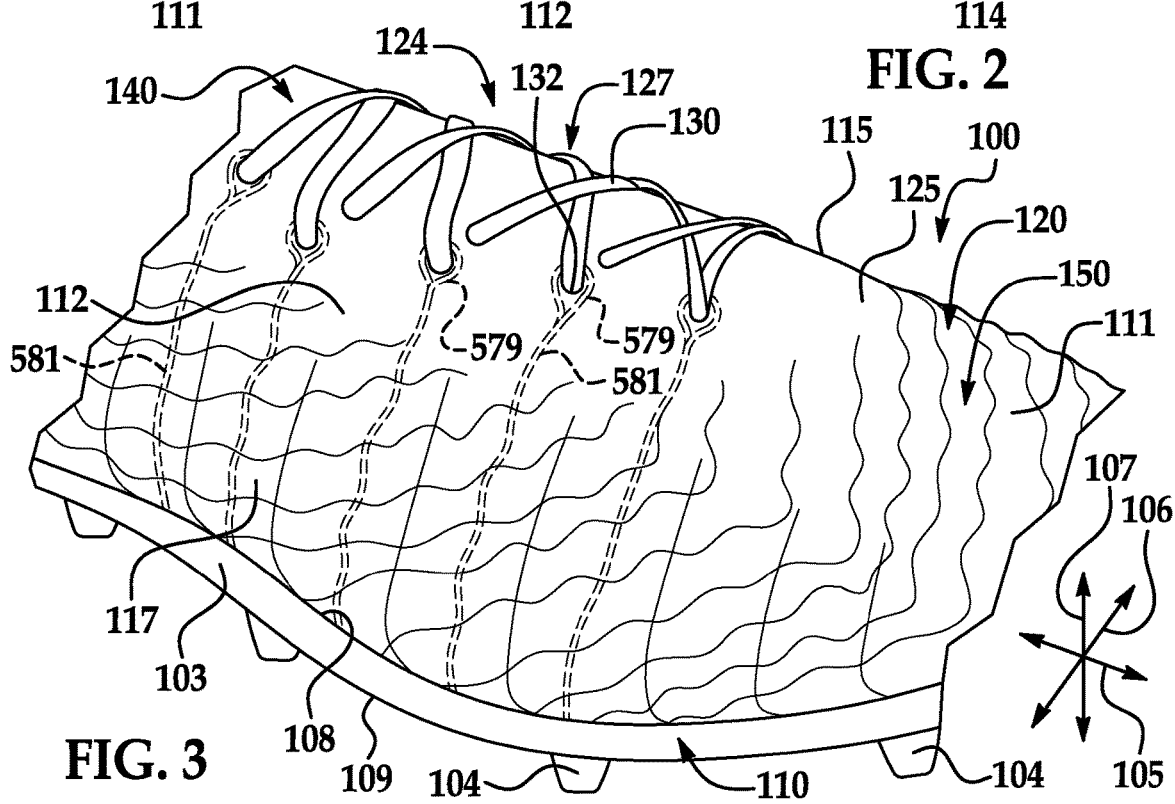
FIG. 3 is a lateral perspective view of the article of footwear of FIG. 1.

Referring initially to FIGS. 1-3, an article of footwear 100 is illustrated according to exemplary embodiments. Footwear 100 is disclosed as having a general configuration suitable for soccer, football, or other activities involving kicking. Concepts associated with the footwear 100 may also be applied to a variety of other athletic footwear types, including baseball shoes, basketball shoes, cross-training shoes, cycling shoes, sprinting shoes, tennis shoes, and hiking boots, for example. The concepts may also be applied to footwear types that are generally considered to be non-athletic, including dress shoes, loafers, sandals, and work boots. The concepts disclosed herein apply, therefore, to a wide variety of footwear types.

For reference purposes, footwear 100 may be divided into three general regions: a forefoot region 111, a midfoot region 112, and a heel region 114. Forefoot region 111 can generally include portions of footwear 100 corresponding with forward portions of the wearer's foot, including the toes and joints connecting the metatarsals with the phalanges. Midfoot region 112 can generally include portions of footwear 100 corresponding with middle portions of the wearer's foot, including an arch area. Heel region 114 can generally include portions of footwear 100 corresponding with rear portions of the wearer's foot, including the heel and calcaneus bone.

Footwear 100 can also include a medial side 115 and a lateral side 117. Medial side 115 and lateral side 117 can extend through forefoot region 111, midfoot region 112, and heel region 114 in some embodiments. Medial side 115 and lateral side 117 can correspond with opposite sides of footwear 100. More particularly, medial side 115 can correspond with an inside area of the wearer's foot and can face toward the wearer's other foot. Lateral side 117 can correspond with an outside area of the wearer's foot and can face away from the wearer's other foot.

Forefoot region 111, midfoot region 112, heel region 114, lateral side 117, and medal side 115 are not intended to demarcate precise areas of footwear 100. Rather, forefoot region 111, midfoot region 112, heel region 114, lateral side 117, and medial side 115 are intended to represent general areas of footwear 100 to aid in the following discussion. These terms can also be used in reference to individual components of footwear 100.

Footwear 100 can also extend along various directions. For example, as shown in FIGS. 1-3, footwear 100 can extend along a longitudinal direction 105 as well as a transverse direction 106. Also, as shown in FIGS. 2 and 3, footwear 100 can extend along a vertical direction 107. Longitudinal direction 105 can extend generally between heel region 114 and forefoot region 111. Transverse direction 106 can extend generally between lateral side 117 and medial side 115. Also, vertical direction 107 can extend substantially perpendicular to both longitudinal direction 105 and transverse direction 106.

Generally, footwear 100 can include a sole structure 110 and an upper 120. Upper 120 can receive the wearer's foot and secure footwear 100 to the wearer's foot whereas sole structure 110 can extend underneath upper 120 and provide cushioning, traction, and/or support for the wearer's foot.

As shown in FIGS. 2-3, sole structure 110 can be secured to upper 120 and can extend underneath the wearer's foot. Sole structure 110 can include an attachment area 108 that faces upper 120 and that is fixed to upper 120. Attachment area 108 can be adhesively attached, lasted, or otherwise attached to upper 120. Also, sole structure 110 can include an outer periphery surface 103 that extends about footwear 100 and that extends in the vertical direction 107 between the upper 120 and the ground. Sole structure 110 can further include a ground engaging surface 109 that opposes the ground or floor. In some embodiments, ground engaging surface 109 can be defined by an outsole. Sole structure 110 can additionally include a midsole that includes padding, foam, fluid-filled bladders, or other components that provide cushioning, dampening of impact loads, and the like.

Also, in some embodiments, sole structure 110 can have one or more projections, such as cleats 104. In other embodiments, sole structure 110 can include ribs or other bodies that project from ground engaging surface 109.

As shown in FIGS. 2-3, upper 120 can extend generally upward in the vertical direction 107 from attachment area 108, between medial side 115 and lateral side 117 of sole structure 110, and longitudinally from forefoot region 111 to heel region 114 of sole structure 110. Upper 120 can define a void or cavity 122 within footwear 100. Stated differently, upper 120 can include an inner surface 123 that defines cavity 122. Cavity 122 can receive a foot of a wearer. Upper 120 can additionally include an outer surface 125 that faces opposite inner surface 123. Upper 120 can also define a collar 128 with an upper edge 129 that defines a collar opening 121. Collar opening 121 can provide access to cavity 122 and can allow passage of the foot into and out of upper 120.

Upper 120 can also include a throat 124 that extends in the longitudinal direction 105 between forefoot region 111 and collar 128, and in the transverse direction 106 between medial side 115 and lateral side 117. In some embodiments, throat 124 can include a tongue. In some embodiments, tongue can be attached to forefoot region 111 of upper 120 and can be detached from medial side 115 and/or lateral side 117. In other embodiments, such as the embodiments of FIGS. 1-3, upper 120 can be substantially continuous between medial side 115 and lateral side 117 across throat 124. As such, upper 120 can be "sock-like" and "tongueless."

Additionally, in some embodiments, footwear 100 can include a securement element 127, such as a shoelace, cable, wire, strap, buckle, or other suitable implements for securing upper 120 to the wearer's foot. In other embodiments, such as the embodiment of FIGS. 1-3, footwear 100 can be more "sock-like," "lace-less," and/or otherwise without a securement element. In some embodiments, upper 120 can constrict and compress against the wearer's foot for securing footwear 100 to the wearer's foot.

As shown in the embodiments of FIGS. 1-3, upper 120 can include a shoelace 130. Shoelace 130 can be laced through a plurality of eyelets 132 included in upper 120, proximate throat 124. In other additional embodiments, shoelace 130 can be secured to upper 120 via hooks or other lace receiving elements.

In some embodiments, upper 120 can extend both over the wearer's foot and underneath the wearer's foot. Portions of upper 120 extending underneath the wearer's foot and can be layered and attached to sole structure 110. Additionally, it will be appreciated that any underfoot part of the upper 120 can be referred to as a "strobel," a "strobel sock," or a "strobel part."

In further configurations, upper 120 may include additional elements. For example, upper 120 can include a toe guard in forefoot region 101 that is formed of a wear-resistant material. Upper 120 can additionally include logos, trademarks, symbols, and placards with care instructions and material information. Those having ordinary skill in the art will appreciate that upper 120 can include still further elements without departing from the scope of the present disclosure.

Also, footwear 100 can additionally include a sockliner that extends underneath the wearer's foot. For example, the sockliner can be a removable insert that is provided within the cavity 122 and that provides a padded surface underneath the wearer's foot. In some embodiments, a strobel of upper 120 can be disposed between the sockliner and sole structure 110.

Furthermore, in some embodiments, upper 120 can include a plurality of different regions, areas, or zones that differ in one or more characteristics. For example, upper 120 can include a plurality of regions that differ in surface textures. Also, in some embodiments, footwear 100 can include features disclosed in U.S. patent application Ser. No. 14/851,920, entitled "Article of Footwear with Knitted Component Having Plurality of Graduated Projections", which was co-filed with the present application on Sep. 11, 2015, the disclosure of which is incorporated by reference in its entirety.

In some embodiments, upper 120 can include one or more substantially smooth areas 140 and one or more textured areas 150. It will be appreciated that the embodiment of textured area 150 is shown schematically in FIG. 1 with a group of ovals that are each filled with stippling. FIGS. 2 and 3 illustrate upper 120 generally in a topographic fashion with textured area 150 illustrated with contoured lines. In contrast, smooth areas 140 are illustrated in FIGS. 2 and 3 either with substantially straight lines or with unlined areas.

Smooth areas 140 can generally conform to the cavity 122 within upper 120 and generally conform to the wearer's foot. Also, smooth area 140 can be flat and planar, or smooth area 140 can exhibit some degree of curvature. However, any curvature of smooth area 140 can substantially conform to the outer boundary of the cavity 122 within upper 120. Also, smooth area 140 of upper 120 can conform and nest against the wearer's foot. With this arrangement, smooth area 140 provides an approximately even and/or regular surfaced across portions of upper 120. Moreover, in some embodiments, smooth area 140 can define a reference boundary 142, which is indicated, for example, in FIGS. 4 and 5, and which substantially corresponds to the cavity 122 within upper 120. Thus, the reference boundary 142 defined by smooth area 140 can also substantially conform to the outer surface curvature of the wearer's foot.

In contrast to smooth areas 140, textured areas 150 can include projections and/or recesses that produce surface height variations across upper 120. For example, in some embodiments, the textured areas 150 can include bumps, waves, corrugations, ripples, scales, undulations or other surface features. In some embodiments represented in FIGS. 4 and 5, textured area 150 can include a plurality of projection structures 151 that project outwardly from the cavity 122 and outward from the reference boundary 142 defined by smooth area 140. Also, in some embodiments, textured area 150 can further include a plurality of recess structures 152 that recess into cavity 122 and inward from the reference boundary 142.

The projection structures 151 and recess structures 152 can have any suitable arrangement within textured area 150. For example, in some embodiments, the projection structures 151 and recess structures 152 can be disposed in an alternating arrangement. Thus, a typical recess structure 152 can be disposed between at least two projection structures 151. Similarly, a typical projection structure 151 can be disposed between at least two recess structures 152. This alternating arrangement can be repeated across the textured area 150.

Furthermore, in some embodiments, different projection structures 151 can differ in one or more dimensions. For example, the different projection structures 151 can differ in height, width, radius, or other dimensions. Similarly, in some embodiments, different recess structures 152 can differ in one or more dimensions. For example, different recess structures 152 can differ in depth, width, radius, or other dimensions.

Smooth areas 140 and textured areas 150 can be included on predetermined portions of upper 120. For example, in some embodiments, smooth areas 140 can be located where more support, stiffness, and/or stretch resistance is needed. In some embodiments shown in FIGS. 1-3, smooth areas 140 can be located substantially in heel region 114. In additional embodiments, smooth areas 140 can be disposed proximate the attachment area 108 of sole structure 110, and the smooth areas 140 can facilitate attachment (i.e., lasting) of the sole structure 110 to the upper 120. Furthermore, in some embodiments, smooth areas 140 can be located in throat 124 of upper 120. In contrast, textured areas 150 can be located on medial side 115 and lateral side 117 of midfoot region 112 as well as in forefoot region 111 in some embodiments.

In some embodiments, the locations of smooth areas 140 and/or textured areas 150 can be determined based on the sport or activity for which the article of footwear will be used. Thus, in some embodiments, textured areas 150 can be included in portions of upper 120 used for kicking, passing, trapping, or otherwise controlling a ball. Still further, in some embodiments, textured areas 150 can also be included on the collar 128, for example, to cover at least one malleolus of the wearer. In some embodiments, textured areas 150 can increase the outer surface area of upper 120 for grip of a ball or other object. Also, textured areas 150 can provide the wearer with better control and tactile sensation of the ball. Furthermore, textured areas 150 can distribute pressure relatively evenly across upper 120. In addition, textured areas 150 can be configured for directing drainage of rainwater or other liquids off of upper 120.

Moreover, in some embodiments, the textured area 150 can be resilient and deformable. For example, in some embodiments, textured area 150 can deform and flatten out when textured area 150 impacts a ball or other object. Then, textured area 150 can resiliently recover back to the more textured state. Accordingly, this resilient deformation can dampen and dissipate the impact energy. Thus, the wearer may be able to more reliably trap a soccer ball, the wearer may be better able to direct the ball when kicking and passing, and/or the textured area 150 can provide increased tactile feel of the ball when controlling the ball. Also, textured area 150 can provide padding and/or cushioning for the wearer.

Configurations of Smooth Area and Textured Area of Upper

Figure 6:
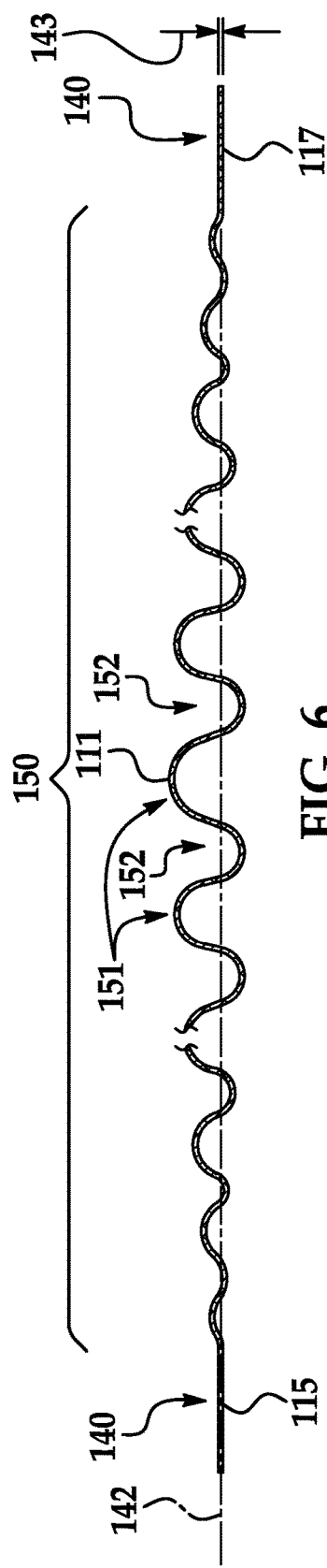
FIG. 6 is a section view of another portion of the upper of the article of footwear of FIG. 1.

Embodiments of substantially smooth area 140 and textured area 150 will now be discussed in detail. FIGS. 4-6 illustrate smooth areas 140 and textured areas 150 in detail according to exemplary embodiments.

A portion of smooth area 140 is shown in FIGS. 4-6 according to some embodiments. In some embodiments, smooth area 140 can be regular and even and can define reference boundary 142. Also, in some embodiments, smooth area 140 can have a substantially constant thickness 143 (FIG. 5), which is measured between inner surface 123 and outer surface 125 of upper 120. Accordingly, smooth area 140 can layer over, cover, and/or nest against the wearer's foot.

In contrast, textured area 150 can include the plurality of projection structures 151. In some embodiments, the textured area 150 can have substantially the same thickness 143 as the smooth area 140. As representative examples, the plurality of projections structures 151 illustrated in FIGS. 4 and 5 include a first projection structure 154, a second projection structure 156, a third projection structure 158, and a fourth projection structure 160. In some embodiments, the plurality of projection structures 151 can resemble rounded bumps or bulges.

More specifically, as shown in FIGS. 4 and 5, projection structures 151 can each include an apex 153 and a side portion 155. Also, as shown in FIG. 4, side portion 155 can be three-dimensionally curved, and side portion 155 can terminate at the apex 153. Also, as shown in FIG. 5, apex 153 can be projected outward from the reference boundary 142 at a height 162. In some embodiments, the height 162 of the projection structures 151 can range between approximately 0.002 inches and 0.5 inches. Furthermore, as shown in FIG. 5, projection structure 151 can have a width 163, which is measured between opposing areas of side portion 155, proximate the reference boundary 142. In some embodiments, the width 163 of projection structures 151 can range between approximately 0.002 inches and 0.5 inches.

Furthermore, as shown in FIGS. 4 and 5, projection structure 151 can define a respective convex exterior portion 164 of outer surface 125 of upper 120. Portion 164 can also be referred to as a "convex exterior surface" of projection structure 151. Additionally, projection structure 151 can define a respective concave interior portion 166 of inner surface 123 of upper 120. Portion 166 can also be referred to as a "concave interior surface" of projection structure 151.

Textured area 150 of upper 120 can also include the plurality of recess structures 152. As representative examples, the plurality of recess structures 152 illustrated in FIGS. 4 and 5 include a first recess structure 168, a second recess structure 170, and a third recess structure 172. In some embodiments, the plurality of recess structures 152 can resemble rounded divots or pockets.

More specifically, as shown in FIGS. 4 and 5, recess structures 152 can each include a nadir 174 and a side portion 176. Also, as shown in FIG. 4, side portion 176 can be three-dimensionally curved, and side portion 176 can terminate at the nadir 174. Also, as shown in FIG. 5, nadir 174 can be recessed inward from the reference boundary 142 at a depth 178. In some embodiments, the depth 178 of the recess structures 152 can range between approximately 0.002 inches and 0.5 inches. Furthermore, as shown in FIG. 5, recess structure 152 can have a width 179, which is measured between opposing areas of side portion 176, proximate the reference boundary 142. In some embodiments, the width 179 of recess structures 152 can range between approximately 0.1 inches and 0.5 inches.

Furthermore, as shown in FIGS. 4 and 5, recess structure 152 can define a respective concave exterior portion 180 of outer surface 125 of upper 120. Portion 180 can also be referred to as a concave exterior surface of recess structure 152. Additionally, recess structure 152 can define a respective convex interior portion 182 of inner surface 123 of upper 120. Portion 182 can also be referred to as a convex interior surface of recess structure 152.

As shown in FIGS. 4-6, projection structures 151 and recess structures 152 can be disposed in an alternating arrangement. Stated differently, the recess structures 152 can be disposed between respective pairs of projection structures 151. Similarly, the projection structures 151 can be disposed between respective pairs of recess structures 152. More specifically, as shown in FIGS. 4 and 5, first recess structure 168 can be disposed between first projection structure 154 and second projection structure 156, second recess structure 170 can be disposed between second projection structure 156 and third projection structure 158, and third recess structure 172 can be disposed between third projection structure 158 and fourth projection structure 160.

As shown in FIG. 4, textured area 150 can include a transition 169 between a recess structure 152 and a projection structure 151 that are adjacent to each other. In some embodiments, transition 169 can be at partially co-extensive with reference boundary 142. Transition 169 can also be referred to as an "adjacent area" to projection structure 151 and/or recess structure 152.

Figure 7:
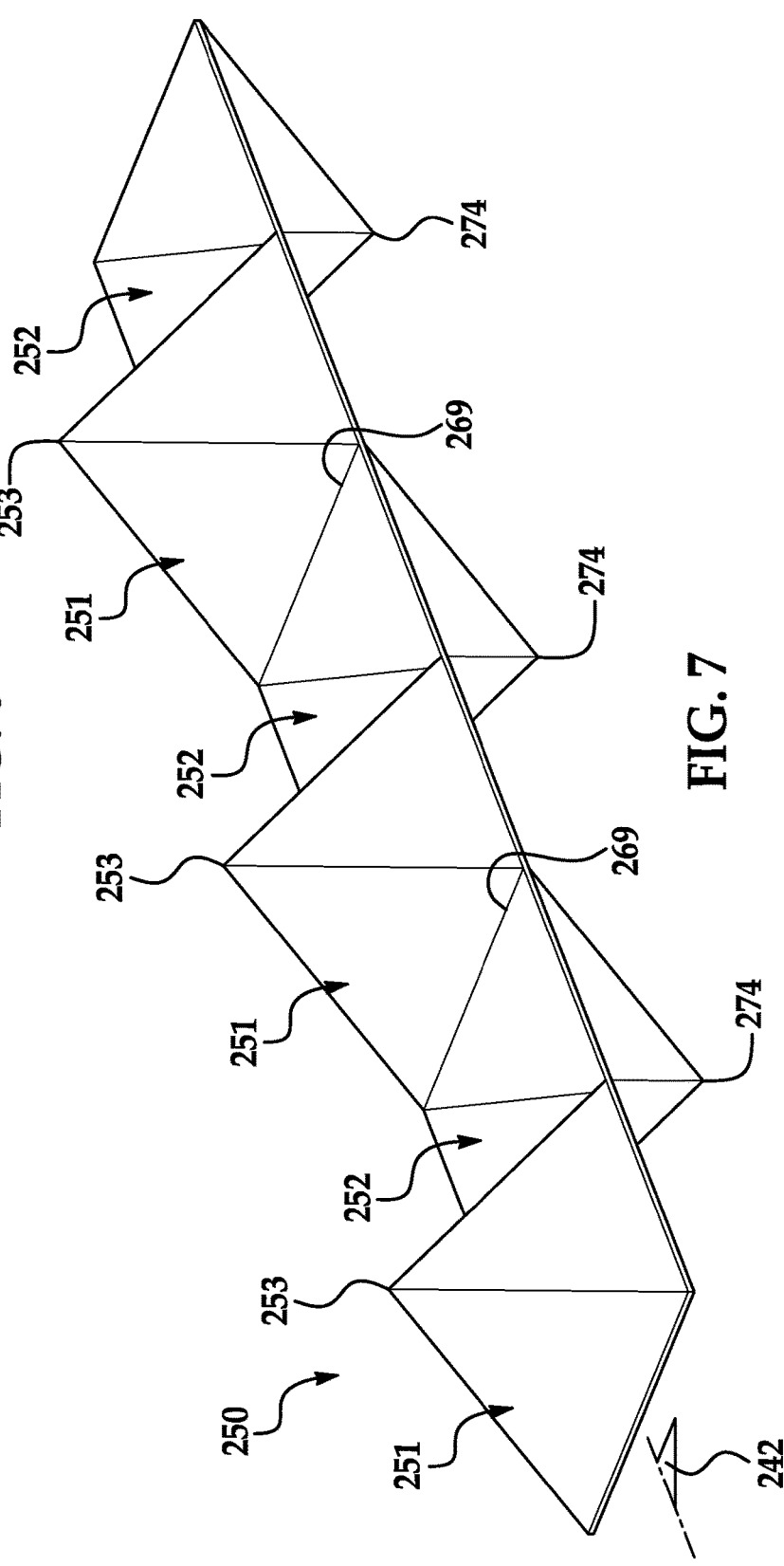
FIG. 7 is a detail perspective view of a textured area of the article of footwear according to additional embodiments of the present disclosure.

The features of the projection structures can vary in a number of ways. For example, FIG. 7 illustrates a plurality of projection structures 251 and a plurality of recess structures 252 according to additional embodiments. Projection structures 251 and recess structures 252 can share corresponding features to those of FIGS. 4-6. Those corresponding features are indicated in FIG. 7 with corresponding reference numbers increased by 100.

As shown, in some embodiments, projection structures 251 can include at least one flat surface. In some embodiments, projection structures 251 can include four flat surfaces that meet at an apex 253. Accordingly, in some embodiments, projection structures 251 can be hollow and pyramidal. Likewise, in some embodiments, recess structures 252 can include at least one flat surface. In some embodiments, recess structures 252 can include four flat surfaces that meet at a nadir 274. Accordingly, in some embodiments, recess structures 252 can be hollow and inversely pyramidal. Furthermore, transitions 269 between adjacent pairs of projection structures 251 and recess structures 252 can be coextensive with the reference boundary 242. Also, in some embodiments, the transitions 269 can be linear.

Referring now to FIG. 8, additional embodiments of projection structures 351 of textured surface 350 are illustrated. Projection structures 351 can share corresponding features to those of FIGS. 4-6. Those corresponding features are indicated in FIG. 8 with corresponding reference numbers increased by 200.

As shown, in some embodiments, textured surface 350 can include rounded, hollow, convex projection structures 351, similar to projection structures 151 of FIG. 4. Textured surface 350 can also include transitions 369 that are defined between adjacent pairs of projection structures 351. In some embodiments, transitions 369 can be substantially coextensive with reference boundary 342. Transitions 369 can, thus, substantially conform to the cavity 322 within upper 320. Furthermore, in some embodiments, projection structures 351 can project away from the adjacent transition 369. It will also be appreciated that textured surface 350 projects in a single direction relative to cavity 322 within upper 320. Stated differently, textured surface 350 of FIG. 8 projects outwardly from cavity 322 and does not include recess structures of the type disclosed in connection with FIGS. 4 and 7.

Referring back to FIGS. 1-3, textured surfaces 150 will be additionally discussed. As shown, in some embodiments, projection structures 151 and recess structures 152 can be arranged in rows. These rows can extend across the upper 120 in any direction. The rows can also extend along a linear axis or along a curved axis across upper 120. For example, as shown in the embodiment of FIG. 2, projection structures 151 can be arranged in a plurality of rows 173 that curve from medial side 115, across forefoot region 111 toward lateral side 117. In other embodiments, rows 173 can extend generally in the vertical direction 107, between the throat 124 and the sole structure 110. Also, in some embodiments, rows 173 can extend in the longitudinal direction 105 and/or in transverse direction 106. In other embodiments, projection structures 151 and recess structures 152 can be randomly arranged across upper 120.

Moreover, in some embodiments, the plurality of projection structures 151 within textured area 150 can vary in one or more dimensions. For example, the heights of the projection structures 151 can vary across textured area 150. Specifically, as shown in the exemplary embodiment of FIG. 5, the height 162 of first projection structure 154 can be greater than a height 184 of second projection structure 156. Furthermore, the height 184 of second projection structure 156 can be greater than a height 186 of third projection structure 158. Also, the height 186 of third projection structure 158 can be greater than a height 188 of fourth projection structure 160. Additionally, in some embodiments, the width 163 of projection structures 151 can also vary between different projection structures 151.

Likewise, in some embodiments, one or more dimensions of the plurality of recess structures 152 can vary across textured area 150. For example, as shown in FIG. 5, the depth 178 of first recess structure 168 can be greater than a depth 190 of second recess structure 170. Also, the depth 190 of second recess structure 170 can be greater than a depth 192 of third recess structure 172. Additionally, in some embodiments, the width 179 of recess structures 152 can also vary between different recess structures 152.

In some embodiments, the heights of the projection structures 151 can vary such that the projection structures 151 are arranged in a gradient pattern. For example, the heights of the projection structures 151 can vary gradually from projection structure 151 to adjacent projection structure 151 along the gradient pattern. In some embodiments, those projection structures 151 that are more centrally located within textured area 150 can be the tallest, and the projection structures 151 can be gradually shorter the closer those projection structures 151 are to the smooth area 140. Accordingly, as shown in FIG. 5, the first projection structure 154 can have the greatest height 162 relative to the second, third, and fourth projection structures 156, 158, 160. The second projection structure 156 can have a slightly smaller height 184, the third projection structure 158 can have a height 186 that is smaller still, and the fourth projection structure 160 can have the smallest height 188. In some embodiments, fourth projection structure 160 can be located proximate a transition 194, which is defined between textured area 150 and smooth area 140 of upper 120.

Furthermore, in some embodiments, the depths of the recess structures 152 can vary such that the recess structures 152 are arranged in a gradient pattern. For example, the depths of the recess structures 152 can vary gradually along the gradient pattern. In some embodiments, those recess structures 152 that are more centrally located within textured area 150 can be the deepest, and the recess structures 152 can be gradually shallower the closer those recess structures 152 are to the smooth area 140. Accordingly, as shown in FIG. 5, the first recess structure 168 can have the greatest depth 178 relative to the second and third recess structures 170, 172. The second recess structure 170 can have a slightly smaller depth 190, and the third recess structure 172 can have the shallowest depth 192.

Similarly, in some embodiments represented in FIG. 5, the widths 163 of the projection structures 151 can vary such that the projection structures 151 are arranged in a gradient pattern. Stated differently, the widths 163 of the projection structures 151 can vary gradually from projection structure 151 to adjacent projection structure 151 along the gradient pattern. Likewise, the widths 179 of the recess structures 152 can vary such that the recess structures 152 are arranged in a gradient pattern. Stated differently, the widths 179 of the recess structures 152 can vary gradually from recess structure 152 to adjacent recess structure 152 along the gradient pattern.

FIG. 6 further illustrates this gradient pattern within textured area 150. As shown, medial side 115 of upper 120 and lateral side 117 of upper 120 can both include respective smooth areas 140, and textured area 150 can extend across forefoot area 111. As shown, the tallest projection structures 151 and the deepest recess structures 152 can be located centrally within forefoot area 111. The projection structures 151 can be gradually shorter and the recess structures 152 can be gradually shallower in the direction moving toward the medial side 115. Likewise, the projection structures 151 can be gradually shorter and the recess structures 152 can be gradually shallower in the direction moving toward the lateral side 117. In additional embodiments, the gradient pattern of textured area 150 can be arranged such that projection structures 151 are gradually shorter in the longitudinal direction 105. In further embodiments, the gradient pattern of textured area 150 can be arranged such that projection structures 151 are gradually shorter in the vertical direction 107.

The gradient arrangement within textured area 150 can provide certain benefits. For example, the gradient arrangement can allow textured area 150 to distribute forces and/or deform in a predetermined manner when impacting an object. More specifically, in some embodiments, taller projection structures 151 can deform readily when impacting a ball, and forces can be distributed through textured area 150 such that the gradually shorter projection structures 151 can resist deformation. The gradient pattern can also enhance the force dampening properties of textured area 150. Furthermore, in some embodiments, the gradient pattern of projection structures 151 can provide the wearer with enhanced grip for controlling a ball or other object. Moreover, the gradient pattern can allow upper 120 to channel water or other fluids away from upper 120 in a predetermined manner. Still further, the gradient pattern can make textured area 150 more aesthetically appealing.

FIG. 9 illustrates the arrangement of the textured areas 450 of the upper 420 according to additional embodiments. The upper 420 is shown schematically for purposes of clarity. The embodiment of FIG. 9 can include components and features that are similar to the embodiments discussed above with respect to FIGS. 1-6. Those components that correspond to those of FIGS. 1-6 are indicated with corresponding reference numbers increased by 300.

As shown, upper 420 can include a plurality of textured areas 450 and one or more smooth areas 440. Textured areas 450 are indicated schematically with stippling, and the stippling is absent from smooth areas 440. Also, inset within FIG. 9 is a representative arrangement of projection structures 451 and recess structures 452 within textured areas 450. Thus, textured area 450 can be similar to the embodiments of FIGS. 4-6. However, it will be appreciated that textured areas 450 can be similar to the embodiments of FIG. 7 or 8 without departing from the scope of the present disclosure.

In some embodiments, upper 420 can include a lateral textured area 443, a medial textured area 445, and a malleolus textured area 441. Lateral textured area 443, medial textured area 445, and malleolus textured area 441 can be spaced apart from each other with substantially smooth areas 440 spanning between.

Lateral textured area 443 can be disposed in the forefoot region 411, on the lateral side 417 of upper 420 so as to correspond generally with the outer toes and metatarsals of the wearer's foot. Medial textured area 445 can be disposed in the midfoot region 412, on the medial side 415 so as to correspond generally with the arch of the wearer's foot. Malleolus textured area 441 can be disposed generally in the heel region 414, proximate the collar 428, on the lateral side 417 so as to correspond to the lateral malleolus of the wearer's ankle. Although not shown in FIG. 9, upper 420 can also include a similar textured area on the malleolus area of the medial side 415.

Projection structures 451 and recess structures 452 can be arranged in a gradient as discussed above. For example, projection structures 451 can gradually reduce in height across textured area 450. Projection structures 451 can be shorter and shorter in a direction moving toward adjacent smooth area 440 to define a relatively smooth transition between textured areas 450 and smooth areas 440. Also, in some embodiments, recess structures 452 can gradually reduce in depth across textured area 450 to define a relatively smooth transition between textured areas 450 and smooth areas 440.

This gradient arrangement is illustrated schematically in FIG. 9. For example, the taller projection structures 451 within lateral textured area 443 can be disposed in a high texture area 433, which is illustrated with dense stippling, and which can be centrally located within lateral textured area 443. The shorter projection structures 451 can be disposed in a reduced texture area 437, which is illustrated with less dense stippling, and which can surround high texture area 433. Thus, reduced texture area 437 can define a transition between high texture area 433 and adjacent smooth area 440.

Likewise, the taller projection structures 451 within medial textured area 445 can be disposed in a high texture area 435, which is illustrated with dense stippling, and which can be centrally located within medial textured area 445. The shorter projection structures 451 can be disposed in a reduced texture area 439, which is illustrated with less dense stippling, and which can at least partially surround high texture area 435. In some embodiments, reduced texture area 439 can define a transition between high texture area 435 and adjacent smooth area 440.

Upper 120 can also include indicia that visually indicate the gradient pattern of the textured area 450. For example, in some embodiments, the upper 420 can vary in color across upper 420 for this purpose. This is represented schematically in FIG. 9 with the different stippling patterns that are shown. In some embodiments, for example, high texture area 433 and high texture area 435 can be colored darker than reduced texture area 437 and reduced texture area 439. Textured areas 450 can also be colored darker than smooth areas 440. Also, in some embodiments, textured area 450 can appear as a gradient of gradually changing indicia that corresponds to the gradient of gradually taller projection structures 451 within textured area 450. For example, in some embodiments, the smooth areas 440 can have a light shade of a color, and the shade of that color can darken as the upper 420 spans into the textured areas 450. Furthermore, within the textured area 450, the shade of that color can gradually darken proximate the high texture area 433 and the high texture area 435. In additional embodiments, projection structures 451 can have a single color and surrounding areas can have a different color. As such, larger projection structures 451 can be more visually apparent than smaller projection structures 451.

Figure 10:
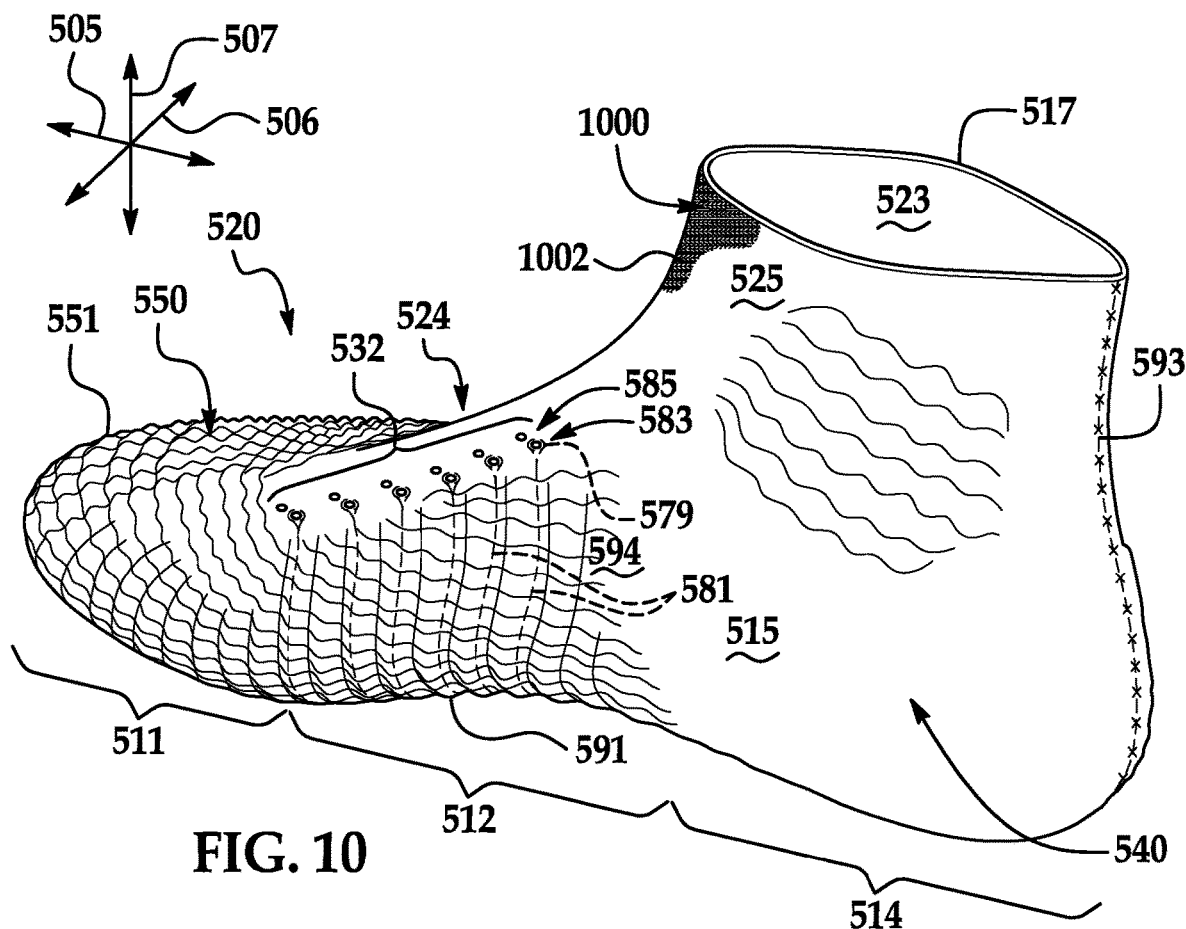
FIG. 10 is a medial perspective view of an upper of the article of footwear according to additional embodiments of the present disclosure.
Figure 11:
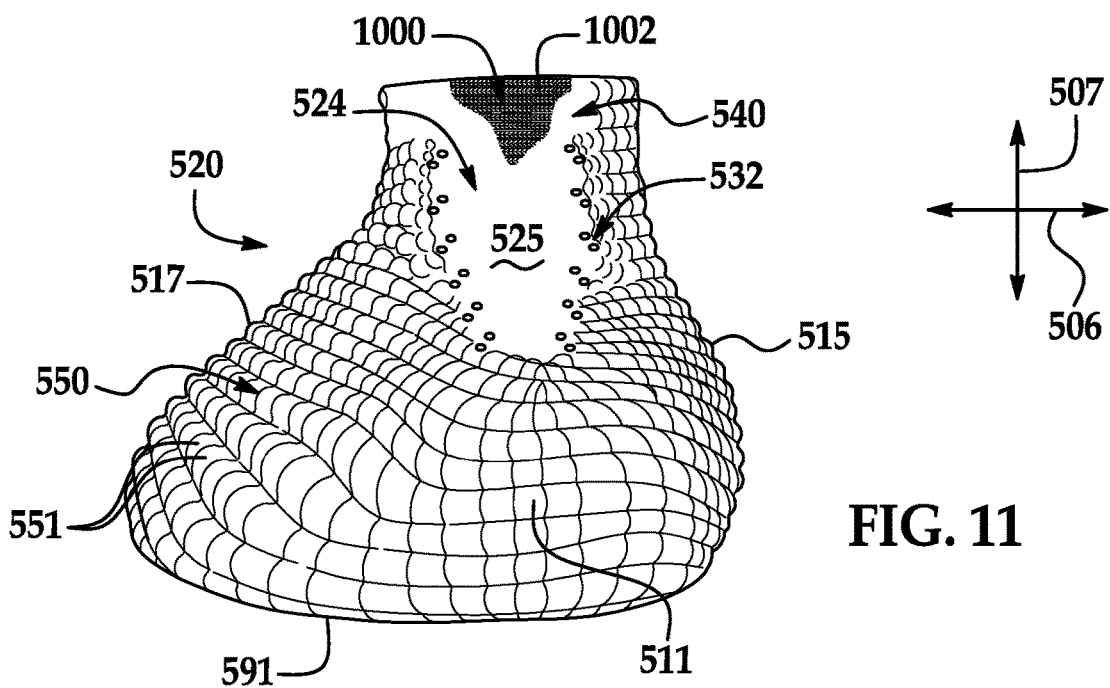
FIG. 11 is a front view of the upper of FIG. 10.
Figure 12:
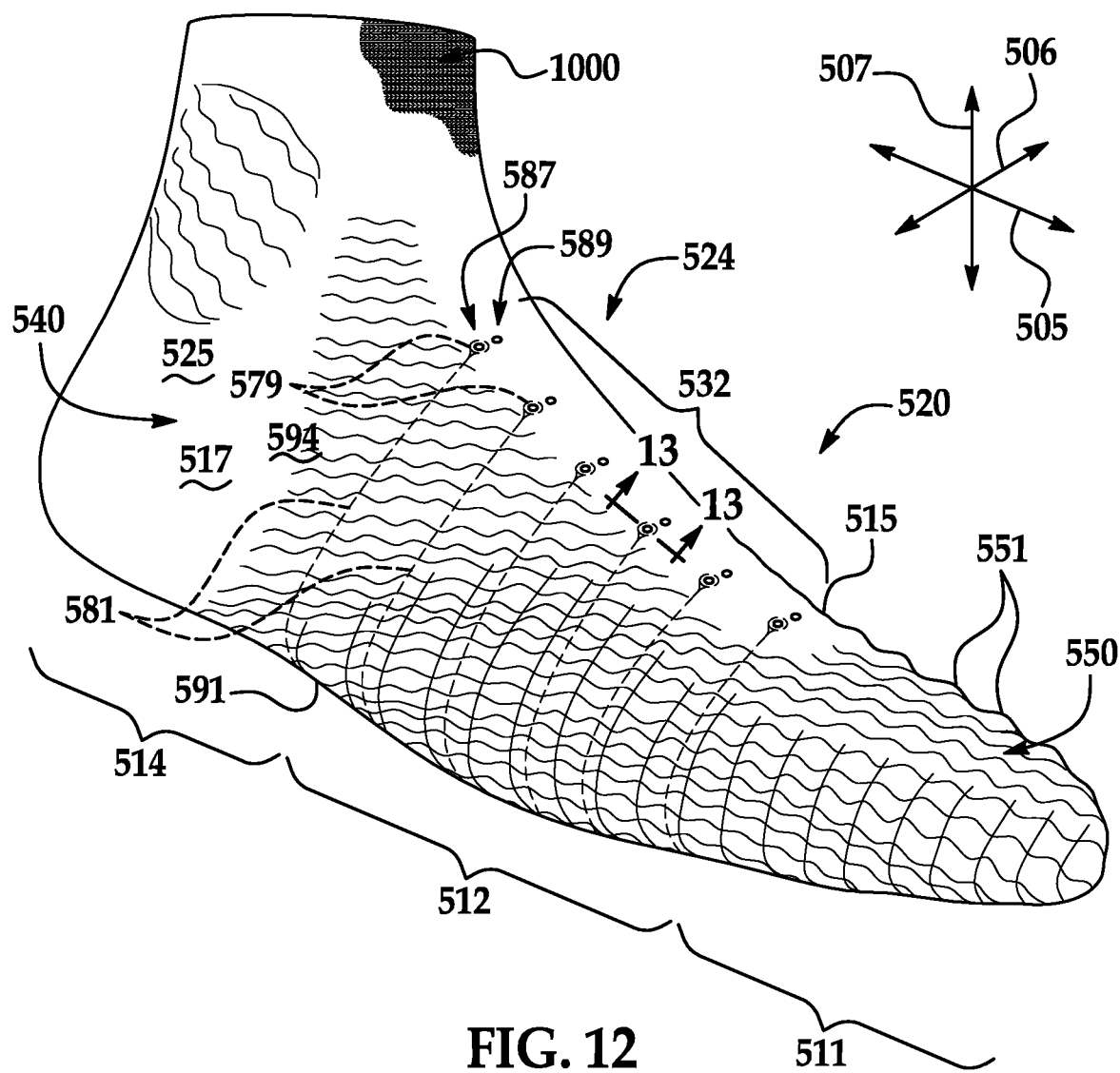
FIG. 12 is a lateral perspective view of the upper of FIG. 10.

Referring now to FIGS. 10-12, upper 520 is illustrated according to additional embodiments. Upper 520 is shown without a sole structure for purposes of clarity, but it will be appreciated that a sole structure can be attached without departing from the scope of the present disclosure. The embodiments of FIGS. 10-12 can include components and features that are similar to the embodiments discussed above. Those components that correspond to those of FIGS. 1-6 are indicated with corresponding reference numbers increased by 400.

Upper 520 can include one or more substantially smooth areas 540 and one or more textured areas 550. For example, smooth areas 540 of upper can be included generally in heel region 514 and in throat 524. Also, textured areas 550 can be included generally on medial side 515 and lateral side 517 of midfoot region 512 and in forefoot region 511.

Also, in some embodiments, textured area 550 can include projection structures 551 as shown. Projection structures 551 can be configured as rounded bumps, similar to the embodiments of FIGS. 4-6 and 8. In other embodiments, projection structures 551 can include at least one flat surface, similar to the embodiments of FIG. 7. Projection structures 551 can also have other shapes and configurations without departing from the scope of the present disclosure. Furthermore, in some embodiments, textured area 550 can additionally include recess structures, similar to the embodiments of FIGS. 4-7.

In some embodiments, projection structures 551 can be arranged in a gradient as discussed above. More specifically, in some embodiments, the heights of the projection structures 551 can vary across textured area 550. In some embodiments, the projection structures 551 in the forefoot region 511 can be the tallest. Also, projection structures 551 can gradually reduce in height in a direction moving rearward toward smooth areas 540 at heel region 514 and/or upward toward throat 524. In some embodiments, projection structures 551 can gradually reduce in height such that textured area 550 substantially blends into smooth area 540 at the transition 594 between textured area 550 and smooth area 540. Stated differently, the respective projection structures 551 can diminish across the textured area 550 approaching the smooth area 540.

Moreover, in some embodiments, the projection structures 551 can be arranged tallest to shortest in the vertical direction 507 such that relatively short projection structures 551 are disposed proximate a sole attachment area 591, where upper 520 attaches to a sole structure. Accordingly, the upper 520 can be smoother at sole attachment area 591, thus facilitating attachment of the sole structure.

Furthermore, upper 520 can include a plurality of eyelets 532, which can receive a shoelace or other similar securement device. As shown in FIG. 10, eyelets 532 can be arranged in a plurality of rows that extend generally in the longitudinal direction 505, along either side of throat 524. Specifically, as shown in the embodiment of FIG. 10, eyelets 532 can be arranged in an outer medial row 583 and an inner medial row 585. Furthermore, as shown in the embodiment of FIG. 12, eyelets 532 can be further arranged in an outer lateral row 587 and an inner lateral row 589.

Still further, in some embodiments, upper 520 can include one or more tensile elements 581. In some embodiments, tensile elements 581 can be elongate, flexible, and strong. Also, tensile elements 581 can extend across and can be attached to areas of upper 520 for providing support. More specifically, in some embodiments, tension within tensile elements 581 can allow the upper 520 to resist deformation, stretching, or otherwise provide support for the wearer's foot when running, jumping, kicking, or otherwise moving.

Figure 13:
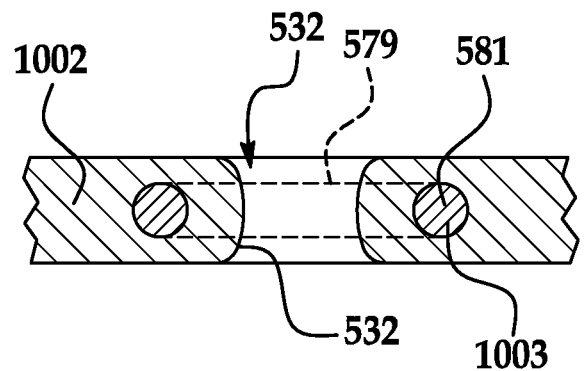
FIG. 13 is a section view of the upper taken along the line 13-13 of FIG. 12.
Figure 14:
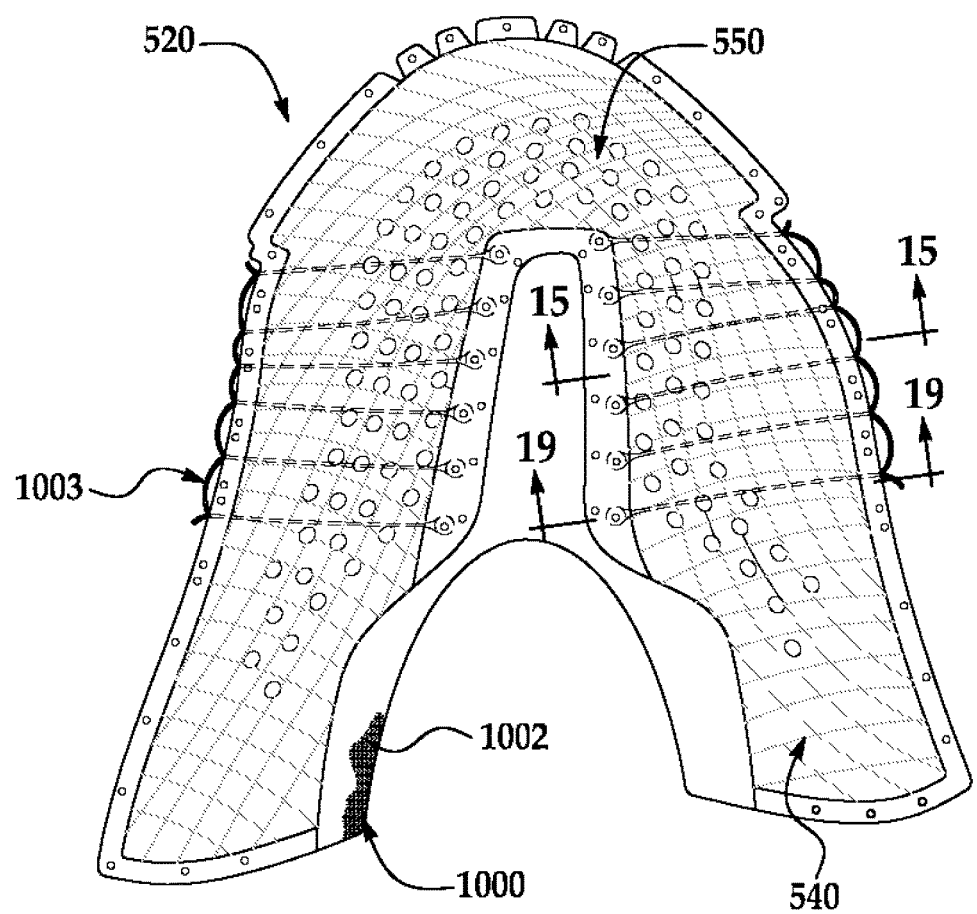
FIG. 14 is a plan view of the upper of FIG. 10.

It will be appreciated that upper 520 can include any number of tensile elements 581. Also, tensile elements 581 can be made of a variety of materials and can have a variety of shapes and dimensions. Also, tensile elements 581 can extend across any suitable portion of upper 520. In FIGS. 10-12, tensile elements 581 are shown extending away from sole attachment area 591 in the vertical direction 507 toward throat 524. In some embodiments, tensile elements 581 can extend away from sole attachment area 591 to predetermined eyelets 532. For example, in the embodiments of FIGS. 10-12, tensile element 581 can form a loop 579 that encircles an eyelet 532 in either the outer medial row 583 or the outer lateral row 587. One or more loops 579 can be disposed internally within upper 520 in some embodiments as represented in FIG. 13. Alternatively, loops 579 can extend out of upper 520 and can be external of upper 520 in some embodiments. When a shoelace extends through the eyelet 532, the shoelace can be received through the loop 579. Also, loop 579 can reinforce areas of upper 520 adjacent the eyelet 532.

Moreover, in some embodiments, upper 520 can include a seam 593 as shown, for example, in FIG. 10. Seam 593 can be defined where opposing edges of upper 520 are joined, for example, by stitching, adhesives, fasteners, or other attachment devices. In some embodiments, the opposing edges of upper 520 can be butted and secured together to define seam 593. In other embodiments, the opposing edges 520 can be overlapped and secured together to define seam 593. Furthermore, in some embodiments, seam 593 can be defined at heel region 514 so as to extend along the Achilles heel of the wearer.

Embodiments of Materials and Construction of Upper

The upper of the present disclosure can be constructed from any suitable materials. Also, the upper can be constructed from one or more parts. In some embodiments, the upper can be formed from multiple material elements (e.g., polymer foam, polymer sheets, leather, synthetic leather) that are joined together through stitching, adhesives, bonding, or fasteners, for example.

In other embodiments, the majority of the upper can be formed from a unitary, monolithic, single-body. As such, the upper can be constructed in an efficient manner and can include a relatively low number of parts. Additionally, the upper can flex with, conform against, and/or nest against the wearer's foot because of the single-body construction.

Figure 15:
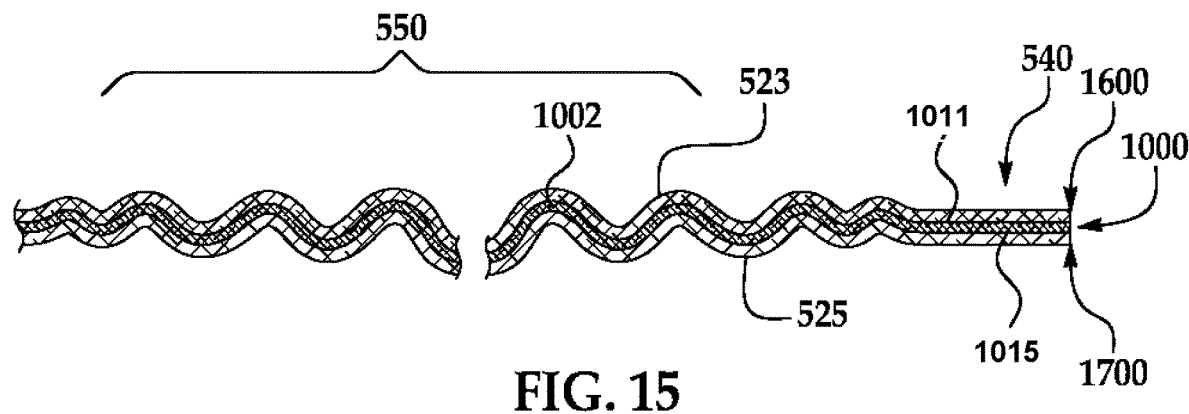
FIG. 15 is a section view of the upper taken along the line 15-15 of FIG. 14.
Figure 16:
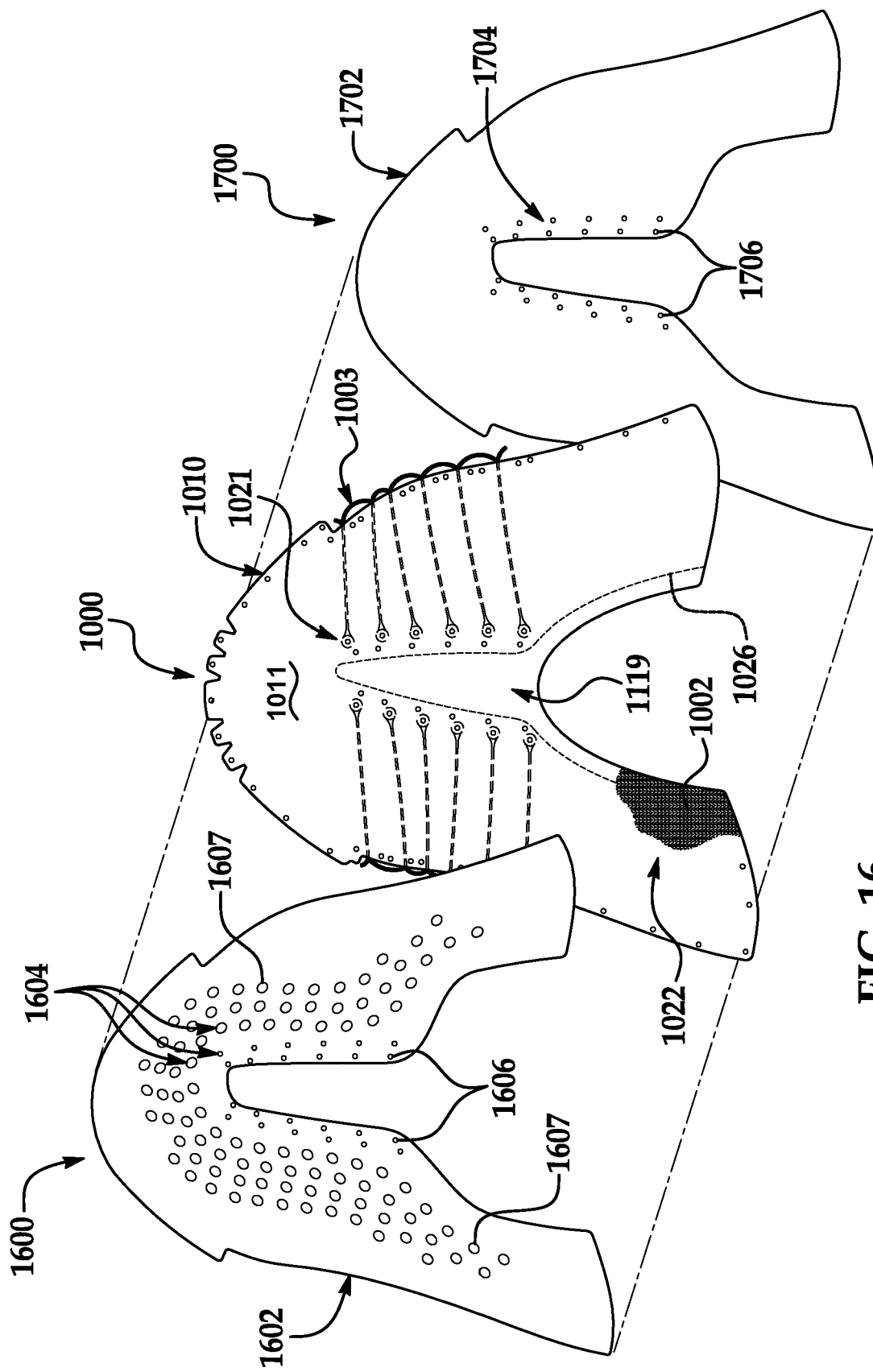
FIG. 16 is an exploded view of the upper of FIG. 10.

Furthermore, in some embodiments, the upper can be made from one or more sheet-like layers. As shown in the embodiment of FIGS. 15 and 16, for example, the upper can be constructed from a plurality of layers. In other embodiments, the upper can be made from a single layer.

Additionally, in some embodiments, the upper of the present disclosure can be at least partially formed from a textile element. Specifically, the upper can be at least partially formed via a knitting process in some embodiments. In other embodiments, the upper can be at least partially formed via a weaving process. As such, the upper can be lightweight, breathable, and soft to the touch. However, the textile can be constructed such that the upper is durable and strong. Moreover, the knitting or weaving processes can provide manufacturing efficiencies and can result in a relatively low amount of waste. Also, the textile can provide elasticity to the upper. For example, the textile can have some degree of elasticity due to the knitted or woven construction. Furthermore, in some embodiments, the textile can be knitted or woven from elastic and stretchable yarns, which further enhance the stretchiness of the upper.

The construction and materials of upper will be discussed according to exemplary embodiments with reference to FIG. 17, which corresponds to the upper 520 of FIGS. 10-12. These features can also be included in other embodiments without departing from the scope of the present disclosure. In some embodiments, upper 520 can include a textile in the form of a knitted component 1000 as shown FIG. 17. Knitted component 1000 can at least partially extend through forefoot region 111, midfoot region 512, and/or heel region 514 of upper 520. Knitted component 1000 can also extend along medial side 515 and lateral side 517, over forefoot region 511, and/or around heel region 514.

As will be discussed, knitted component 1000 can provide the upper 520 with weight savings as compared with other conventional uppers. Additionally, in some embodiments, knitted component 1000 can be configured with textured area 550 and smooth area 540. Still further, knitted component 1000 can provide advantages in the manufacture of the article of footwear. Other advantages due to the knitted component 1000 will be explored in detail below.

In some embodiments, knitted component 1000 can be made at least partially through a flat knitting or circular knitting process. An exemplary flat-knitted component 1000 is shown in plan view in FIG. 17.

Knitted component 1000 can be formed of unitary knit construction. As defined herein and as used in the claims, the term "unitary knit construction" means that knitted component 1000 is formed as a one-piece element through a knitting process. That is, the knitting process substantially forms the various features and structures of knitted component 1000 without the need for significant additional manufacturing steps or processes. An example of unitary knit construction of upper 520 is illustrated in FIG. 18. As shown, unitary knit construction may be used to form a knitted component 1000 having courses 1008 and wales 1009. Also, unitary knit construction may be used to form a knitted component 1000 with structures or elements that are joined such that the structures or elements include at least one course 1008 or wale 1009 in common (i.e., sharing a common strand or common yarn). Also, one or more courses 1008 and/or wales 1009 can be substantially continuous between each portion of knitted component 1000. With this arrangement, a one-piece element of unitary knit construction is provided.

Although portions of knitted component 1000 may be joined to each other following the knitting process, knitted component 1000 remains formed of unitary knit construction because it is formed as a one-piece knit element. Moreover, knitted component 1000 remains formed of unitary knit construction when other elements (e.g., an inlaid strand, a closure element, logos, trademarks, placards with care instructions and material information, and other structural elements) are added following the knitting process.

Thus, upper 520 can be constructed with a relatively low number of material elements. This can decrease waste while also increasing the manufacturing efficiency and recyclability of upper 520. Additionally, knitted component 1000 of upper 520 can incorporate a smaller number of seams or other discontinuities. This can further increase manufacturing efficiency of the article of footwear. Moreover, inner surface 523 and outer surface 525 of upper 520 can be substantially smooth and uniform due to knitted component 1000 to enhance the overall comfort and fit of the article of footwear footwear.

In some embodiments, knitted component 1000 can be primarily defined by a knit element 1002. As shown in FIG. 18, knit element 1002 of knitted component 1000 may be formed from at least one yarn 1006, cable, fiber, filament, or other strand that is manipulated (e.g., with a knitting machine) to form a plurality of intermeshed loops that define a plurality of courses 1008 and wales 1009.

Knitted component 1000 can also generally include at least one tensile element 1003. In some embodiments, tensile element 1003 can be a yarn, cable, fiber, filament, or other elongate strand. Tensile element 1003 can extend across and can be attached to knit element 1002. In some embodiments, tensile element 1003 can be inlaid within a course 1008 and/or a wale 1009 of knit element 1002. As such, the tensile. elements 1003 can be formed of unitary knit construction with knit element 1002. In other embodiments, at least one or more segments of tensile element 1003 can be external to knit element 1002.

Tensile elements 1003 can provide support to knitted component 1000. More specifically, in some embodiments, tension within tensile elements 1003 can allow knitted component 1000 to resist deformation, stretching, or otherwise provide support for knit element 1002. Tensile elements 1003 of FIG. 17 can correspond to the tensile elements 581 of FIGS. 10, 12, and 13.

Knitted component 1000, knit element 1002, and/or tensile element 1003 can incorporate the teachings of one or more of commonly-owned U.S. Pat. No. 8,490,299 to Dua et al., filed on Dec. 18, 2008, and granted on Jul. 23, 2013, and U.S. patent application Ser. No. 13/048,514 to Huffa et al., entitled "Article Of Footwear Incorporating A Knitted Component," filed on Mar. 15, 2011 and published as U.S. Patent Application Publication Number 2012/0233882 on Sep. 20, 2012, both of which are hereby incorporated by reference in their entirety.

Knit element 1002 can be formed from one or more yarns 1006 of any suitable type. For example, at least one yarn 1006 of knit element 1002 can be made from cotton, elastane, rayon, wool, nylon, polyester, or other material. Furthermore, in some embodiments, yarn 1006 can include thermoplastic polyurethane (TPU). Also, in some embodiments, at least one yarn 1006 can be elastic and resilient. As such, yarn 1006 can be elongated from a first length, and yarn 1006 can be biased to recover to its first length. Thus, such an elastic yarn 1006 can allow knit element 1002 to stretch elastically and resiliently under the influence of a force. When that force is reduced, knit element 1002 can recover back its neutral position.

Furthermore, in some embodiments, at least one yarn 1006 can be at least partially formed from a thermoset polymer material that can melt when heated and that can return to a solid state when cooled. As such, yarn 1006 can be a fusible yarn and can be used to join two objects or elements together. In additional embodiments, knit element 1002 can include a combination of fusible and non-fusible yarns. In some embodiments, for example, knitted component 1000 and upper 520 can be constructed according to the teachings of U.S. Patent Publication No. 2012/0233882, which published on Sep. 20, 2012, the disclosure of which is hereby incorporated by reference in its entirety.

Additionally, in some embodiments, a single yarn 1006 can form each of the courses 1008 and wales 1009 of knit element 1002. In other embodiments, knit element 1002 can include a plurality of yarns 1006. For example, different yarns 1006 can form different courses 1008 and/or different wales 1009. In additional embodiments, a plurality of yarns can be plated together and can cooperate to define a common loop, a common course 1008 and/or a common wale 1009 of knit element 1002. Moreover, in some embodiments, knit element 1002 can be constructed with a relatively high stitch density. Also, in some embodiments, knit element 1002 can be constructed using a relatively high-gauge knit, such as a full-gauge knit. Accordingly, knit element 1002 can be constructed to hold its textured shape.

Tensile element 1003 can be attached to and engaged with knit element 1002 in any suitable fashion. For example, in some embodiments, at least a portion of tensile element 1003 can be inlaid within one or more courses 1008 and/or wales 1009 of knit element 1002 such that tensile element 1003 can be incorporated during the knitting processes on the knitting machine. More specifically, as shown in the embodiment of FIG. 18, tensile element 1003 can alternate between being located: (a) behind loops formed from yarn 1006; and (b) in front of loops formed from yarn 1006. In effect, tensile element 1003 weaves through the unitary knit construction of knit element 1002. As a result, in some embodiments, tensile element 1003 can be disposed within knit element 1002 between the front and back surfaces of knit element 1002.

Features of knitted component 1000 illustrated in FIG. 17 will now be discussed in greater detail according to exemplary embodiments. Knitted component 1000 can define features of the upper 520 shown in FIGS. 10-12. As such, knitted component 1000 can include a forefoot region 1111, a midfoot region 1112, and a heel region 1114 that define forefoot region 511 of upper 520, midfoot region 512 of upper 520, and heel region 1114 of upper 520, respectively. Also, knitted component 1000 can include a medial side 1115 that defines medial side 515 of upper 520, and knitted component 1000 can include a lateral side 1117 that defines lateral side 517 of upper 520. Furthermore, knitted component 1000 can include a throat region 1119 that defines throat 524 of upper 520.

In FIG. 17, knitted component 1000 is shown in plan view such that knitted component 1000 appears flat and sheet-like. An outer boundary of knitted component 1000 can be defined by a peripheral edge 1010. Also, knitted component 1000 can include a front surface 1011 that spans between opposing segments of peripheral edge 1010. Although not shown in FIG. 17, knitted component 1000 can also include a back surface 1015 that opposes front surface 1011.

Peripheral edge 1010 can be sub-divided into a plurality of segments. For example, peripheral edge 1010 can include a substantially U-shaped outer segment 1012. Edge 1010 can also include a substantially U-shaped inner segment 1014. Moreover, edge 1010 can include a third end segment 1016 and a fourth end segment 1018. Third end segment 1016 and/or fourth end segment 1018 can be substantially straight. Also, third end segment 1016 can extend between the outer segment 1012 and inner segment 1014 proximate medial side 1115, and fourth end segment 1018 can extend between outer segment and inner segment 1012, 1014 proximate lateral side 1117.

In some embodiments, outer segment of peripheral edge can include one or more scallops 1013. Scallops 1013 can be separated by generally triangular-shaped cutouts along peripheral edge 1010. Also, scallops 1013 can be disposed primarily in forefoot region 1111. Furthermore, when knitted component 1000 is assembled into a three-dimensional shape, scallops 1013 can allow adjacent portions of knitted component 1000 to overlay each other and form a highly curved area of upper 520 without bunching.

When assembled into the three-dimensional upper, front surface 1011 of knitted component 1000 can face inner surface 523 of upper 520, and the opposing back surface 1015 can face outer surface 525 of upper 520. In some embodiments, front surface 1011 can define inner surface 523 of upper 520, and/or the opposing back surface 1015 can define outer surface 525 of upper 520. In other embodiments, a skin or other object can be layered and attached to one or both surfaces of knitted component 1000, and the skin or other object can define the inner surface 523 and/or outer surface 525 of upper 520.

Furthermore, in some embodiments, knitted component 1000 can include one or more openings. In some embodiments, the openings can be through-holes that extend through the front surface 1011 and the opposing back surface 1015. For example, the knitted component 1000 can include eyelet openings 1020 that form the eyelets 532 discussed above. Also, the knitted component 1000 can include one or more indexing openings 1020. In some embodiments, the indexing openings 1020 can be arranged along peripheral edge 1010. For example, indexing openings 1020 can be included along outer segment 1012 of peripheral edge 1010. Also, at least some indexing openings 1020 can be included proximate scallops 1013. Indexing openings 1020 can also be included proximate third end 1016 and fourth end 1018 of knitted component 1000. Indexing openings 1020 can be used for pinning or otherwise anchoring knitted component 1000 to a support structure during manufacturing.

Knitted component 1000 can also define a plurality of zones that differ in one or more characteristics. For example, in the embodiment of FIG. 17, knitted component 1000 can include a first zone 1022 and a second zone 1024. First zone 1022 is demarcated from second zone 1024 by a boundary line 1026 in FIG. 17 according to exemplary embodiments.

In some embodiments, second zone 1024 can have greater stretching elasticity than first zone 1022. For example, second zone 1024 can stretch out elastically at least 20% more than first zone 1022 when subjected to a common stretching force. In additional embodiments, second zone 1024 can stretch out elastically at least 40% more than first zone 1022 when subjected to a common stretching force.

These stretching and elasticity characteristics can be observed and measured in various ways. For example, when the knitted component 1000 is unstretched and in a neutral position, the widths of first zone 1022 and second zone 1024 can be measured in a direction extending generally between the medial side 1115 and the lateral side 1117. Then, a stretching force or load can be applied to stretch and elongate the knitted component 1000. The increase in widths of first zone 1022 and second zone 1024 can then be calculated. In additional embodiments, independent specimens of first zone 1022 and second zone 1024 can be stretch tested individually and compared. Additionally, in some cases, these stretching and elasticity characteristics can be measured using the procedure set forth in ASTM D2594. In other cases, these stretching and elasticity characteristics can be measured using other industry-accepted standard testing procedures.

In the embodiment of FIG. 17, for example, the second zone 1024 can be disposed substantially in throat region 1119. Also, second zone 1024 can extend substantially about inner segment 1014 of peripheral edge 1010.

The difference in elasticity can be a result of knitting second zone 1024 from yarns that are more elastic than the yarns knitted in the first zone 1022. Also, fusible yarns can be knitted and fused within first zone 1022, whereas second zone 1024 can be devoid of fusible yarns.

Skin Layer Configuration

In some embodiments, one or more objects can be added or attached to the knitted component 1000. The knitted component 1000 and the additional object(s) can cooperate to define upper 520. The object can be of any suitable type, such as a skin layer, a liner, a toe guarding member, a heel counter, a decal, a tag, fasteners, lace-receiving elements, or other types. The object can be attached in various ways as well.

In some embodiments, the object can be attached proximate to the front surface 1011 of knitted component 1000. In added embodiments, the object can be attached proximate to the opposing back surface 1015 of knitted component 1000. In still other embodiments, the object can be attached proximate the peripheral edge of knitted component 1000.

In some embodiments, the attached object can strengthen or provide reinforcement to predetermined areas of upper 520. Also, the object can repel moisture in some embodiments. Furthermore, the object can insulate the upper 520 in some embodiments.

For example, as shown in FIGS. 15 and 16, upper 520 can include knitted component 1000 as well as one or more skin layers. In some embodiments, a skin layer can be layered on the front surface 1011. A skin layer can also be layered on the opposing back surface 1015 of knitted component 1000. As shown in the illustrated embodiment, upper 520 can include knitted component 1000, a first skin layer 1600, and a second skin layer 1700.

First skin layer 1600 can lay adjacent to front surface 1011 of knitted component 1000 and can be secured to knitted component 1000 to form a portion of inner surface 523 of upper 520. Also, as shown in FIG. 15, second skin layer 1700 can lay adjacent to back surface 1015 of knitted component 1000 and can be secured to knitted component 1000 to form a portion of outer surface 525 of upper 520.

As noted above, first skin layer 1600 and/or second skin layer 1700 may be formed from a polymer (e.g., polyurethane) sheet, elements of leather or synthetic leather, microfiber, a woven or non-woven textile, or a metal foil. When formed as a polymer sheet or polymer layer, first skin layer 1600 and/or second skin layer 1700 may initially be a polymer film, polymer mesh, polymer powder, or polymer resin, for example. With any of these structures, a variety of polymer materials may be utilized for skin layers 1600, 1700 including polyurethane, polyester, polyester polyurethane, polyether polyurethane, and nylon. An example of a non-woven textile with thermoplastic polymer filaments that may be bonded to knitted component 1000 is disclosed in U.S. Patent Application Publication 2010/0199406 to Dua, et al., which is incorporated herein by reference. Moreover, additional considerations relating to first skin layer 1600 and second skin layer 1700 may be found in U.S. Patent Application Publication 2012/0246973 to Dua, which is incorporated herein by reference.

Although skin layers 1600, 1700 may be formed from a thermoset polymer material, some configurations of skin layers 1600, 1700 can be formed from thermoplastic polymer materials (e.g., thermoplastic polyurethane). In general, a thermoplastic polymer material softens or melts when heated and returns to a solid state when cooled. More particularly, the thermoplastic polymer material transitions from a solid state to a softened or liquid state when subjected to sufficient heat, and then the thermoplastic polymer material transitions from the softened or liquid state to the solid state when sufficiently cooled. As such, the thermoplastic polymer material may be melted, molded, cooled, re-melted, re-molded, and cooled again through multiple cycles. Thermoplastic polymer materials may also be welded or thermal bonded to textile elements, such as knitted component 1000.

In some configurations of upper 520, a single element of first skin layer 1600 can be secured throughout knitted component 1000 and can cover a majority of knitted component 1000. Likewise, in some configurations of upper 520, a single element of second skin layer 1700 can be secured throughout knitted component 1000 and can cover a majority of knitted component 1000. In further configurations, however, different elements of the skin layer(s) may be formed from different materials and positioned in separate areas of knitted component 1000. That is, a portion of first skin layer 1600 formed from one material may be bonded to one area of knitted component 1000, and another portion of first skin layer 1600 formed from another material may be bonded to a different area of knitted component 1000. Similarly, a portion of second skin layer 1700 formed from one material may be bonded to one area of knitted component 1000, and another portion of second skin layer 1700 formed from another material may be bonded to a different area of knitted component 1000.

By varying the materials forming skin layer(s) 1600, 1700, different properties may be applied to different areas of upper 520. In other configurations, skin layer(s) 1600, 1700 may only cover specific areas of knitted component 1000, thereby leaving other areas of knitted component 1000 exposed. Skin layer(s) 1600, 1700 may, therefore, be absent from some areas of knitted component 1000.

As shown in the embodiment of FIG. 16, first skin layer 1600 can include an outer periphery 1602 that corresponds generally with peripheral edge 1010 of knitted component 1000. Also, in some embodiments, first skin layer 1600 can include a plurality of openings 1604, such as through-holes.

For example, first skin layer 1600 can include a plurality of eyelet openings 1606 and a plurality of central openings 1607. Eyelet openings 1606 can align with corresponding eyelet openings 1021 of knitted component 1000. Also, the central openings 1607 can be spaced apart from each other and can be distributed across first skin layer 1600. Openings 1607 can generally reduce the weight, permeability, and/or breathability of upper 520. Furthermore, when attached to knitted component 1000, first skin layer 1600 can be disposed generally in the first zone 1022 of knitted component 1000. Thus, first skin layer 1600 can be absent from the more elastic second zone 1024 of knitted component 1000.

Also, as shown in the embodiment of FIG. 16, second skin layer 1700 can include an outer periphery 1702 that corresponds generally with peripheral edge 1010 of knitted component 1000. Also, in some embodiments, second skin layer 1700 can include a plurality of openings 1704, such as through-holes. For example, second skin layer 1700 can include a plurality of eyelet openings 1706 that can align with corresponding eyelet openings 1021 of knitted component 1000. Furthermore, when attached to knitted component 1000, second skin layer 1700 can be disposed generally in the first zone 1022 of knitted component 1000. Thus, second skin layer 1700 can be absent from the more elastic second zone 1024 of knitted component 1000.

In some embodiments, first skin layer 1600 and second skin layer 1700 can be disposed in and can partially form substantially smooth area 540 of upper 520 as shown in FIG. 15. Thus, first skin layer 1600 and second skin layer 1700 can provide support to smooth area 540 of upper 520.

Furthermore, in some embodiments, first skin layer 1600 and second skin layer 1700 can be disposed generally in textured area 550 of upper 520. In some embodiments, first skin layer 1600 and/or second skin layer 1700 can be layered over and attached to knitted component 1000 across textured area 550 as shown in FIG. 15.

In some embodiments, first skin layer 1600 and/or second skin layer 1700 can increase the stiffness of the upper 520 for retaining the texture of textured area 550. Stated differently, first skin layer 1600 and/or second skin layer 1700 can resist bending and deformation from the wavy or bumpy configuration of textured area 550. However, first skin layer 1600 and second skin layer 1700 can be resilient and bendable to allow some resilient deformation of textured area 550.

Figure 19:
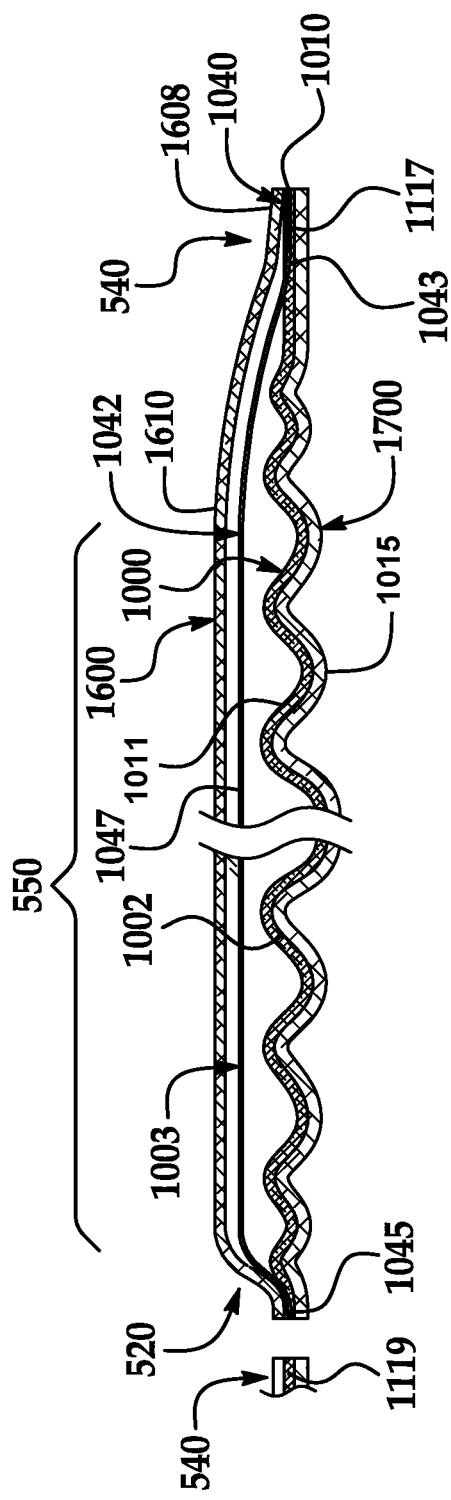
FIG. 19 is a section view of the upper taken along the line 19-19 of FIG. 14.

Moreover, in some embodiments, one or more portions of first skin layer 1600 and/or second skin layer 1700 can be attached to knitted component, and other portions can be detached from knitted component 1000. For example, as shown in FIG. 19, first skin layer 1600 can include one or more attached portions 1608 and one or more detached portions 1610. Attached portions 1608 can be layered and attached to knitted component 1000 while detached portions 1610 can be detached from knitted component 1000. Specifically, in some embodiments represented in FIG. 19, attached portions 1608 can be included at smooth area 540 of upper 520, and detached portions 1610 can be included at textured area 550 of upper 520. Thus, detached portions 1610 can "float" relative to textured area 550, and attached portions 1608 can secure first skin layer 1600 to knit element 1000. Also, in some embodiments, detached area of first skin layer 1600 can at least partially lie smoothly against the wearer's foot while textured area 550 can rise and fall relative to the wearer's foot.

In some embodiments, the detached portions 1610 of first skin layer 1600 can be located proximate to tensile elements 1003 of knitted component 1000. For example, in some embodiments represented in FIG. 19, tensile element 1003 can include at least one internal segment 1040 that is inlaid or otherwise attached to knit element 1002. Tensile element 1003 can also include at least one external segment 1042 that is detached and disposed external from knit element 1002. For example, as shown in FIG. 19, tensile element 1003 can include first segment 1043, which is inlaid within knit element 1002 proximate peripheral edge 1010, a second segment 1045, which is inlaid within knit element 1002 proximate throat portion 1119, and a third segment 1047, which extends between first segment 1043 and second segment 1045. In some embodiments, first segment 1043 and second segment 1045 can be attached to knit element 1002 within smooth areas 540, and third segment 1047 can extend across textured area 550 of knitted component 1000. Furthermore, in some embodiments, third segment 1047 of tensile element 1003 can extend out from front surface 1011 of knit element 1002 to extend across textured area 550.

Also, as shown in FIG. 19, detached portion 1610 of first skin layer 1600 can overlay detached segment 1042 of tensile element 1003, and both can "float" over textured area 550, proximate front surface 1011 of knit element 1002. In some embodiments, this floating arrangement of skin layer 1600 and tensile strand 1003 can allow textured area 550 to flex and deform readily without being overly constrained by tensile element 1003 and first skin layer 1600.

Figure 20:
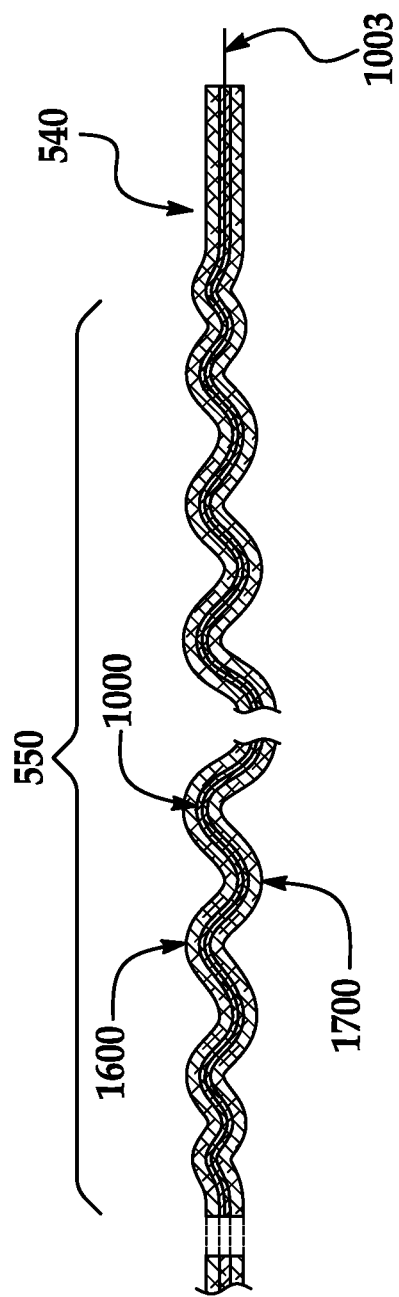
FIG. 20 is a section view of the upper according to additional embodiments.

FIG. 20 illustrates another embodiment, in which a majority of tensile element 1003 is inlaid internally within knitted component 1000. For example, tensile element 1003 can be inlaid within knitted component 1000 to extend along both smooth area 540 and textured area 550. Also, a majority of first skin layer 1600 can overlay and attach to portions of knitted component 1000 where the tensile element 1003 is inlaid.

Figure 21:
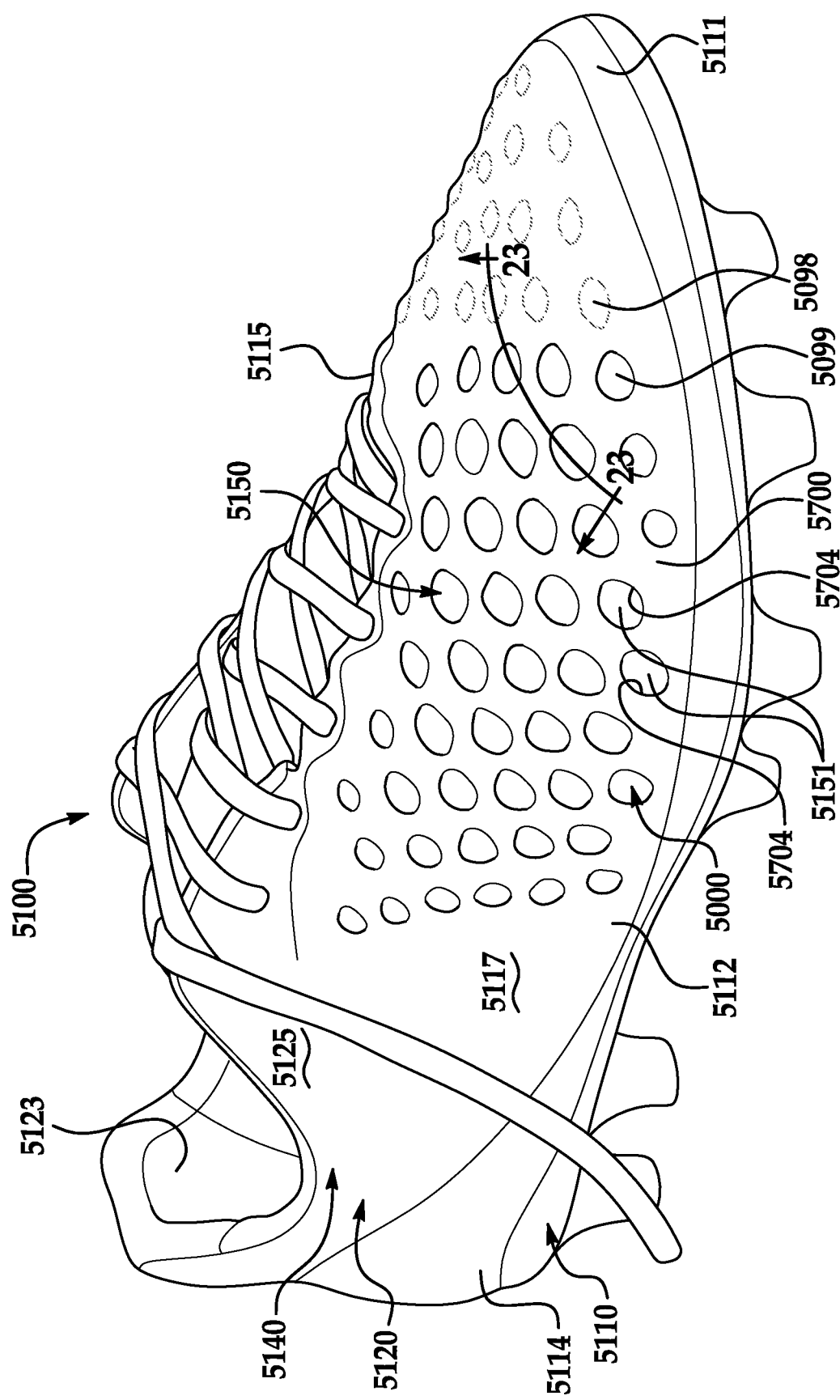
FIG. 21 is a lateral perspective view of the article of footwear according to additional embodiments.
Figure 22:
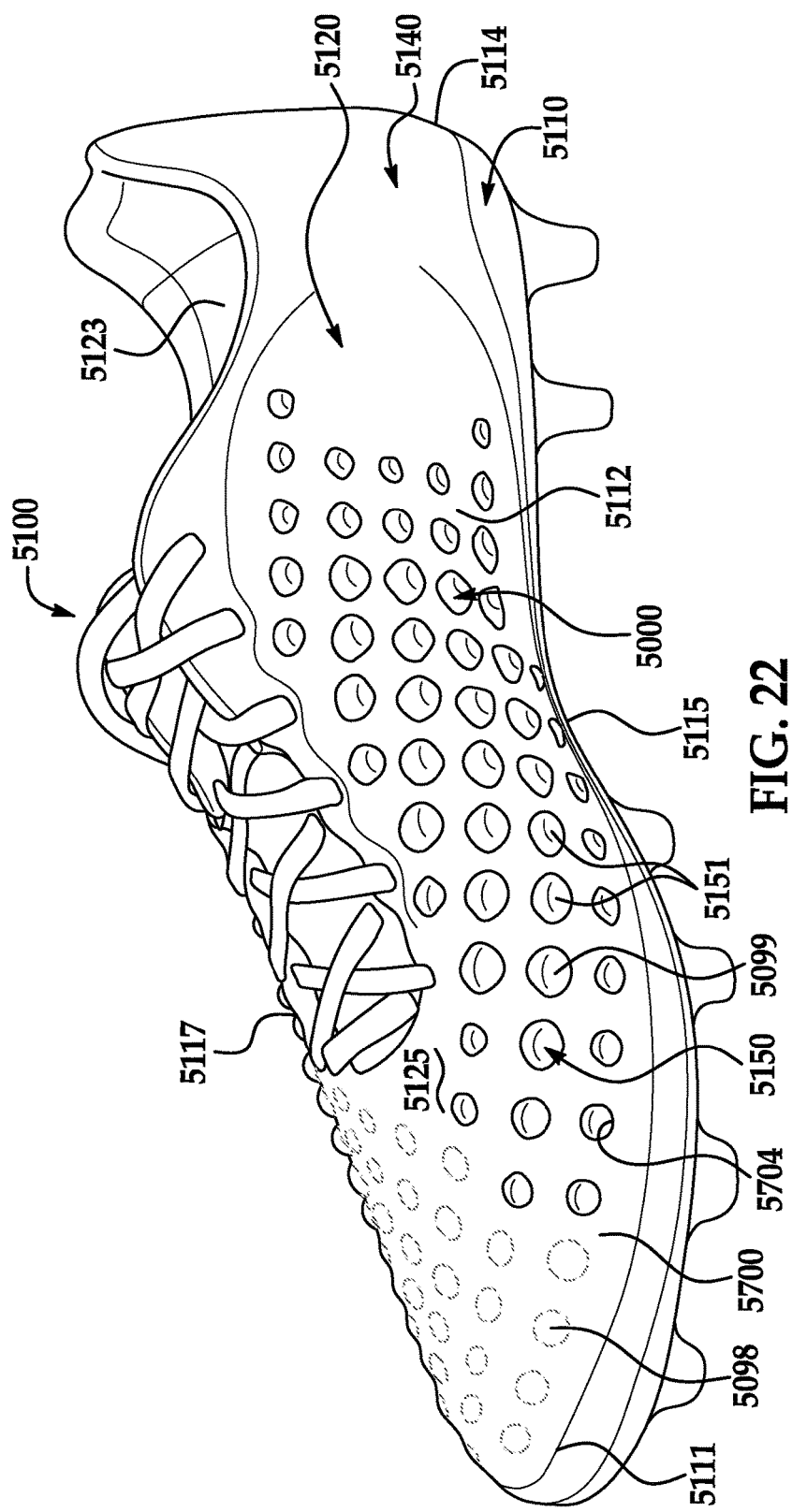
FIG. 22 is a medial perspective view of the article of footwear of FIG. 21.
Figure 23:
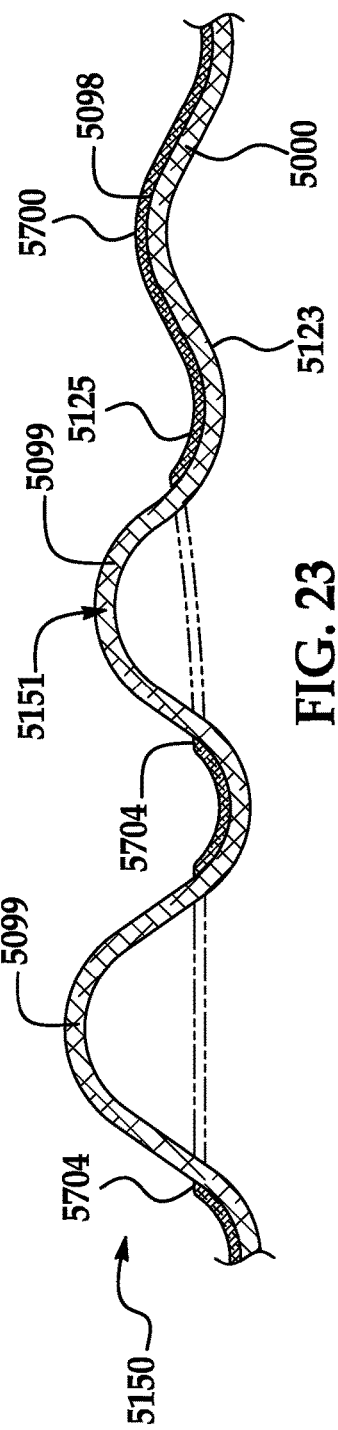
FIG. 23 is a section view of the article of footwear taken along the line 23-23 of FIG. 21.

Referring now to FIGS. 21-23, additional embodiments are illustrated. As shown, the article of footwear 5100 can be similar to one or more embodiments disclosed herein except as noted below.

In some embodiments, footwear 5100 can include a sole structure 5110 and an upper 5120. The upper 5120 can include a smooth area 5140 proximate the heel region 5114, and the upper 5120 can include a textured area 5150 generally in the forefoot region 5111 and midfoot region 5112. In some embodiments, the textured area 5150 can extend from the medial side 5115, across the forefoot region 5111, and onto the lateral side 5117.

Additionally, the upper 5120 can include multiple components that are overlapped and layered over each other. One component can provide textured structures, and the other component can be layered over at least some of the textured structures. Also, in some embodiments, the other component can include apertures that expose at least some of the textured structures.

Specifically, as shown in FIG. 23, the upper 5120 can include a textile component, such as a knitted component 5000. In some embodiments, the knitted component 5000 can be mesh-like. The knitted component 5000 can include a plurality of projection structures 5151 of the type discussed above. Also, the upper 5120 can include a skin layer 5700. In some embodiments, the skin layer 5700 can be layered over the outside of the knitted component 5000. As such, the skin layer 5700 can at least partially define the outer surface 5125 of the upper 5120. However, in additional embodiments, it will be appreciated that the skin layer 5700 can be layered over the inside of the knitted component 5000 so as to define the inner surface 5123 (i.e., similar to a liner).

As shown in FIGS. 21-23, the skin layer 5700 can include a plurality of openings 5704. In some embodiments, the openings 5704 can be disposed in a predetermined position relative to the pattern of projection structures 5151. For example, the openings 5704 can be positioned to receive preselected projection structures 5151 of the knitted component 5000. Stated differently, some of the projection structures 5151 can project through the openings 5704 and can be exposed from the skin layer 5700. As such, the projection structures 5151 extending through the openings 5704 can be referred to as exposed projection structures 5099. Other projection structures 5151 can be covered over by the skin layer 5700. Those projection structures 5151 can be referred to as covered projection structures 5098. (The covered projection structures 5098 are shown in FIGS. 21 and 22 with broken lines.) Accordingly, the knitted component 5000 can define the exposed projection structures 5099 whereas the knitted component 5000 and the skin layer 5700 can cooperate to define the covered projection structures 5099.

In some embodiments, the exposed projection structures 5099 and the covered projection structures 5098 can have different characteristics. For example, the exposed projection structures 5099 can have a higher coefficient of friction than the covered projection structures 5098. Also, in some embodiments, the exposed projection structures 5099 can exhibit a higher degree of flexibility and resilience than the covered projection structures 5098. Moreover, in some embodiments, the larger projection structures 5151 can be exposed projection structures 5099, and the smaller projection structures 5151 can be covered projection structures 5098.

Thus, the exposed projection structures 5099 and the covered projection structures 5098 can each be disposed in predetermined areas of the upper 5120. For example, in the case of a soccer shoe (i.e., soccer boot), the exposed projection structures 5099 can be disposed in areas of the upper 5120 that provide a high degree of ball control, ball feel, etc. In contrast, the covered projection structures 5098 can be disposed in areas of the upper 5120 that provide a lower degree of ball control, ball feel, etc.

Resilient Deformation of Upper

In some embodiments, textured area 550 of upper 520 can resiliently deform to provide the wearer with certain benefits. For example, in some embodiments, textured area 550 can deform and flatten out when textured area 550 impacts a ball or other object. Then, textured area 550 can resiliently recover back to the more textured state. Accordingly, this resilient deformation can dampen and dissipate the impact energy. Thus, the wearer may be able to more reliably trap a soccer ball, the wearer may be better able to direct the ball when kicking and passing, and/or the textured area 550 can provide increased tactile feel of the ball when controlling the ball.

Figure 24:
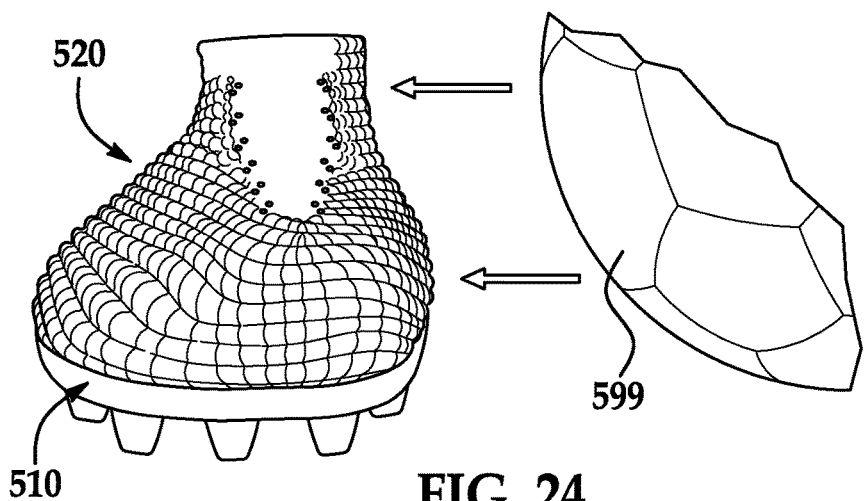
FIG. 24 is a front view of the article of footwear and a ball shown moving toward the footwear.
Figure 25:
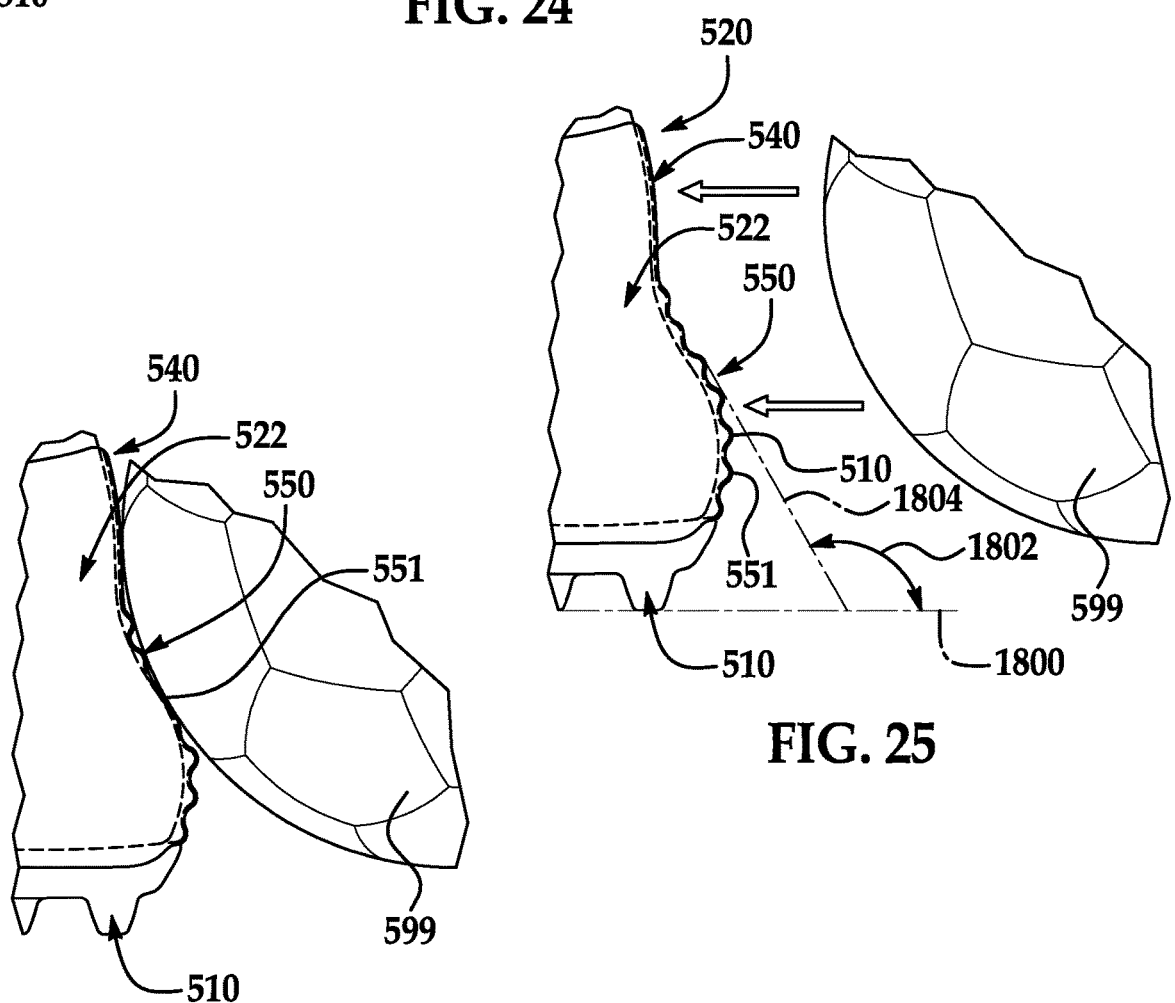
FIG. 25 is a section view of the article of footwear of FIG. 24, wherein the upper is shown prior to impact with the ball.
Figure 26:
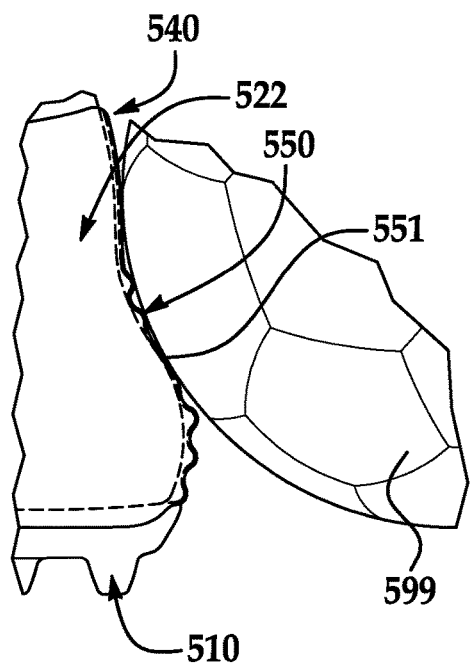
FIG. 26 is a section view of the article of footwear of FIG. 24, wherein the upper is shown during impact with the ball.

This resilient deformation is illustrated in FIGS. 24-26. FIG. 24 shows the article of footwear 500 and a ball 599. The ball 599 is shown moving toward footwear 500. FIG. 25 corresponds with FIG. 24, but upper 520 is shown in section view. As shown, textured area 550 is shown in its textured configuration, wherein the projection structures 551 project outward from cavity 522 within upper 520. Also, in embodiments in which textured area 550 includes recess structures, those recess structures can be recessed into cavity 522 when textured area 550 is in the textured configuration of FIG. 25. The textured configuration can also be referred to as a first position, an undeformed position, or a neutral position of textured area 550.

As shown in FIG. 26, the impact with ball 599 can cause textured area 550 to flatten out or otherwise deform. The deformed configuration represented in FIG. 26 can be referred to as a flattened configuration, a second position, or a deformed position of textured area 550. In some embodiments, projection structures 551 (and any recess structures) of textured area 550 can compress and flatten between the ball 599 and the wearer's foot when in this position.

This deformation can dampen the energy of impact in some embodiments. Also, this deformation can cause upper 520 to shift slightly against the wearer's foot, thereby providing tactile "feel" of the ball 599 to the wearer.

When the load is reduced, the textured area 550 can resiliently recover from the deformed configuration of FIG. 26 back to the textured configuration of FIG. 25. Stated differently, the textured area 550 can be biased toward the textured configuration represented, for example, in FIG. 25.

Moreover, in some embodiments, the gradient arrangement of the textured area 550 can provide certain benefits to the wearer. For example, the gradient can allow the upper 520 to deform in a desirable manner. More specifically, the tallest projection structures 551 can be highly deformable, and surrounding gradient of projection structures 551 can distribute forces through the textured area 550 to inhibit bunching or wrinkling of upper 520 during deformation.

Furthermore, in some embodiments, the gradient of projection structures 551 can, for example, be arranged for directing or otherwise controlling the ball 599. For example, an imaginary tangent line 1804 is included in FIG. 25, which is tangent to multiple adjacent projection structures 551. As shown, the tangent line 1804 is disposed at an angle 1802 relative to the ground surface 1800. This angle 1802 can be predetermined. For example, in some embodiments, the angle 1802 can be selected such that projection structures 551 are better able to lift the ball 599 from the ground 1800 when kicking and/or passing.

Method of Manufacturing Upper and Article of Footwear

A variety of processes may be utilized to form the upper and the article of footwear of the present disclosure. In some embodiments, knitting methods can be employed for forming at least a portion of the upper. Also, in some embodiments, heat and/or pressure can be applied to one or more components of the upper for forming textured areas of upper. For example, in some embodiments, the upper can be at least partly formed using a method that includes embossing, thermoforming, molding, pressing, steaming, welding, thermal bonding, and/or other methods.

Furthermore, objects can be attached and included within upper using the methods of the present disclosure. As an example, one or more skin layers can be incorporated into upper using these methods. In some embodiments, the textured area can be formed and the skin layer(s) can be incorporated into the upper substantially simultaneously. Accordingly, the upper can be manufactured in an efficient manner. Additionally, the upper can be manufactured in an accurate and repeatable fashion using the methods of the present disclosure.

It will also be appreciated that manufacturing methods of the present disclosure can be used for manufacturing articles of apparel other than footwear. For example, these methods can be employed for manufacturing pants, shorts, shirts, protective equipment, cushioning devices, hats or other articles worn on the head or neck, gloves or glove-like articles, shin guards, elbow pads, sports equipment, or other articles of apparel. Additionally, these and other articles that include textiles with textured areas can be formed using these methods.

Figure 27:
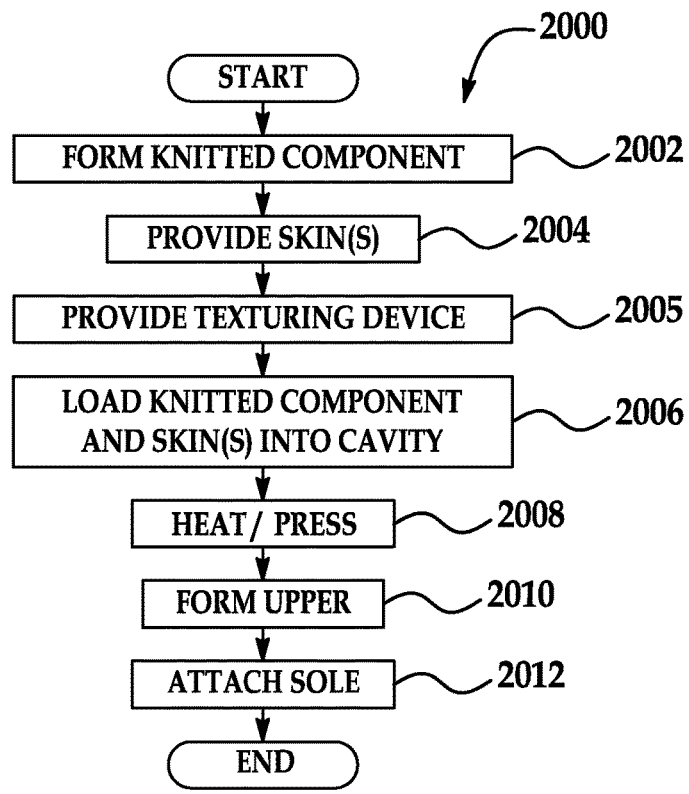
FIG. 27 is a flowchart of a method of manufacturing an article of footwear according to exemplary embodiments of the present disclosure.

Referring to FIG. 27, a method 2000 is illustrated for manufacturing an upper and an article of footwear according to exemplary embodiments. As will be discussed, method 2000 can be employed for manufacturing the upper 520 of FIGS. 10-26. However, it will be appreciated that method 2000 can be employed for manufacturing other embodiments of the upper without departing from the scope of the present disclosure.

As shown, method 2000 can include a step 2002, in which the knitted component 1000 is formed. In some embodiments, knitted component 1000 can be flat knitted and formed of unitary knit construction to include the features discussed above and shown in FIG. 17. In some embodiments, knitted component 1000 can be initially formed as a relatively flat, smooth, and sheet-like article. Later in method 2000, knitted component 1000 can be formed and shaped to include one or more textured areas 550.

Subsequently, in step 2004, first skin layer 1600 and second skin layer 1700 can be provided. In some embodiments, first skin layer 1600 and/or second skin layer 1700 can be made from thermoplastic polymer material, such as polyurethane. In additional embodiments, first skin layer 1600 and/or second skin layer 1700 can be made from microfiber.

Next, in step 2005, a device can be provided that is used for texturing (i.e., forming texture on) the knitted component 1000. In some embodiments, the device provided in step 2005 can be used for applying heat and/or pressure to the skin layer 1600 and skin layer 1700 for attaching skin layer 1600 and/or skin layer 1700 to knitted component 1000. In some embodiments, the same device provided in step 2005 can be used for forming textured area 550 and for attaching skin layers 1600, 1700 to knitted component 1000. Additionally, in some embodiments, textured area 550 can be formed and skin layers 1600, 1700 can be attached substantially simultaneously.

In additional embodiments, the formation of textured area 550 and the attachment of skin layers 1600, 1700 can occur at different times. Furthermore, in some embodiments, a device can be used for forming textured area 550, and a different device can be used for attaching skin layers 1600, 1700.

Figure 28:
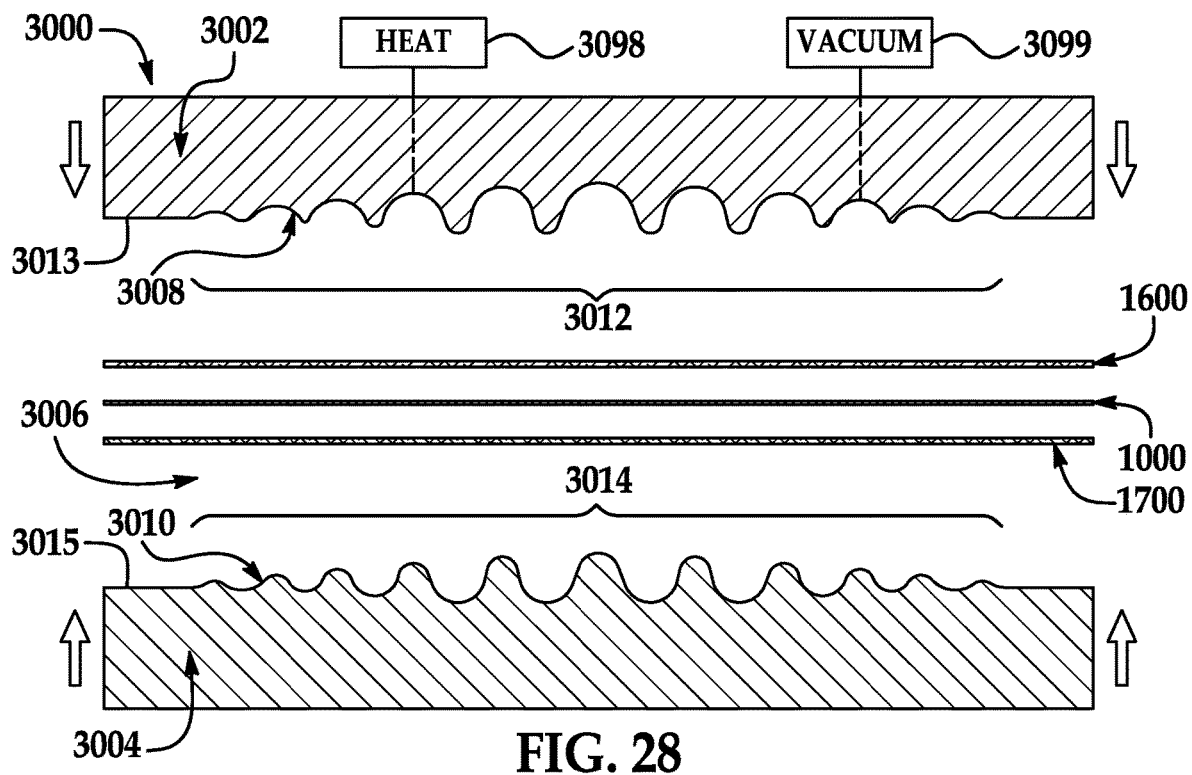
FIG. 28 is a schematic illustration of a texturing device for forming a textured area of an upper of the article of footwear according to exemplary embodiments of the present disclosure, wherein the texturing device is shown in a first position.

In some embodiments, the device provided in step 2005 can be a texturing device 3000 of the type illustrated schematically in FIG. 28. As will be discussed, the texturing device 3000 can be used for texturing (i.e., forming texture on) the upper. In other words, the texturing device 3000 can be used for forming and shaping the textured area 550. It will be appreciated that the texturing device 3000 can have a variety of configurations without departing from the scope of the present disclosure. For example, in some embodiments, the texturing device 3000 can apply heat and/or pressure to form the textured area 550. Specifically, in some embodiments, the texturing device 3000 can include components typically included in an embossing device. In additional embodiments, the texturing device 3000 can include components typically included in a thermoforming device.

As will be explained, texturing device 3000 can perform various functions, such as molding, thermal bonding, and/or pressing. In some embodiments, the texturing device 3000 can be configured such that the thickness 143 (FIG. 5) of the materials remains substantially constant during the texturing process. For example, the texturing device 3000 can shape and stretch the knitted component 1000 without significantly reducing the thickness of the knitted component 1000 when forming the textured area 550.

Also, in some embodiments, multiple texturing devices 3000 can be used in sequence to form and shape the textured area 550. For example, a first texturing device 3000 can partially form the textured area 550, and then a second texturing device 3000 can further form the textured area 550 and so on until the textured area 550 is completed.

Figure 29:
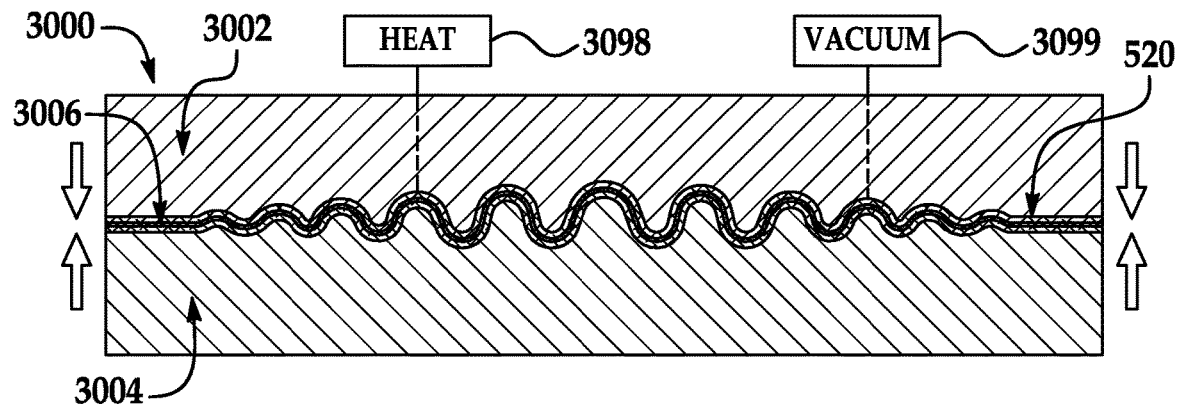
FIG. 29 is a schematic illustration of the texturing device of FIG. 28 shown in a second position.

In some embodiments represented in FIG. 28, texturing device 3000 can include a first member 3002 and a second member 3004. First member 3002 and second member 3004 can be opposing dies in some embodiments. First member 3002 and second member 3004 can move relative to each other, for example, between an open position of FIG. 28 and a closed position of FIG. 29. First member 3002 and second member 3004 can move relative to each other via an actuator, such as a pneumatic, hydraulic, or motorized actuator. In other embodiments, first member 3002 and second member 3004 can be rollers. The rollers can oppose each other and roll in opposite directions while an article moves between the rollers. The rollers can apply pressure and/or heat for forming textured area 550 of the article. As another example, first member 3002 can instead be a flexible membrane, and a pump may be utilized to evacuate air from between the membrane and second member 3004. As the air is evacuated, the membrane can press upon the contents of cavity 3006 for performing the texturing operation. As another example, a dual membrane system may be utilized to compress and shape the contents of the cavity 3006.

As shown in FIG. 28, first member 3002 can include a first surface 3008, and second member 3004 can include a second surface 3010. First surface 3008 and second surface 3010 can oppose each other and can cooperate to define a cavity 3006 of texturing device 3000.

In some embodiments, surfaces 3008, 3010 can be rigid and hard and substantially incompressible. For example, surfaces 3008, 3010 can be made of a hard metal, such as aluminum or steel. In other embodiments, one or both surfaces 3008, 3010 can be compressible and resilient. For example, one or both surfaces 3008, 3010 can be made from a silicone-based material. In an additional embodiment, the first surface 3008 can be made from a hard material, such as metal, and the other surface 3010 can be made from a compressible material, such as silicone. Also, in some embodiments, the texturing device 3000 can include one or more features disclosed in U.S. Patent Publication No. 2010/0037483, published Feb. 18, 2010, filed Aug. 24, 2009, and which is incorporated by reference in its entirety. Moreover, in some embodiments, the texturing device 3000 can include one or more features disclosed in U.S. Patent Publication No. 2014/0130270, published May 15, 2014, filed Jul. 17, 2013, and which is incorporated by reference in its entirety.

In some embodiments, texturing device 3000 can also include a heat source 3098. Heat source 3098 can heat the first member 3002, the second member 3004, and/or the cavity 3006. Accordingly, heat source 3098 can heat one or more contents of the cavity 3006. For example, heat source 3098 can supply steam to cavity 3006. In additional embodiments, heat source 3090 can heat first member 3002 and/or second member 3004, and heat can transfer to the contents of cavity 3006 as a result.

Additionally, in some embodiments, texturing device 3000 can include a vacuum source 3099. Vacuum source 3099 can supply a vacuum to cavity 3006 for drawing the contents of cavity 3006 against first surface 3008 and/or second surface 3010.

In some embodiments, first surface 3008 can include a first textured portion 3012 and a first smooth portion 3013.

As shown, first textured portion 3012 can include a series of projections and recesses, and portion 3013 can be substantially smooth. Also, second surface 3010 can include a second textured portion 3014 and a second smooth portion 3015. Second textured portion 3014 can include a series of projections and recesses, and portion 3015 can be substantially smooth. First textured portion 3012 can inversely correspond to second textured portion 3014 in some embodiments. Additionally, in the embodiment shown, first textured portion 3012 and second textured portion 3014 can define a central region of cavity 3006 whereas first smooth portion 3013 and second smooth portion 3015 can define peripheral regions of cavity 3006. However, it will be appreciated that cavity 3006 can have other arrangements without departing from the scope of the present disclosure.

In some embodiments, the projections and recesses of first textured portion 3012 and second textured portion 3014 can correspond with the shapes and features of textured area 550 of upper 520. As such, in some embodiments, at least some of the projections and recesses can be arranged in a gradient pattern as discussed above.

Referring back to FIG. 27, method 2000 can continue in step 2006, wherein knitted component 1000, first skin layer 1600, and second skin layer 1700 can be provided within the cavity 2006. These members can be overlapped in some embodiments. As shown in FIG. 28, first skin layer 1600 can be disposed proximate first surface 3008, second skin layer 1700 can be disposed proximate second surface 3010, and knitted component 1000 can be disposed between first skin layer 1600 and second skin layer 1700. Also, in some embodiments, these members can be secured together to a plate, jig, or other securement device for facilitating loading and unloading of the cavity 2006.

Next, method 2000 can continue in step 2008, wherein texturing device 3000 is closed and heat and/or pressure is applied. More specifically, in some embodiments represented in FIG. 29, first member 3002 can move relative to second member 3004 to close the cavity 3006. In some embodiments, first member 3002 and second member 3004 can apply pressure to conform knitted component 1000, first skin layer 1600, and second skin layer 1700 according to the surfaces of the cavity 3006. Also, in some embodiments, heat source 3098 can heat knitted component 1000, first skin layer 1600, and second skin layer 1700 for further conforming these components according to the surfaces of the cavity 3006. Moreover, in some embodiments, vacuum source 3099 can supply vacuum force into the cavity 3006 to draw the contents of cavity 3006 toward first surface 3008 and/or second surface 3010.

Specifically, textured area 550 of upper 520 can be shaped according to the first textured portion 3012 and the opposing second textured portion 3014 of texturing device 3000. In some embodiments, textured area 550 can hold its shape due to partial melting, molding, and curing of polymeric materials within knitted component 1000, skin layer 1600, and/or skin layer 1700. Moreover, the smooth area 540 of upper 520 can be shaped according to the first smooth portion 3013, and the opposing second smooth portion 3015 of texturing device 3000.

Additionally, in some embodiments, the application of heat and/or pressure can cause the material of skin layers 1600, 1700 to thermally bond to knitted component 1000. For example, skin layers 1600, 1700 can be made from thermoplastic polymer material that melts when heated and returns to a solid state when cooled sufficiently. Based upon this property of thermoplastic polymer materials, thermal bonding processes may be utilized to form a thermal bond that joins portions of skin layers 1600, 1700 to knitted component 1000. As utilized herein, the term "thermal bonding" or variants thereof is defined as a securing technique between two elements that involves a softening or melting of a thermoplastic polymer material within at least one of the elements such that the materials of the elements are secured to each other when cooled. Similarly, the term "thermal bond" or variants thereof is defined as the bond, link, or structure that joins two elements through a process that involves a softening or melting of a thermoplastic polymer material within at least one of the elements such that the materials of the elements are secured to each other when cooled. As examples, thermal bonding may involve: (a) the melting or softening of skin layers 1600, 1700 such that the thermoplastic polymer material intermingles with materials of knitted component 1000 and are secured together when cooled; and (b) the melting or softening of skin layers 1600, 1700 such that the thermoplastic polymer material extends into or infiltrates the structure of knitted component 1000 (e.g., extends around or bonds with filaments or fibers in knitted component 1000 to secure the elements together when cooled). Additionally, thermal bonding can occur without the use of stitching or adhesives, and can involve directly bonding the elements to each other with heat and/or pressure. In some situations, however, stitching or adhesives may be utilized to supplement the thermal bond or the joining of the elements through thermal bonding.

Figure 30A:
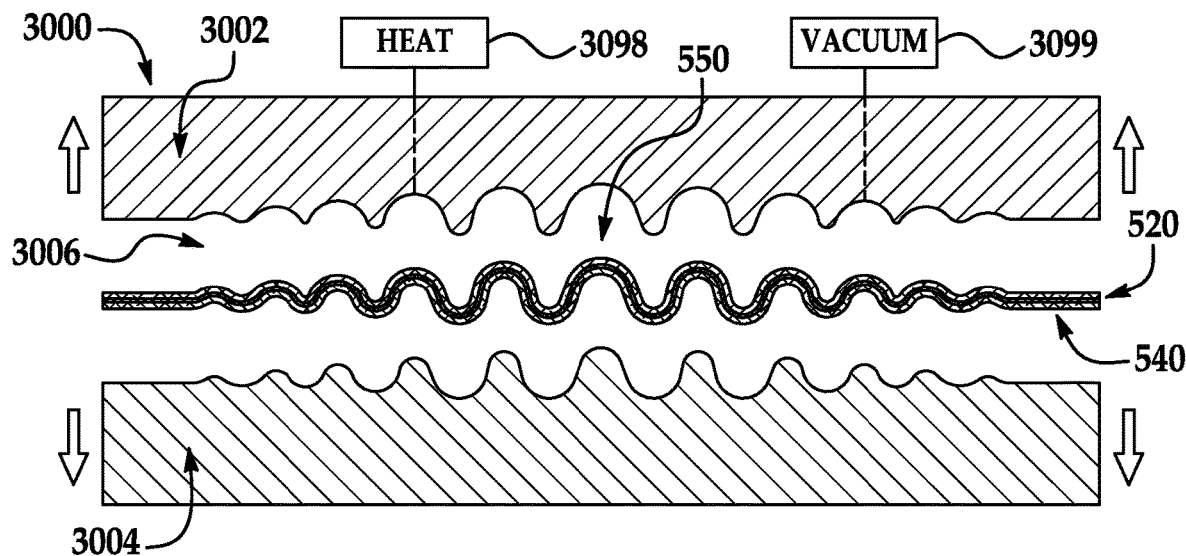
FIG. 30A is a schematic illustration of the texturing device of FIG. 28 shown in a third position.

Subsequently, as shown in FIG. 30A, texturing device 3000 can be opened, and upper 520 can cooled and withdrawn from cavity 3006. When withdrawn from cavity 3006, upper 520 can be in the configuration shown in FIGS. 14 and 15 in some embodiments.

Figure 30B:
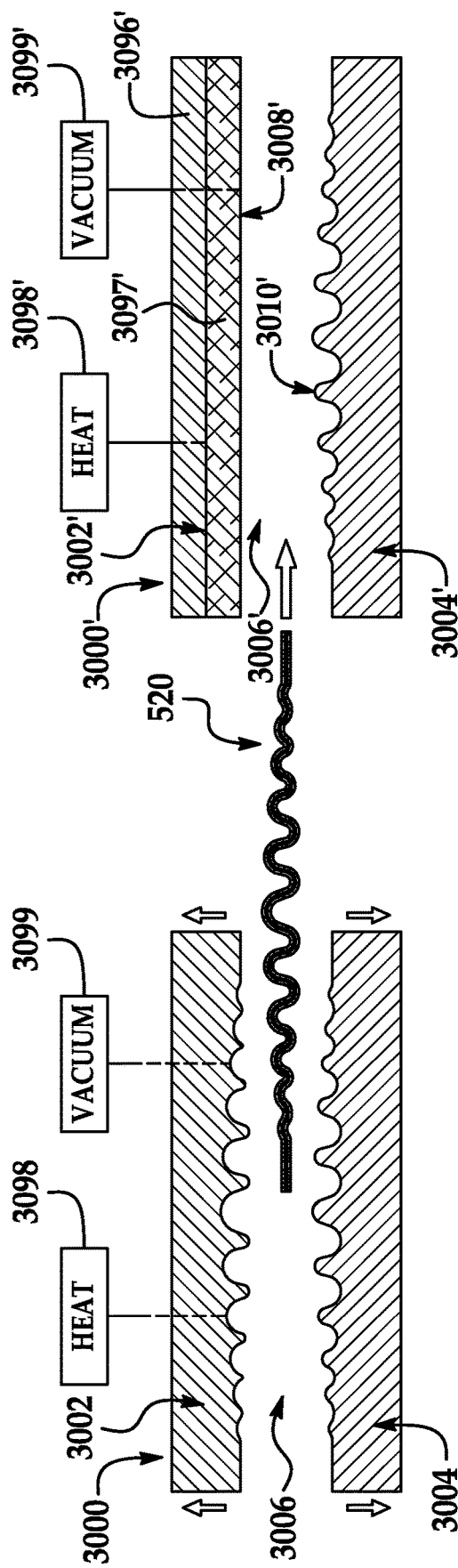

In additional embodiments, the upper 520 can be removed from texturing device 3000 and placed in an additional texturing device for further application of heat and/or pressure. For example, in the embodiments of FIGS. 30B and 30C, the upper 520 can be removed from the texturing device 3000 and moved to a second texturing device 3000'. The second texturing device 3000' can be substantially similar to the first texturing device 3000 except as noted below.

In some embodiments, the second texturing device 3000 can include a first member 3002' and a second member 3004'. The second member 3004' can be substantially similar to the second member 3004 of the first texturing device 3000. However, the first member 3002' can include a first portion 3096' and a second portion 3097'. The second portion 3097' can be more compressible than the first portion 3096'. For example, the second portion 3097' can be made from compressible and resilient silicone material. Also, in some embodiments, the second portion 3097' can include the first surface 3008'.

In some embodiments, the first surface 3008' can be smoother than the second surface 3010'. For example, the first surface 3008' can be substantially flat while the second surface 3010' can be textured to correspond to the surface contours of the textured area 550 of the upper 520.

Figure 30C:
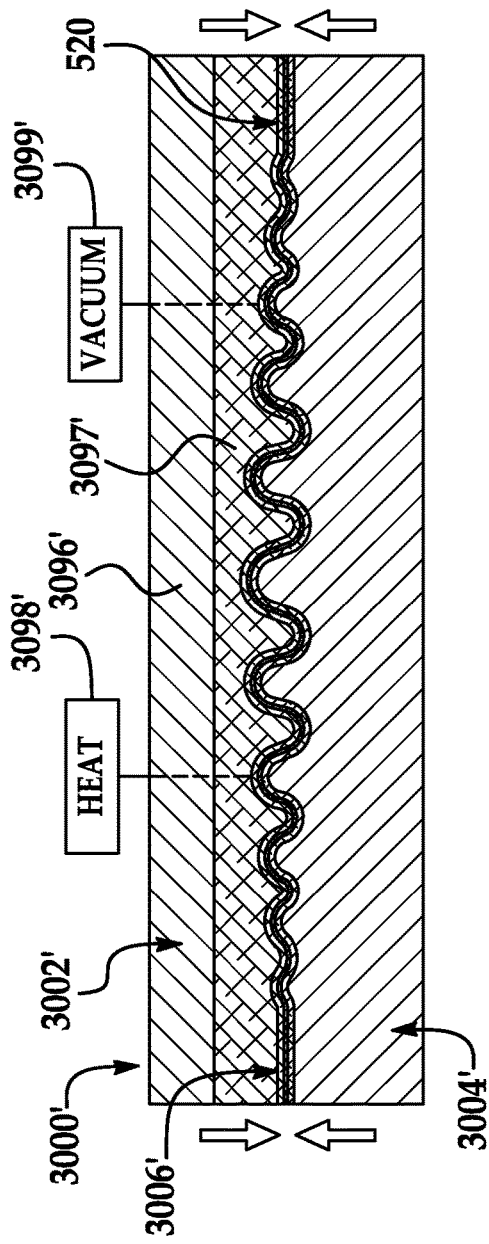

Accordingly, as shown in FIG. 30C, the upper 520 can be compressed within the cavity 3006' of the second texturing device 3000'. The second surface 3010' can compress the upper 520 into the compressible second portion 3097'. As such, a substantially amount of compression force can be distributed and uniformly applied to the upper 520 to ensure that the upper 520 retains its textured shape and/or to further attach the components of the upper 520 together.

Next, as shown in FIG. 27, method 2000 can continue in step 2010. More specifically, upper 520 can be further formed to have more three-dimensional shape and to define cavity 522. For example, upper 520 can be formed in step 2010 to have the configuration of FIGS. 10-12. In some embodiments of step 2010, upper 520 can be wrapped over and around a foot-shaped last. Also, opposing edges of upper 520 can be joined together to define seam 593, as shown in FIG. 10. Next, an underfoot part, such as a strobel or strobel-sock can be attached to knitted component 1000 to cover the underfoot portion of the last.

The method 2000 of assembly can conclude in step 2012, wherein sole structure 510 is attached. In some embodiments, sole structure 510 can be attached or lasted to upper 520 using adhesives. In other embodiments, upper 520 and sole structure 510 can be attached via fasteners or other devices.

Accordingly, method 2000 can be effective for forming and shaping textiles in a repeatable and efficient manner. Also, method 2000 can be used for effectively and efficiently attaching a skin layer or other object to the textile.

Referring next to FIGS. 31-38, aspects of manufacturing method 2000 will be discussed according to additional embodiments. These embodiments of method 2000 can be substantially similar to those discussed above with respect to FIGS. 27-30 except as noted below.

Figure 36:
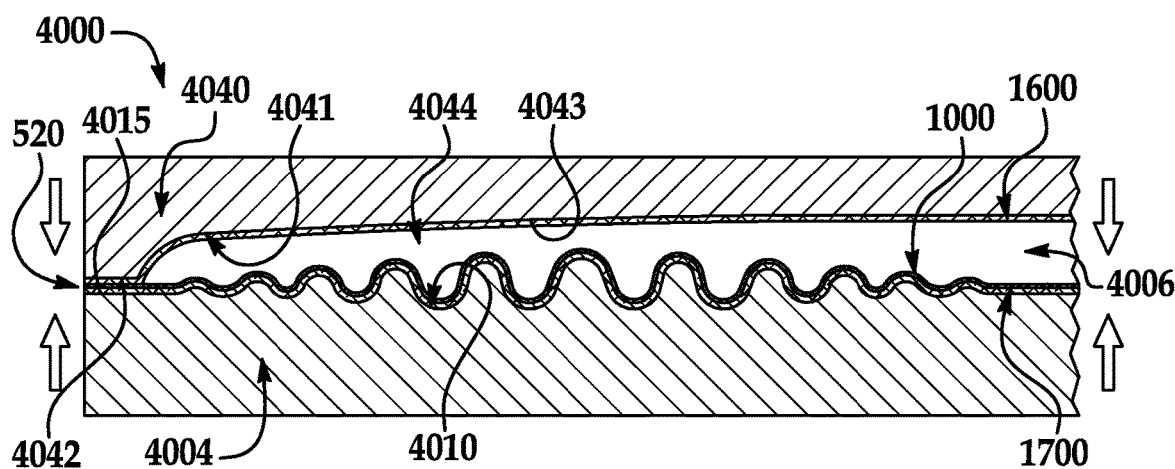
FIG. 36 is a schematic illustration of the texturing device of FIG. 35, wherein the texturing device is shown in the closed position relative to the second zone of the upper.
Figure 37:
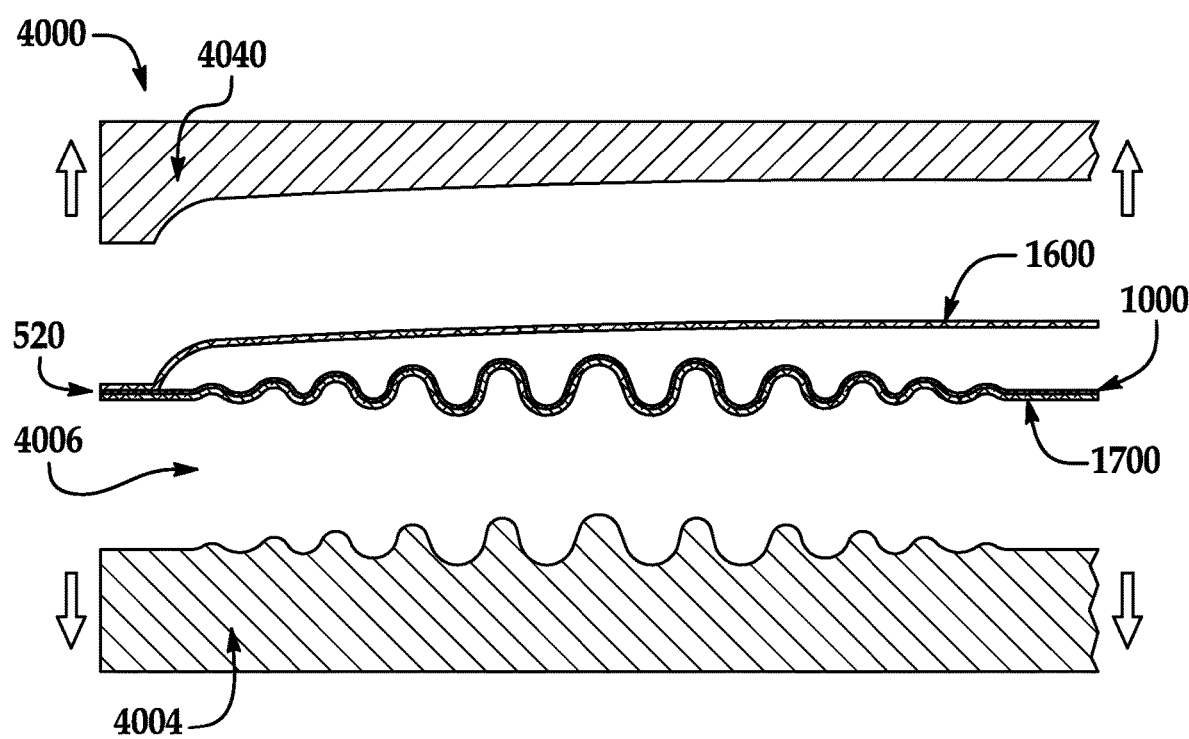
FIG. 37 is a schematic illustration of the texturing device of FIG. 35, wherein the texturing device is shown in the open position relative to the second zone of the upper.
Figure 38:
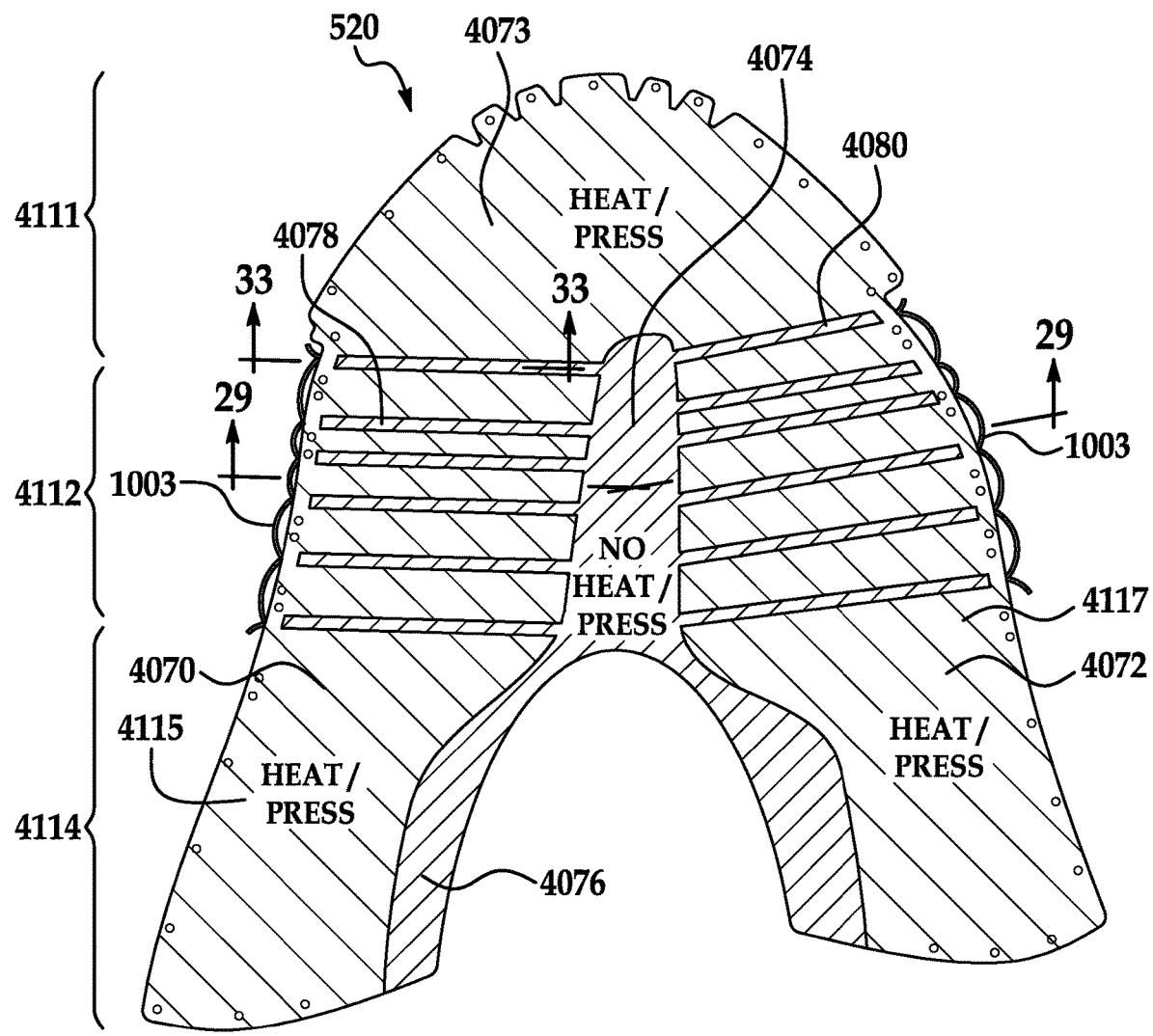
FIG. 38 is a schematic plan view of an upper formed in the texturing device of FIGS. 31-37.

The embodiments illustrated in FIGS. 31-38 can be employed for forming textured areas of the upper. Also, these embodiments can be employed for attaching one or more skin layers at predetermined areas of the upper. In some embodiments, these methods can be used for applying heat and/or pressure to one area of upper instead of another area of upper. For example, FIG. 38 schematically illustrates an embodiment of upper 520, wherein one or more zones are heated and/or pressed during the texturing process. Additionally, other areas of upper 520 are left unaffected by the heat and/or pressure of the texturing process as will be discussed in more detail below. Accordingly, certain areas of upper 520 can be protected from damage that the heat/pressure would otherwise cause. Furthermore, in some embodiments, the skin layer can be attached to upper 520 at predetermined areas by the heat/pressure, and other areas of skin layer can remain detached from upper 520 as will be discussed in detail below.

Figure 35:
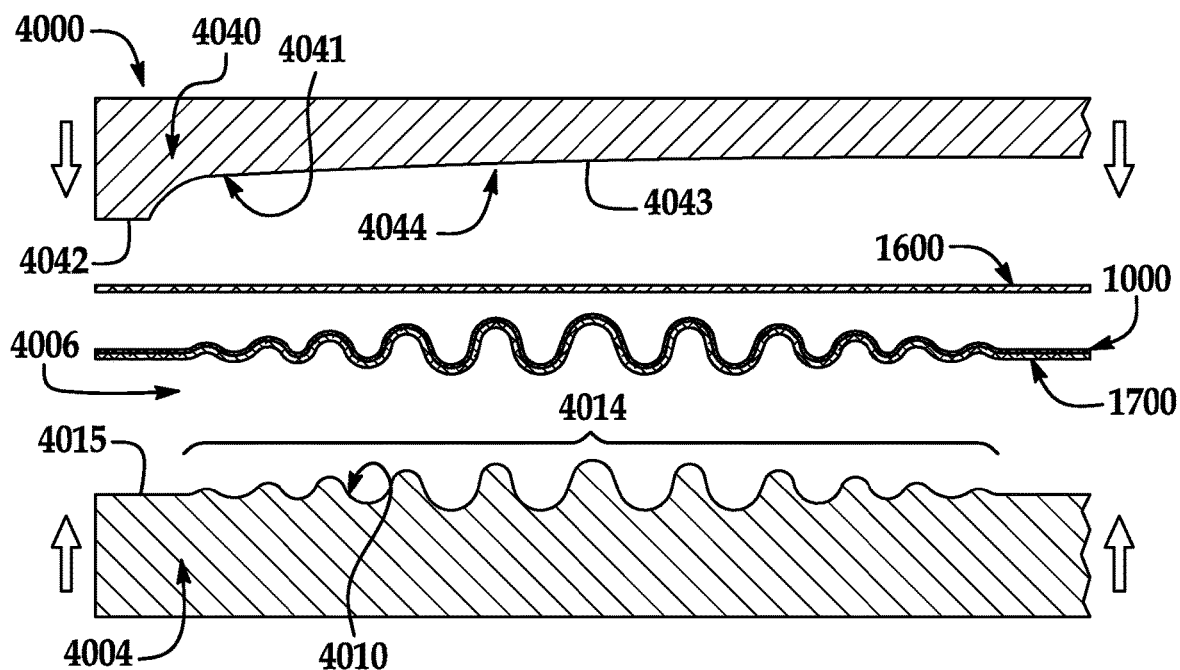
FIG. 35 is a schematic illustration of the texturing device of FIG. 33, wherein a member of the texturing device has been replaced by a different member, and wherein the texturing device is shown in the open position.

In some embodiments, knitted component 1000 and second skin layer 1700 can be textured and attached substantially simultaneously as will be discussed in relation to FIGS. 31-34. Then, first skin layer 1600 can be attached subsequently in some embodiments as illustrated in FIGS. 35-37.

Specifically, a texturing device 4000 can be provided in step 2005 of the method 2000. Features of texturing device 4000 that correspond to the embodiments of FIG. 28 are indicated with corresponding reference numbers, increased by 1000. It will be appreciated that a first zone of texturing device 4000 is shown in FIGS. 31-32, corresponding to the line 29-29 in FIG. 38. Also, a second zone of texturing device 4000 is shown in FIGS. 33-37, corresponding to the line 33-33 in FIG. 38. More specifically, FIGS. 31 and 32 illustrate an area of texturing device 4000 suitable for forming upper 520 along the medial side, lateral side, and intervening throat region according to exemplary embodiments. Also, FIGS. 33-37 illustrate another area of texturing device 4000, which is suitable for forming upper 520 along the medial side according to exemplary embodiments.

As shown in FIG. 31, texturing device 4000 can include a first member 4002 with a first surface 4008 and a first opening 4054. Generally, first surface 4008 can terminate at first opening 4054. Stated differently, first surface 4008 can be interrupted by first opening 4054. In some embodiments, opening 4054 can be a hole, recess, pocket, void, hollow, or other space within cavity 4006.

Furthermore, in some embodiments, first opening 4054 can be defined by one or more surfaces 4055, which remain spaced away from materials within cavity 4006 during formation of textured area 550. Accordingly, as will be discussed, first surface 4008 can apply heat and/or pressure to predetermined areas of upper 520 without similarly affecting other predetermined areas of upper 520.

Additionally, in some embodiments represented in FIG. 31, first opening 4054 can be spaced apart from periphery of first surface 4008 and/or first member 4002. Thus, first opening 4054 can be centrally located within cavity 4006 in some embodiments. However, first opening 4054 can be disposed in any other predetermined area of first member 4002, for example, at the periphery of first surface 4008.

As shown in the embodiment of FIG. 31, first opening 4054 can separate a first part 4050 and a second part 4052 of first surface 4008. In some embodiments, first part 4050 can include a first textured portion 4012 and a first smooth portion 4013, and second part 4052 can include a second textured portion 4016 and a second smooth portion 4017.

Furthermore, second member 4004 can include a second surface 4010. Second surface 4010 can include a second opening 4060. Also, in some embodiments, second opening 4060 can separate first part 4056 of second surface 4010 from second part 4058 of second surface 4010. In some embodiments, first part 4056 of second surface 4010 can include a first textured portion 4014 and a first smooth portion 4015, and second part 4058 of second surface 4010 can include a second textured portion 4018 and a second smooth portion 4019.

In some embodiments, features of first part 4050 of first surface 4008 can correspond to those of first part 4056 of second surface 4010. Likewise, features of second part 4052 of first surface 4008 can correspond to those of second part 4058 of second surface 4010. Furthermore, first opening 4054 can correspond to second opening 4060. Thus, in some embodiments represented in FIG. 32, first opening 4054 and second opening 4060 can cooperate to define a larger pocket 4069 defined by one or more surfaces 4061 or other opening within cavity 4006 when the cavity 4006 is closed.

In some embodiments, knitted component 1000 and second skin layer 1700 can be introduced within cavity 4006 as shown in FIG. 31. In some embodiments, second skin layer 1700 can include an opening 1799 that corresponds in location to first opening 4054, second opening 4060, and/or pocket 4069.

Next, as shown in FIG. 32, texturing device 4000 can be moved to the closed position. Then, first member 4002 and second member 4004 can apply heat and/or pressure to the contents of cavity 4006. In some embodiments, first part 4050 of first surface 4008 and first part 4056 of second surface 4010 can cooperate to form a first zone 4070 of upper 520. Similarly, second part 4052 of first surface 4008 and second part 4058 of second surface 4010 can cooperate to form a second zone 4072 of upper 520. Furthermore, a third zone 4074 of upper 520 can be disposed within pocket 4069. As such, third zone 4074 can be substantially unaffected by heat and pressure applied by texturing device 4000. Accordingly, third zone 4074 can be protected from damage that the heat/pressure would otherwise cause. For example, in some embodiments, third zone 4074 can include elastic materials, and the configuration of pocket 4069 can preserve the elasticity of the materials during the texturing.

Figure 33:
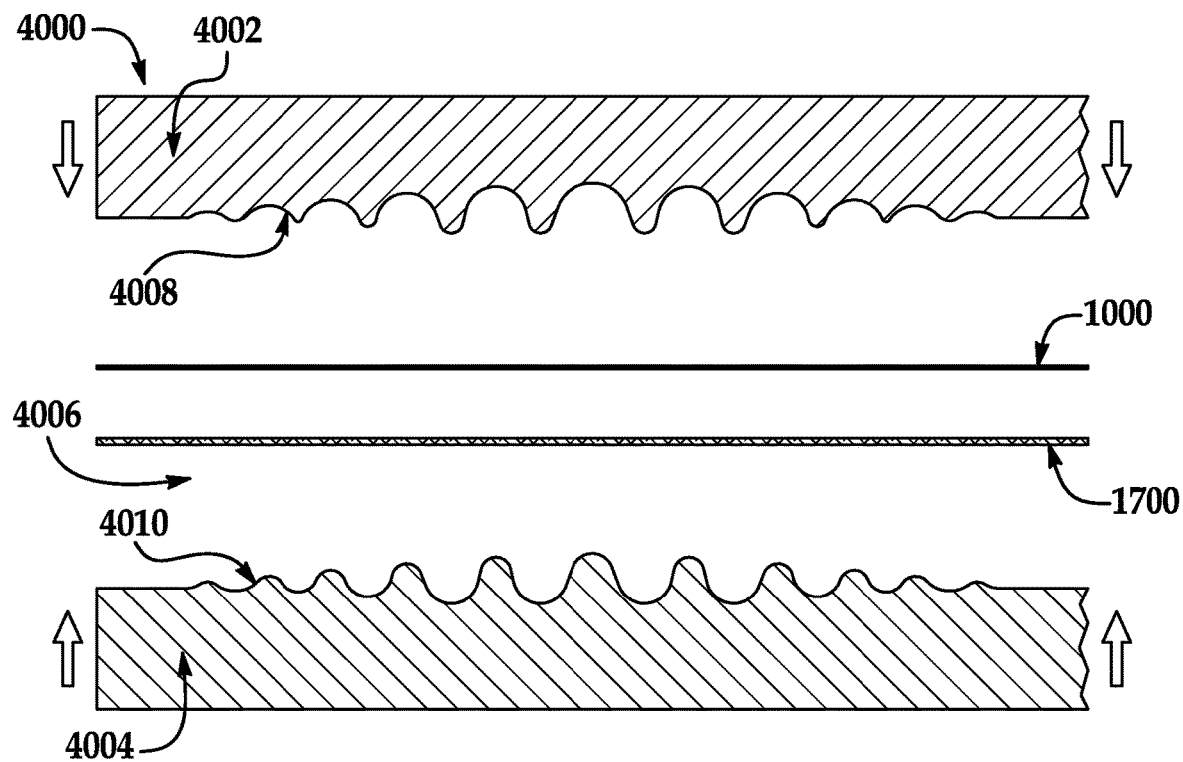
FIG. 33 is a schematic illustration of the texturing device of FIG. 31, wherein the texturing device is shown relative to a second zone of the upper, and wherein the texturing device is shown in a closed position.
Figure 34:
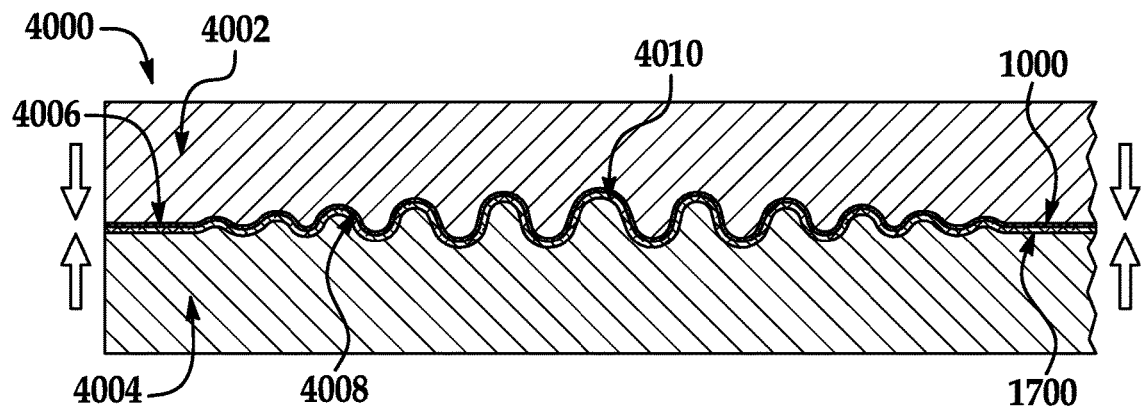
FIG. 34 is a schematic illustration of the texturing device of FIG. 33, wherein the texturing device is shown in a closed position relative to the second zone of the upper.

These operations are further illustrated in FIGS. 33 and 34, albeit with respect to a different area of upper 520. As shown in FIG. 33, knitted component 1000 and second skin layer 1700 can be provided within cavity 4006. Then, as shown in FIG. 34, texturing device 4000 can be closed, and knitted component 1000 and second skin layer 1700 can be attached and shaped according to the features of first surface 4008 and second surface 4010 of cavity 4006.

Next, texturing device 4000 can be opened, and first member 4002 can be replaced by a third member 4040. Third member 4040 can include a third surface 4041. In some embodiments, third surface 4041 can include a first part 4042 and a second part 4043. First part 4042 can correspond to first smooth portion 4015 of second surface 4010, and second part 4043 can define a third opening 4044 of cavity 4006.

As shown in FIG. 35, first skin layer 1600 can be provided in cavity 4006, between third surface 4041 and the previously-shaped knitted component 1000. Next, as shown in FIG. 36, texturing device 4000 can be closed, and heat and/or pressure can be applied by first smooth portion 4015 of second surface 4010 and first part 4042 of third surface 4041. As a result, first skin layer 1600 can be thermally bonded to knitted component 1000 at these areas. However, second part 4043 of third surface 4041 can remain spaced apart from first skin layer 1600, leaving corresponding areas of first skin layer 1600 detached from knitted component 1000. Subsequently, as shown in FIG. 37, texturing device 4000 can be opened, and upper 520 can be removed from cavity 4006.

Thus, predetermined portions of upper 520 can be heated and/or pressed by texturing device 4000 instead of other predetermined portions of upper 520. The resulting upper 520 is illustrated schematically in FIG. 38. As shown, first zone 4070 of upper 520 and second zone 4072 of upper 520 can be heated and pressed by texturing device 4000. As shown, first zone 4070 can define medial side 4115 of upper 520, and second zone 4072 can define lateral side 4117. Furthermore, in the embodiment of FIG. 38, a fourth zone 4073 can be heated and pressed to form respective textured areas and smooth areas and to attach the first and second skin layers 1600, 1700. Fourth zone 4073 can define the forefoot region 4111 of upper 520 in some embodiments.

Other zones can be left unaffected by the heat and/or pressure. For example, third zone 4074 can be defined in throat area of upper 520 and can remain largely unaffected by the heat and/or pressure applied by texturing device 4000. Additionally, a fifth zone 4076 can be defined proximate collar of upper 520, and fifth zone 4076 can be largely unaffected by heat and/or pressure during use of texturing device 4000. As discussed above, the collar and throat of upper 520 can be relatively elastic regions of upper 520. Thus, these areas of upper 520 can remain unaffected by the heat and/or pressure applied by texturing device 4000. Accordingly, the elasticity of these areas can be preserved.

Moreover, one or more sixth zones 4078 can be defined in upper 520. Sixth zones 4078 can be substantially elongate and can extend between third zone 4074 and the periphery of upper 520 on medial side 4115. Likewise, one or more seventh zones 4080 can extend between third zone 4074 and the periphery of upper 520 on lateral side 4117. These zones can remain unaffected by the heat and/or pressure applied by texturing device 4000. In some embodiments, the locations of sixth zones 4078 and seventh zones 4080 can correspond to the locations of the tensile elements 1003 within the knitted component. Thus, as represented in FIG. 19 for example, portions of tensile element 1003 and first skin layer 1600 can remain detached from knit element 1002 within sixth zones 4078 and seventh zones 4080.

It will be understood that while method 2000 has been described herein using a knitted component to form the upper of the article of footwear described in the present embodiments, other textiles may be used according to similar principals of the described methods to create textured areas of an upper of an article of footwear.

While various embodiments of the present disclosure have been described, the description is intended to be exemplary, rather than limiting and it will be apparent to those of ordinary skill in the art that many more embodiments and implementations are possible that are within the scope of the present disclosure. Accordingly, the present disclosure is not to be restricted except in light of the attached claims and their equivalents. Also, various modifications and changes may be made within the scope of the attached claims. Moreover, as used in the claims any of when referencing the previous claims is intended to mean (i) any one claim, or (ii) any combination of two or more claims referenced.

We claim:

1. A method of manufacturing an article of footwear comprising:
   providing a textile;
   applying at least one of heat and pressure to the textile using a texturing device to form a textured area of the textile that is spaced apart from a substantially smooth area of the textile; and
   forming at least part of an upper from the textile after applying the at least one of heat and pressure to the textile, the upper having a cavity configured to receive a foot and having the textured area extend continuously from a medial side of the upper to a lateral side of the upper across a forefoot region of the upper;
   wherein forming at least part of the upper from the textile includes providing the substantially smooth area of the textile with a smooth surface that defines a reference boundary of the upper; and
   wherein forming the textured area includes forming a plurality of projection structures that form a gradient pattern and project outwardly from the reference boundary and a plurality of recess structures that recess inwardly from the reference boundary, the plurality of recess structures including a first recess structure recessed inwardly from the reference boundary by a first height and a second recess structure recessed inwardly from the reference boundary by a second height, the plurality of projection structures including a first projection structure disposed between the first recess structure and the second recess structure and projecting outwardly from the reference boundary by a third height that is greater than the first height and the second height.

2. The method of claim 1, wherein providing the textile includes knitting a knitted component of unitary knit construction.

3. The method of claim 1, wherein forming the textured area includes forming the plurality of projection structures and recess structures in an alternating arrangement within the textured area.

4. The method of claim 1, further comprising providing an object proximate a surface of the textile; attaching the object to the surface via the application of the at least one of heat and pressure.

5. The method of claim 4, wherein providing the object includes providing a skin layer proximate the surface of the textile; and
wherein attaching the object includes attaching the skin layer to at least a portion of the surface.

6. The method of claim 5, wherein attaching the skin layer includes attaching a first skin layer to at least a portion of a first surface of the textile;
further comprising providing a second skin layer proximate a second surface of the textile, the second surface being opposite the first surface; and
attaching the second skin layer to at least a portion of the second surface via the application of the at least one of heat and pressure.

7. The method of claim 1, wherein providing the textile includes knitting a knitted component of unitary knit construction;
wherein knitting the textile includes knitting a knit element with a first surface and an opposing second surface; and
wherein knitting the knitted component includes inlaying a tensile element into at least one course or wale of the knit element.

8. The method of claim 7, wherein inlaying the tensile element includes inlaying a first segment of the tensile element in the knit element such that the first segment is substantially disposed between the first surface and the second surface of the knit element; and
further comprising disposing a second segment of the tensile element outside of the knit element such that the second segment projects from the first surface of the knit element.

9. The method of claim 8, wherein inlaying the tensile element includes inlaying a third segment of the tensile element in the knit element such that the third segment is substantially disposed between the first surface and the second surface of the knit element; and
wherein the second segment extends between the first segment and the third segment.

10. The method of claim 9, wherein the second segment extends across the textured area of the knitted component.

11. The method of claim 10, further comprising layering a skin layer over both the first surface of the knit element and the second segment of the tensile element.

12. The method of claim 1, wherein the third height defines a maximum height of the gradient pattern at the forefoot region.

13. The method of claim 12, wherein the plurality of projection structures diminish in height in a direction extending from the forefoot region toward the medial side and diminish in height in a direction extending from the forefoot region toward the lateral side.

14. The method of claim 1, wherein the texturing device includes a surface that includes a textured portion; and
further comprising shaping the textured area of the textile according to the textured portion of the surface.

15. The method of claim 14, wherein the surface is a first surface included on a first member of the texturing device, the textured portion being a first textured portion of the first surface;
wherein the texturing device includes a second member with a second surface, the second surface including a second textured portion that opposes the first textured portion;
wherein a cavity is defined between the first surface and the second surface;
further comprising providing the textile within the cavity; and
wherein applying at least one of heat and pressure to the textile includes shaping the textured area of the textile according to the first textured portion and the second textured portion.

16. The method of claim 14, wherein the texturing device includes a first surface that includes a textured portion;
wherein the texturing device includes a second surface that is compressible; and
wherein shaping the textured area includes compressing the second surface according to the textured portion of the surface.

17. The method of claim 1, wherein the textile includes a first zone and a second zone; and
wherein applying the at least one of heat and pressure to the textile includes applying the at least one of heat and pressure to the first zone instead of the second zone.

18. The method of claim 17, wherein providing the textile includes knitting a knitted component of unitary knit construction;
wherein knitting the knitted component includes knitting the first zone to have a first elasticity and knitting the second zone to have a second elasticity, the second elasticity being greater than the first elasticity.

19. The method of claim 17, further comprising providing a skin layer proximate the textile;
wherein applying the at least one of heat and pressure includes applying at least one of heat and pressure to the textile and the skin layer to attach the skin layer to the first zone of the textile.

20. A method of manufacturing an article of footwear comprising:
knitting a knitted component of unitary knit construction, the knitted component including a knit element and a tensile element;
inlaying a first segment of the tensile element in a first area of the knit element, inlaying a second segment of the tensile element in a second area of the knit element, and disposing a third segment of the tensile element outside the knit element, the third segment extending between the first segment and the second segment;
inserting the knit element into a cavity of a texturing device;
applying at least one of heat and pressure to the knit element while in the cavity to form a textured area adjacent to a substantially smooth area having a smooth surface that defines a reference plane of the knitted component, the textured area including a plurality of first projection structures that project from the reference plane in a first direction and a plurality of second projection structures that form a gradient pattern and project from the reference plane in a second direction opposite the first direction, the plurality of first projection structures including a first projection structure projecting from the reference plane in the first direction by a first height and a second projection structure projecting from the reference plane in the first direction by a second height, the plurality of second projection structures including a third projection structure disposed between the first projection structure and the second projection structure and projecting from the reference plane in the second direction by a third height that is greater than the first height and the second height;
forming at least a portion of an upper from the knitted component, the textured area of the knitted component extending continuously from a medial side of the upper to a lateral side of the upper across a forefoot region of the upper, wherein the first area and the first segment are disposed proximate a throat of the upper, wherein the second area and the second segment are disposed proximate a sole attachment area of the upper, and wherein the second projection structures extend into an inner void defined by the upper; and attaching the sole attachment area to a sole structure.

21. The method of claim 20, further comprising extending the third segment across a portion of the textured area of the knitted component.

22. The method of claim 21, further comprising providing a skin layer proximate the knitted component;

wherein applying the at least one of heat and pressure includes applying at least one of heat and pressure to both the knit element and the skin layer and attaching the skin layer to the knit element;

wherein the third segment is disposed between an adjacent zone of the skin layer and the portion of the textured area; and wherein the adjacent zone of the skin layer remains detached from the knit element after applying the at least one of heat and pressure.

23. The method of claim 11, wherein the knit element remains detached from the third segment of the tensile element on a first side of the tensile element, and the skin layer remains detached from the third segment of the tensile element on a second side of the tensile element.

24. The method of claim 22, wherein the knitted component remains detached from the third segment of the tensile element on a first side of the tensile element, and the skin layer remains detached from the third segment of the tensile element on a second side of the tensile element.

* * * * *